(12) United States Patent
Justice et al.

(10) Patent No.: US 12,209,607 B2
(45) Date of Patent: Jan. 28, 2025

(54) FLASHING AND BRACKET MOUNT ASSEMBLY FOR SECURING SOLAR PANEL RAIL GUIDES ON SHINGLE ROOFS

(71) Applicant: IRONRIDGE, INC., Hayward, CA (US)

(72) Inventors: Anumeha Justice, Leesburg, VA (US); Roger Pedlar, Phoenix, AZ (US); Jon Ash, Phoenix, AZ (US); Bryan Lester, Phoenix, AZ (US); Joseph P. Sirochman, Prescott, AZ (US)

(73) Assignee: IronRidge, Inc., Hayward, CA (US)

( * ) Notice: Subject to any disclaimer, the term of this patent is extended or adjusted under 35 U.S.C. 154(b) by 379 days.

(21) Appl. No.: 17/777,463

(22) PCT Filed: Nov. 18, 2020

(86) PCT No.: PCT/US2020/061140
§ 371 (c)(1),
(2) Date: May 17, 2022

(87) PCT Pub. No.: WO2021/102062
PCT Pub. Date: May 27, 2021

(65) Prior Publication Data
US 2022/0403862 A1    Dec. 22, 2022

Related U.S. Application Data

(60) Provisional application No. 62/936,704, filed on Nov. 18, 2019.

(51) Int. Cl.
*H02S 20/23*     (2014.01)
*F16B 5/02*      (2006.01)

(52) U.S. Cl.
CPC ............ *F16B 5/0233* (2013.01); *H02S 20/23* (2014.12)

(58) Field of Classification Search
CPC ......... H02S 20/23; F24S 25/61; F24S 25/636; F24S 21/00
See application file for complete search history.

(56) References Cited

U.S. PATENT DOCUMENTS 6,010,289 A     1/2000 DiStasio et al.
6,360,491 B1    3/2002 Ullman
(Continued)

FOREIGN PATENT DOCUMENTS

DE      202012103903 U1    12/2012
WO         2015016987 A1     2/2015

*Primary Examiner* — Daniel J Wiley
(74) *Attorney, Agent, or Firm* — The Webb Law Firm

(57) ABSTRACT

In various representative aspects, an assembly for securing a solar panel rail and rail-less support structures to a shingle roof. More specifically, the apparatus includes a connection bracket and flashing device for use in installing solar panel rail support structures. The connection bracket is secured to the flashing device by placing it over various embodiments of a cone element that is embedded within the flashing and secured using a tightening mechanism such as a bolt, screw, or other fastener. A solar panel rail support guide can be connected to a generally U-shaped connection on the top of the bracket. The apparatus also offers an improved means to cover the penetration point on the flashing to protect it and prevent water from leaking into the roof as well as an improved way to install the apparatus over existing products. Various embodiments of the bracket and flashing provided as well.

19 Claims, 42 Drawing Sheets

(56) References Cited

U.S. PATENT DOCUMENTS

| | | |
|---|---|---|
| 6,526,701 B2 | 3/2003 | Stearns et al. |
| 6,536,729 B1 | 3/2003 | Haddock |
| 8,122,648 B1 | 2/2012 | Liu |
| 8,245,460 B2 | 8/2012 | Yamanaka et al. |
| 8,250,829 B2 | 8/2012 | McPheeters et al. |
| 8,272,174 B2 | 9/2012 | Stearns et al. |
| 8,328,486 B2 | 12/2012 | Cox |
| 8,413,388 B2 | 4/2013 | Stearns et al. |
| 8,448,405 B2 | 5/2013 | Schaefer et al. |
| 8,539,719 B2 | 9/2013 | McPheeters et al. |
| 8,689,517 B2 | 4/2014 | Schaefer et al. |
| 8,707,654 B2 | 4/2014 | Schaefer et al. |
| 8,707,655 B2 | 4/2014 | Schaefer et al. |
| 8,733,718 B2 | 5/2014 | Corsi |
| 8,739,471 B2 | 6/2014 | McPheeters et al. |
| 8,752,338 B2 | 6/2014 | Schaefer et al. |
| 8,756,881 B2 * | 6/2014 | West .................. F24S 25/40 52/173.3 |
| 8,782,983 B2 * | 7/2014 | Stearns .................. E04D 13/10 52/24 |
| 8,826,618 B2 | 9/2014 | Stearns |
| 8,833,032 B2 | 9/2014 | Schaefer et al. |
| 8,869,490 B2 | 10/2014 | Schaefer et al. |
| 8,991,765 B1 | 3/2015 | Chesser et al. |
| 9,068,339 B2 | 6/2015 | Schaefer et al. |
| 9,134,044 B2 * | 9/2015 | Stearns .................. E04D 13/14 |
| 9,447,988 B2 | 9/2016 | Stearns et al. |
| 9,793,853 B2 | 10/2017 | Stearns et al. |
| 10,148,217 B2 | 12/2018 | Meine |
| 10,171,026 B2 | 1/2019 | Meine |
| 10,767,684 B1 | 9/2020 | Meine et al. |
| 10,781,587 B2 | 9/2020 | Meine |
| 10,890,205 B2 * | 1/2021 | McPheeters ............ F24S 40/44 |
| 10,982,430 B2 | 4/2021 | Meine |
| 2008/0000173 A1 | 1/2008 | Lenox et al. |
| 2011/0233358 A1 | 9/2011 | McPheeters et al. |
| 2012/0144760 A1 | 6/2012 | Schaefer et al. |
| 2012/0222380 A1 | 9/2012 | Wentworth et al. |
| 2013/0091787 A1 | 4/2013 | Puga |
| 2015/0129517 A1 | 5/2015 | Wildes |
| 2016/0134230 A1 * | 5/2016 | Meine .................. H02S 20/23 52/698 |
| 2020/0340519 A1 | 10/2020 | Meine et al. |
| 2021/0222421 A1 | 7/2021 | Meine |
| 2021/0230861 A1 | 7/2021 | Meine |
| 2021/0262222 A1 | 8/2021 | Meine |

* cited by examiner

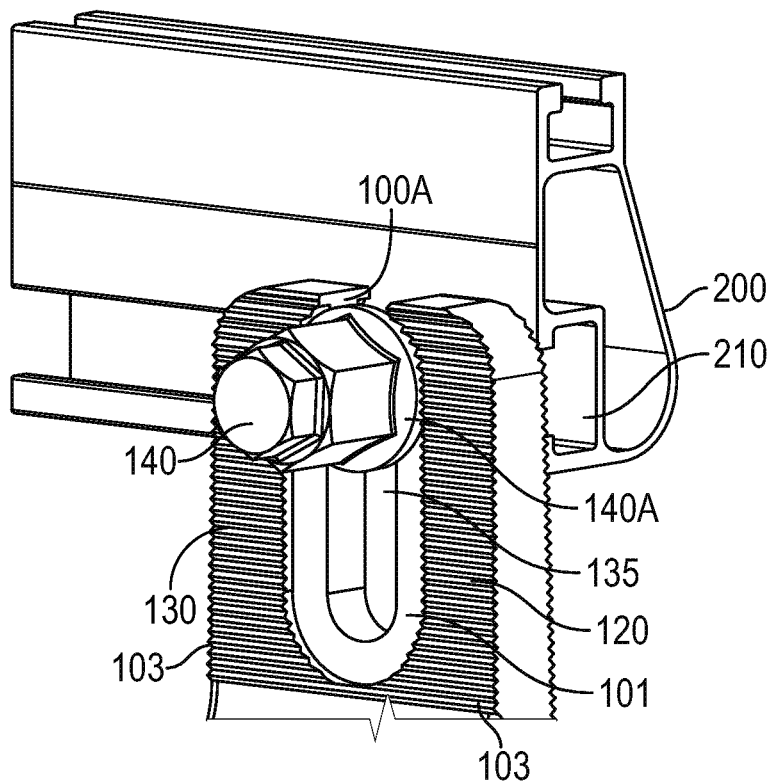
FIG. 5
(Prior Art)
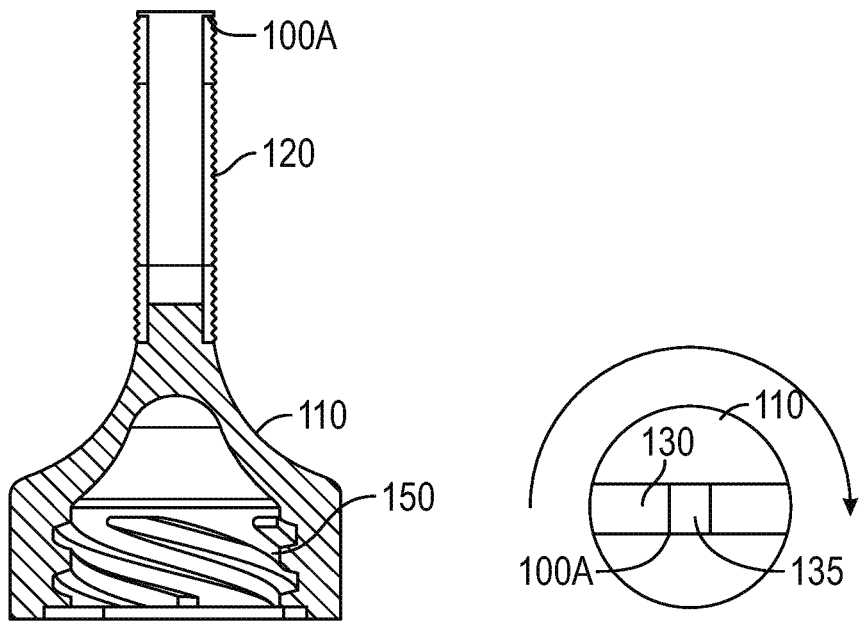
FIG. 6
(Prior Art)
FIG. 7
(Prior Art)

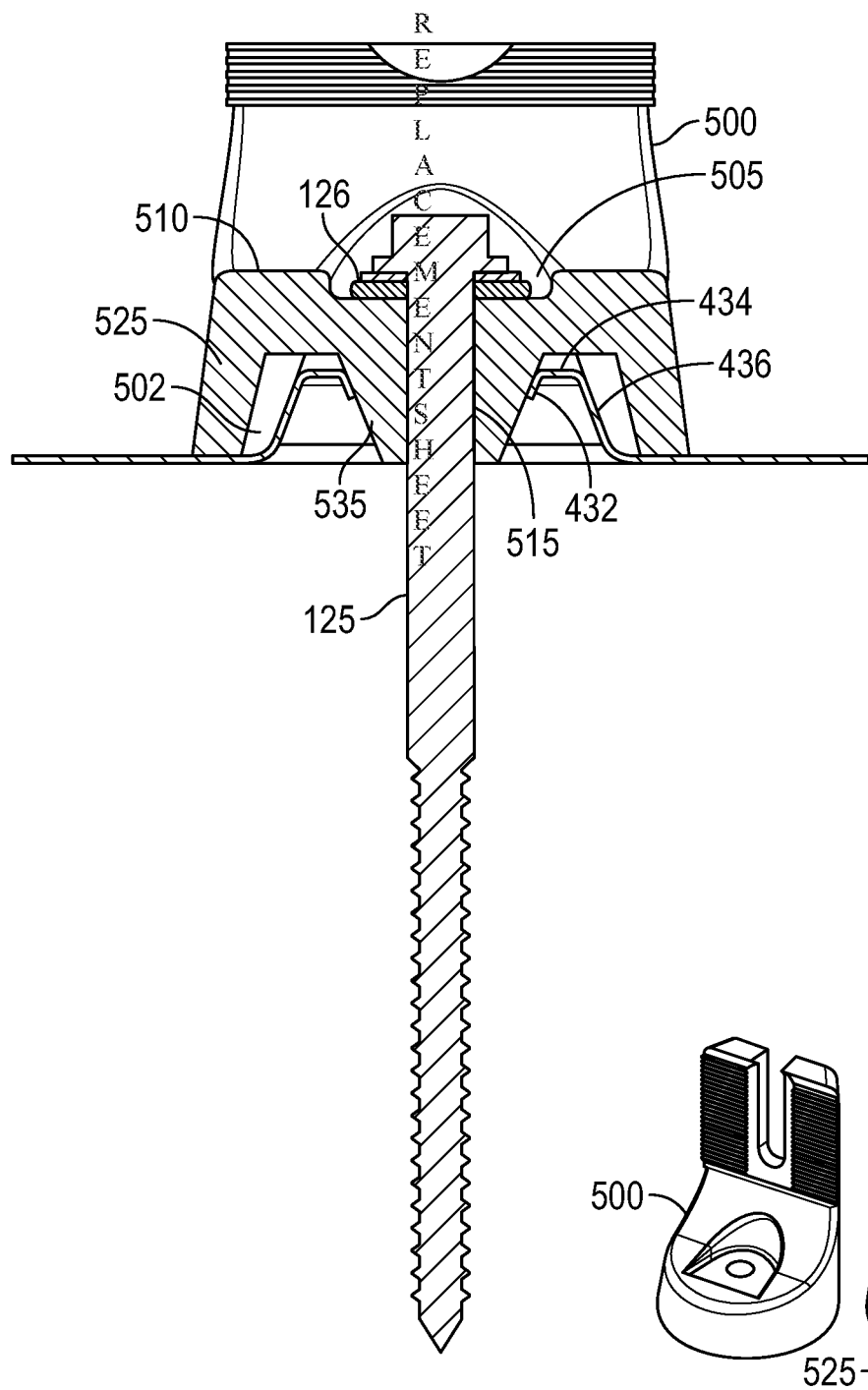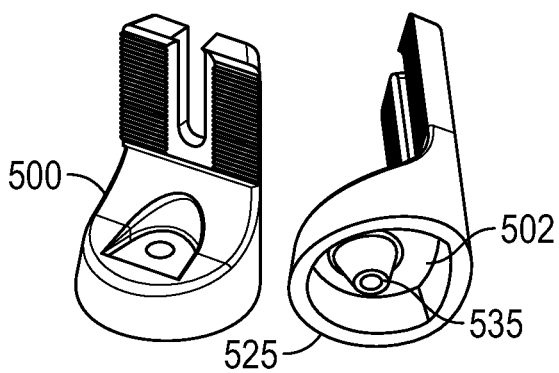
FIG. 26      FIG. 27

FLASHING AND BRACKET MOUNT ASSEMBLY FOR SECURING SOLAR PANEL RAIL GUIDES ON SHINGLE ROOFS

CROSS-REFERENCE TO RELATED APPLICATIONS

This application is the United States national phase of International Application No. PCT/US2020/061140 filed Nov. 18, 2020, and claims priority to U.S. Provisional Patent Application No. 62/936,704 filed Nov. 18, 2019, the disclosures of which are hereby incorporated by reference in their entirety.

BACKGROUND OF INVENTION

Field of the Invention

The present invention relates generally to a flashing and bracket mounting assembly apparatus for securing a solar panel rail support structure to a shingle roof. More specifically, several embodiments of the apparatus provide a novel and improved connection bracket and flashing device for use in installing solar panel rail support structures. The embodiments of the apparatus are improvements over certain designs of L-foot brackets with U-shaped guides that are used as the connecting point to secure the solar panel rail structure. The embodiments also offer an improved means to cover the penetration point on the flashing to protect it and prevent water from leaking into the roof as well as offer an improved way to install the apparatus over existing products.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panel modules are arranged or positioned on their support elements. This is particularly true when the elements must be installed on a standard shingle roof that links to a rail guide for supporting the solar panel array.

Existing processes that are employed to mount solar panel rail guides on shingle roofs utilize L-Foot connection brackets. A typical flashed shingle mount is shown in FIG. 2 (further description of the figure is below). These shingle mounts have been secured to the rafters of the roof and spaced apart for subsequent installation of solar panel rail guides. Once secured, an L-Foot bracket is then secured through a flashing on each individual shingle mount and a solar panel rail guide is then installed lengthwise and to each L-Foot bracket as shown below. Some mounts provide a standoff receiver 640 as shown in FIGS. 1 and 3 that elevate the roof penetration point above the roof to prevent water damage and leaks.

In another design the inventor has previously disclosed a slight variation of the L-Foot bracket design above that covers the penetration point of the shingle mount to protect it from water leakage. As shown in FIG. 4, this design is more symmetrical and allows the bracket to be secured from either side of the guides. This bracket comprises a rounded base with a pair of guides that protrude upward from the rounded base in a generally U-shaped fashion. The rounded base can be rotated 90 degrees to accommodate either east/west rails or north/south rails.

Each of the guides includes ridges that are used to provide a secure connection with a bolt/nut that connects to the solar panel rail guide as shown in FIG. 5. The guides also include an internal catch that prevents the bolt and nut that connects to the rail from slipping.

The rounded base fits onto a receiver that is present a flashing. When installed, the rounded base is rotated approximately 180 degrees onto the receiver and can be used to accommodate east/west and north/south-facing solar panel rail guides. The symmetry of the bracket allows it to be installed from either side. Within the rounded base, a threaded receiver connection is present, which allows a 180-degree turn to lock it in place. Variations of these brackets are provided in the description of the prior art below in FIGS. 1-19 below.

FIGS. 1-3 illustrate a typical existing solar panel array structure. FIG. 1 shows a typical shingle roof 600 with several flashings 630 installed with a receiver 640. FIG. 2 illustrates how an L-shaped bracket 650 is secured directly to the flashing 630. FIG. 3 shows a front view of a rail-guide secured to multiple L-shaped brackets 650. The figure also includes examples of a receiver 640 can be utilized to raise the level of where the L-shaped bracket 650 interfaces with the flashing and the roof. The bracket 650 is then generally secured to a rail guide 620 by using a standard nut and bolt combination as shown, which is then used to support an end clamp 660. The end clamp 660 is then coupled to a solar panel module 610 as shown.

FIG. 4 shows an embodiment of another type of bracket which the inventor has previously disclosed. A mounting bracket 100 is shown. The bracket 100 has a base 110. A typical base is cylindrically shaped as shown, but the base 110 is not limited to a round shape. The base 110 tapers upward and forms a generally U-shaped guide 130 that forms a pair of members 103 extending from opposing sides of the base 110, which in turn forms an aperture 135. Aperture 135 also includes a recessed path 101 that terminates at a lip 100A. FIG. 5 shows how once a fastener such as nut and bolt 140 is dropped into the aperture 135, the path 101 allows the nut and bolt 140 to move along the path 101, but the lip 100A prevents the edge of the bolt 140A from slipping out of the aperture 135. Each side of the guide 130 also includes ridges 120.

FIG. 5 illustrates in greater detail how the bracket 100 is coupled to an alternate embodiment of a rail guide 200 similar to the support 620 shown in FIGS. 2 and 3. This particular rail guide 200 includes a bolt slot 210. The bracket 100 is typically coupled to the rail guide 200 by using the nut and bolt combination 140. The guide 130 allows the nut and bolt combination 140 to be inserted downward at the top of the open end of the aperture 135 between the nut and the rail support 200 with the nut already partially tightened as shown in FIG. 5. The symmetrical shape of the bracket 100 and the existence of a recessed path 101 and lip 100A on both sides of aperture 135 also allows the bracket 100 to be coupled to the rail-guide 210 from either side of the guide 130. The length of the aperture 135 allows the rail guide 200 to be adjusted at various heights. Other similar shapes can be used for the guide 130 such as one that is closed on all sides. A closed configuration, however, would require that the bolt be inserted through the aperture 135 prior to affixing the nut.

The ridges 120 typically provide increased friction between the nut and the guide 130 to prevent the rail support 200 from slipping FIG. 6 shows a transparent side view of the base 110. A threaded link 150 is present in an internal or hollow opening of the base 110. The threaded link 150 is typically a female threaded portion that will be used to secure the base 110 to a receiver 315 to be discussed in FIG. 8. The threaded portion is not limited to a female threaded portion. FIG. 7 shows a top view of the bracket 100 showing how the bracket 100 can be turned in the clockwise direction to secure it to the receiver 315 as shown in FIG. 8. This embodiment of the threaded link 150 shows a four-start thread that typically requires a 180-degree rotation for full installation. This simplifies installation and allows for multiple orientations of rail guides on the roof. A tactile snap can also provide notice that the bracket 100 is locked in place. Other similar thread configurations can also be used.

FIG. 8 shows a receiver 315 previously disclosed by the inventor. The receiver 315 is typically embedded or secured at a raised portion of a flashing 300 that forms a raised base 310 as shown in FIG. 11. The receiver 315 can either be pre-molded or welded to the flashing as well. The raised base 310 raises the level of the receiver 315 so that liquids or moisture will not accumulate where the receiver 315 is located. This elevates the roof penetration point above the roof's surface to prevent water damage and leakage. The receiver 315 also includes a threaded portion 320, a snap tab or pocket 330, and an opening 340. The threaded portion 320 preferably should include male threads that can be used to join the base 110 of the bracket 100 to the receiver 315. The snap tab 330 provides an exemplary means for providing an audible or tactile notification that the bracket 100 has been locked to the receiver 315.

FIG. 9 shows a perspective close-up internal view of the threaded link 150 of the base 110. Bumps 165 are present on the rim 167 of the base 110. FIG. 10 shows a similar view to that of FIG. 9. In FIG. 10, a view of a receiver 315 threaded portion 320 is fully inserted into the threaded link 150. This is typically accomplished by rotating the bracket 100 in a clockwise direction around the threaded portion 320 until it is locked in place. Prior to the bracket 100 being fully engaged with the receiver 315, the bumps 165 will engage the snap tabs 330 and then snap in place.

FIGS. 11-15 illustrate the steps used to join the bracket 100 to the receiver 315 and install the flashing 300 to the roof 600. FIG. 11 shows an exploded view of the combination flashing and bracket assembly with flashing 300 as previously provided by the inventor, which is generally a flat, rectangular-shaped metallic structure, although other suitable shapes and materials would work as well. The flashing 300 may also include tapered ribs to prevent oil canning and compression deflection. The flashing 300 comprises a receiver 315 that is either embedded or secured with the flashing 300 along a raised base 310 on the flashing 300. A bolt, screw, or fastener 125 is used to secure the flashing 300 to the roof 600 by inserting the bolt 125 through the opening 340. The bracket 100 is also shown. FIG. 12 shows the bracket 100 secured to the receiver 315 and the flashing 300 presumably secured to the roof 600 as the bolt 125 has been inserted through the opening 340. FIG. 13 shows the first step to assembling the flashing 300 to the roof 600. One side of the flashing 300 is typically inserted between the shingles 615 on the roof 600 and horizontally aligned using notches 301. FIG. 14 illustrates the next step, which is to secure the flashing 300 to the roof 600 by first drilling a pilot hole into the roof where the bolt 125 will be placed after alignment and then inserting the bolt 125 through the opening 340 of the receiver 315 and rotating the bolt 125 until it is fully tightened. FIG. 15 shows the final step, which is to engage the bracket 100 with the receiver 315 and rotate the bracket 100 clockwise along the threaded portion 320 until it is locked into place, which is apparent when the bumps 165 snap into place on the snap tabs 330 or when the circlip 168 engages the receiver 315 causing a tactile snap to occur and making an audible sound. FIG. 16 shows a sectional view of the fully assembled bracket/flashing combination, as previously provided by the inventor, where the internal elements can be seen.

FIG. 17 illustrates a cross-sectional side view showing how the fully assembled flashing combination beneath the capped bracket 100 is sealed to prevent moisture from entering the roof 600. A load distribution plate 350 is provided between the flashing 300 and the roof 600. The load distribution plate 350 is typically made of a metallic material, but any suitable material capable of distributing the load from the solar array to the roof would be sufficient. The load distribution plate 350 also is tightly joined to the flashing 300 at its raised base 310, and receiver 315. The interference fit between these slightly tapered parts creates a watertight seal. A washer 126 is also provided between the top of the bolt 125 and the top of the receiver 315 to further prevent moisture from seeping inside the opening 340 of the receiver 315. FIGS. 18 and 19 show an exemplary method for making the receiver 315 watertight by using a press fit manufacturing process. As shown in FIG. 18, prior to press fitting, the load distribution plate 350 has not yet been inserted into the receiver 315 as evidenced by a first gap 173 and a second gap 303. The opening in the flashing 300 is supported and sealed by pressing the receiver 315 and load distribution plate 350 together with the flashing 300 and raised base 310, which also includes the vertical edge 302 in between the distribution plate 350 becomes fully inserted into the gaps 173 and 303 to seal off any available internal openings as shown in FIG. 19.

An improved bracket is desired for use in attaching the solar panel rail guides that overcomes the limitations of the prior art. More specifically, there is a need to provide an improved connection bracket and flashing device for use in installing solar panel rail support structures. In particular, improvements are desired over the previous designs of L-foot brackets shown in the above-described prior art that can be used as the connecting point to secure the solar panel rail structure, and can offer an improved means to cover the penetration point on the flashing to protect it and prevent water from leaking into the roof as well as offer an improved way to install the apparatus over existing products. The present invention overcomes these limitations and offers a solution that provides a support mechanism for shingle roofs that is both easy to, install and use, which allows a rail-guide to be easily and precisely adjusted vertically along the support mechanism. The invention also provides an improved installation method that enables an installer of the apparatus to place the bracket on the flashing and maintain its position without having to permanently secure it.

SUMMARY OF THE INVENTION

The invention is summarized below only for purposes of introducing embodiments of the invention. The ultimate scope of the invention is to be limited only to the claims that follow the specification.

It is an object of this invention to provide an apparatus for securing a solar panel rail guide structure to a shingle roof.

It is a further object of this invention that the apparatus comprises a bracket that is secured to a flashing.

It is a further object of this invention that the bracket comprises a base.

It is a further object of this invention that the bracket further comprises a guide that extends outward from the base.

It is a further object of this invention that the guide is a generally U-shaped configuration that forms an aperture.

It is a further object of the present invention to secure the rail guide to the guides with a nut and bolt.

It is a further object of this invention to provide a recessed path or slot that terminates at a lip on at least one end of the guide that prevents the nut from sliding out of the guide.

It is a further object of this invention to provide a recessed path that terminates at a lip on either side of the guide to enable installation of rail guides on either side of the bracket.

It is a further object of this invention that the surface of the guide further comprises a plurality of ridges to provide traction between the guide and the rail guide.

It is a further object of this invention that the apparatus comprises a sealed flashing that through water shedding and sealing potential leak pathways protects the roof from water infiltration.

It is a further object of this invention that the flashing comprises a cone that extends upward from the flashing and tapers inward terminating at a lip and forms a generally circular opening within the cone.

It is a further object of this invention that the base of the bracket comprise an inner shell that fits within the circular opening of the cone.

It is a further object of this invention that an outer shell extend from the inner shell and further comprise a bottom surface.

It is a further object of this invention that the circular opening of the cone forms a top edge.

It is a further object of this invention that a seal be positioned between the top edge of the cone and the bottom surface of the outer shell.

It is a further object of this invention that the top edge of the cone be curved.

It is a further object of this invention that a fastener secure the base to the cone of the flashing by extending through an opening in the inner shell of the base.

It is a further object of this invention that the fastener comprise a washer slidably coupled along an elongated portion of the fastener.

It is a further object of this invention that the washer is a deformable seal.

It is a further object of this invention that the deformable seal of the fastener is compressed between a head of the fastener and a top surface of the base.

It is a further object of this invention that the base of the bracket can be either generally cylindrical or polygonal in shape.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 5 illustrates a perspective view of the guides of the bracket secured to a typical solar panel rail guide using a nut and bolt.

FIG. 6 illustrates a side internal view of the bracket showing a female threading within the base of the bracket.

FIG. 7 illustrates a top view of the bracket shown in FIG. 4.

FIG. 26 illustrates a front cross-sectional view of the fully assembled elements in FIGS. 24A and B-25A-C and 27 with alternate embodiments of the base of the bracket and the flashing.

FIG. 27 illustrates a front perspective and a bottom perspective view of the bracket shown in FIGS. 24A and B-25A-C and 27.

DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
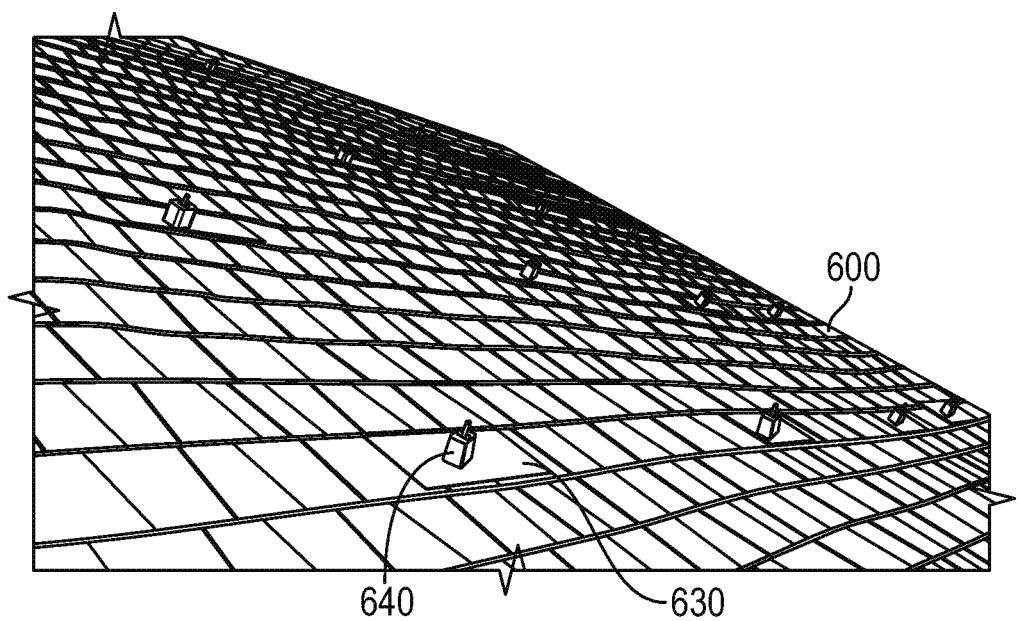
FIG. 1 illustrates a top perspective view of a shingled roof with a sample of prior art flashing structures.
Figure 2:
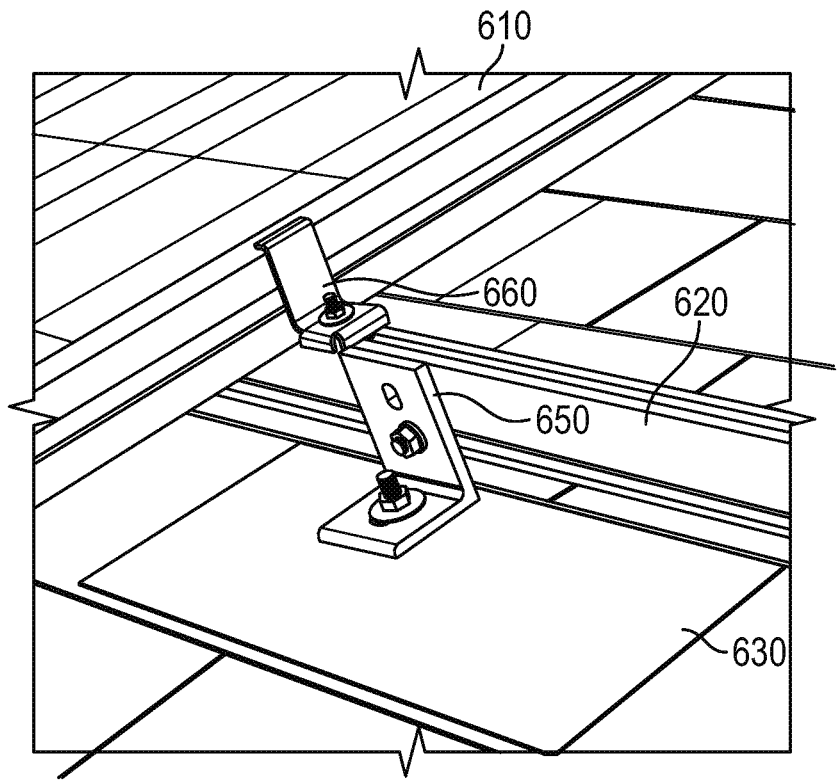
FIG. 2 illustrates a perspective view of a prior art flashing that is secured to a mounting bracket, which in turn is secured to a rail guide on the shingled roof shown in FIG. 1.
Figure 3:
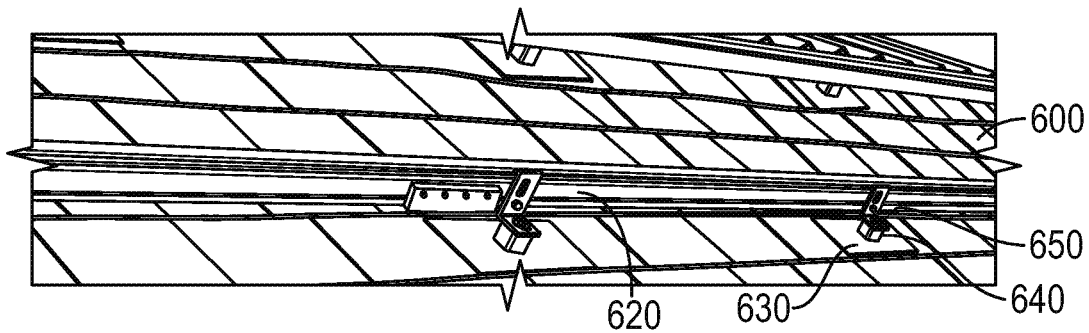
FIG. 3 illustrates a perspective view of the rail guide secured to multiple mounting brackets on multiple flashings on the shingled roof shown in FIG. 1.
Figure 4:
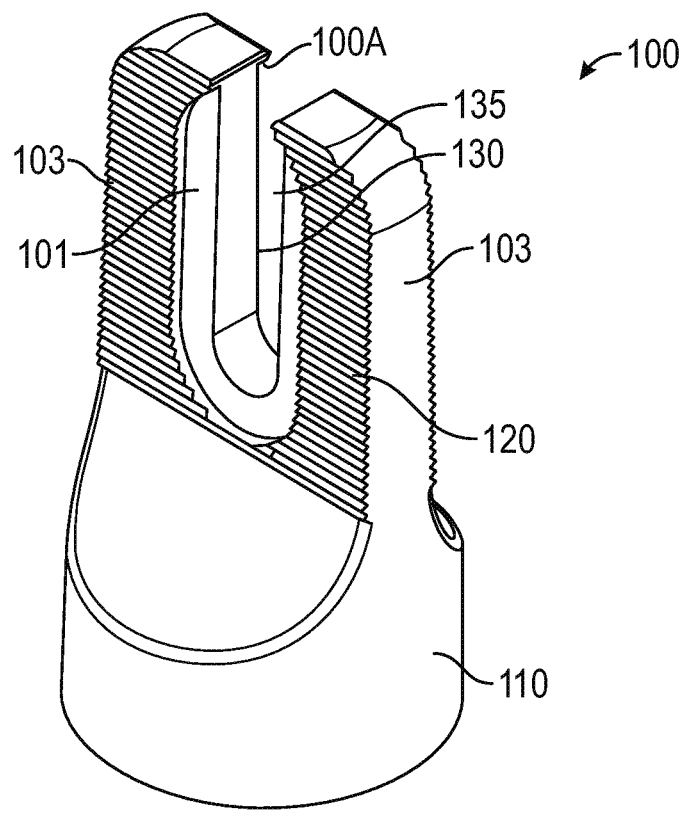
FIG. 4 illustrates a perspective view of an exemplary embodiment of a mounting bracket.
Figure 8:
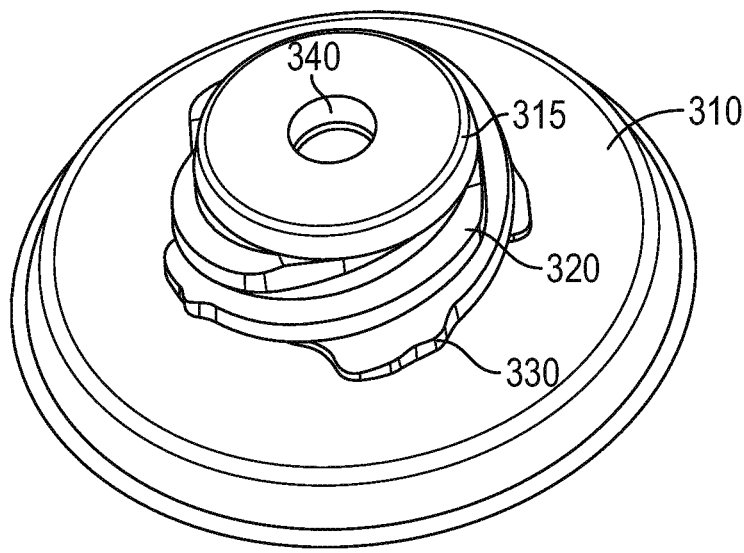
FIG. 8 illustrates a perspective view of the portion of the flashing that includes a male threading that receives the female threading of the base of the bracket.
Figure 9:
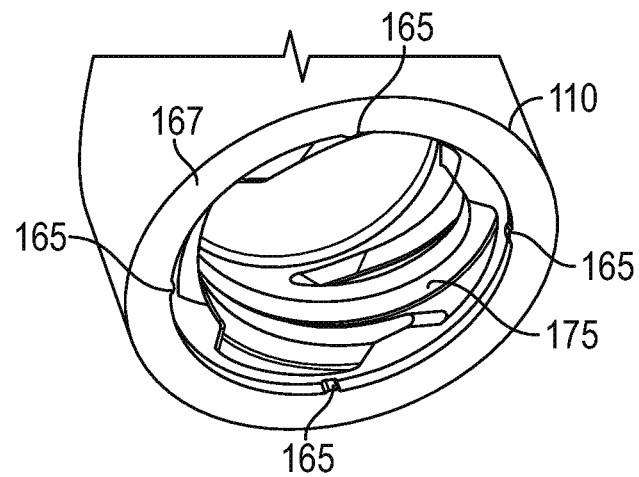
FIG. 9 illustrates a bottom perspective view of the base showing the internal threads.
Figure 10:
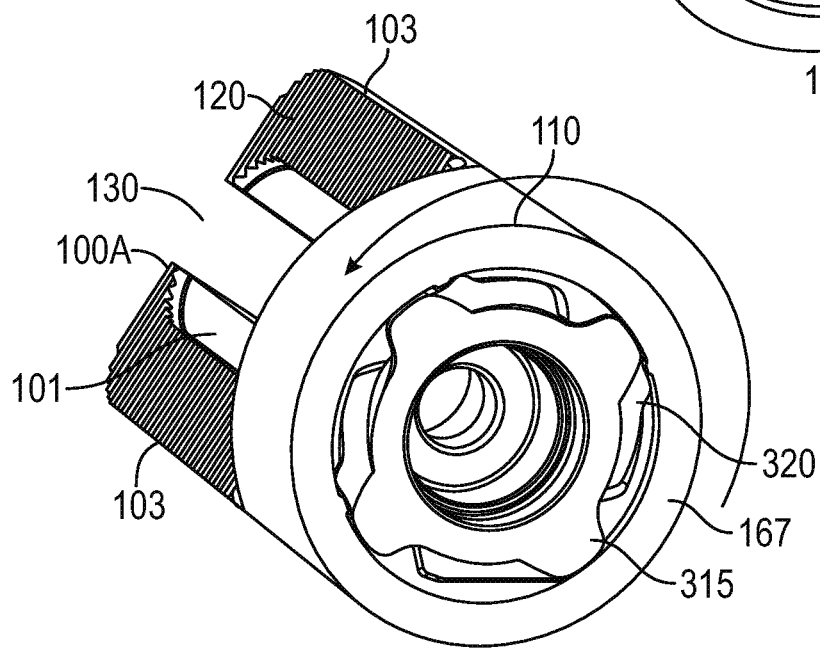
FIG. 10 illustrates a bottom perspective view showing the male threads of the receiver fully inserted into the female threads of the base.
Figure 11:
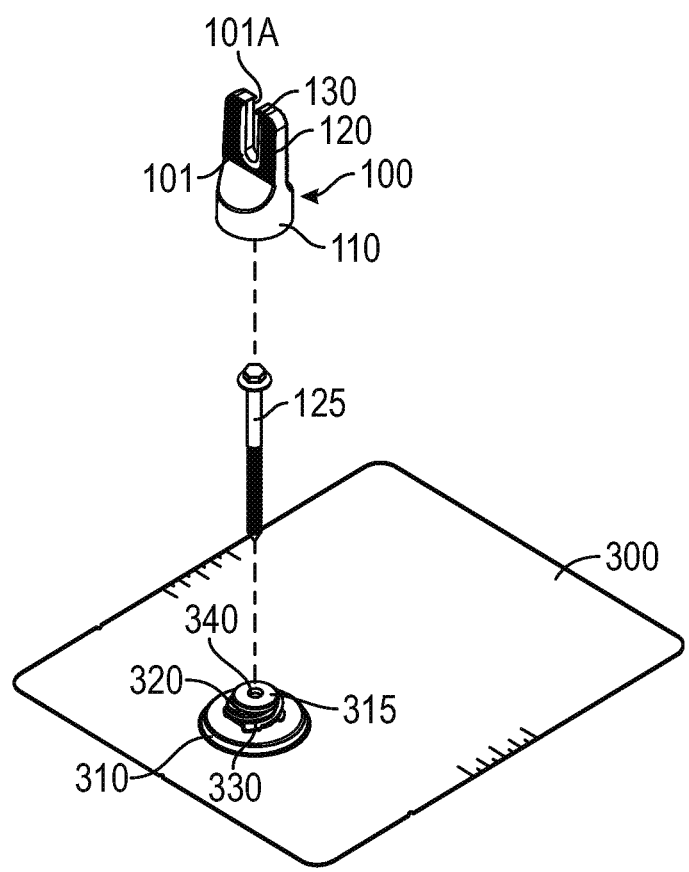
FIG. 11 illustrates an exploded perspective view of the bracket, sealed flashing, and fastener that is used to secure the flashing to the roof.
Figure 12:
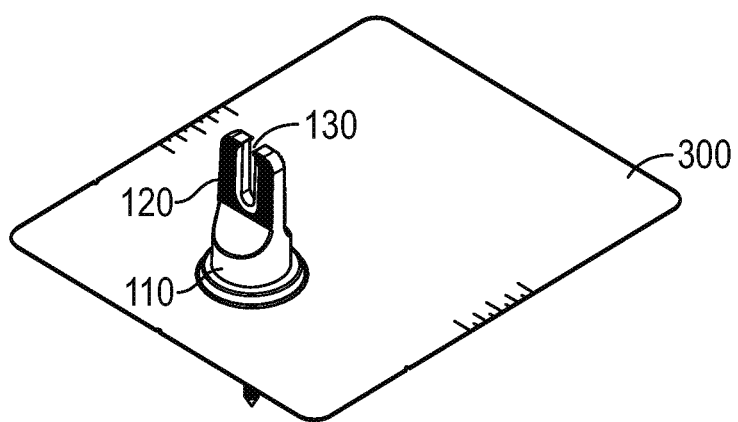
FIG. 12 illustrates a perspective view of the bracket fully assembled and secured to the flashing.
Figure 13:
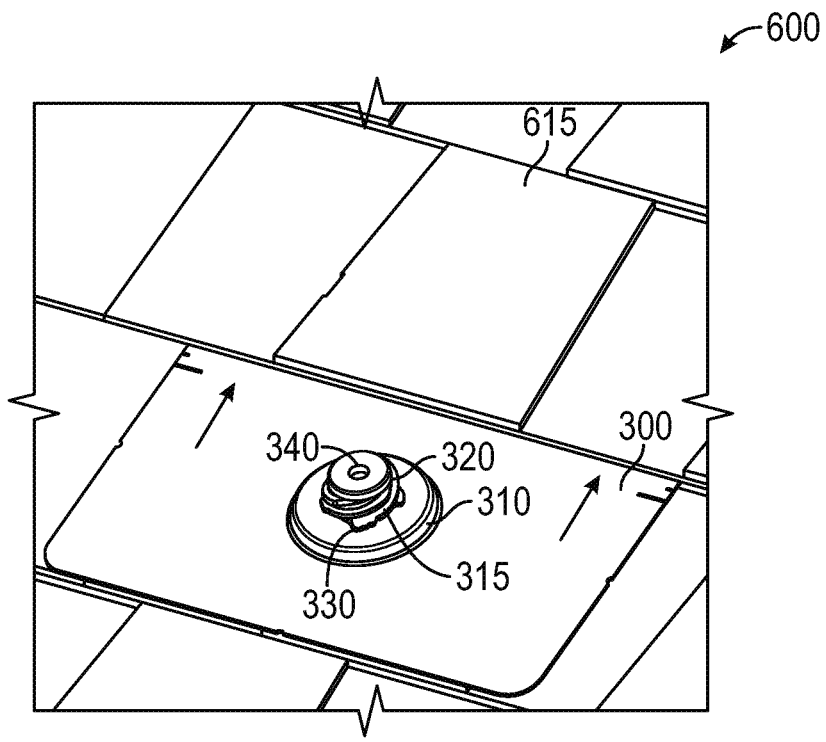
FIG. 13 illustrates a perspective view of the first step showing the flashing being inserted between the shingles of the roof.
Figure 14:
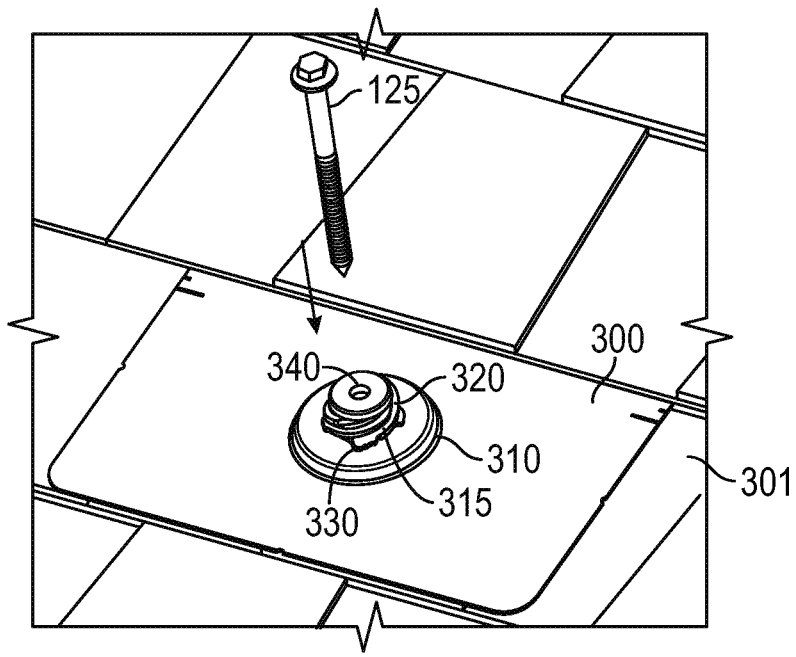
FIG. 14 illustrates a perspective view of the next step showing the screw with washer being inserted into the flashing to secure it to the roof.
Figure 15:
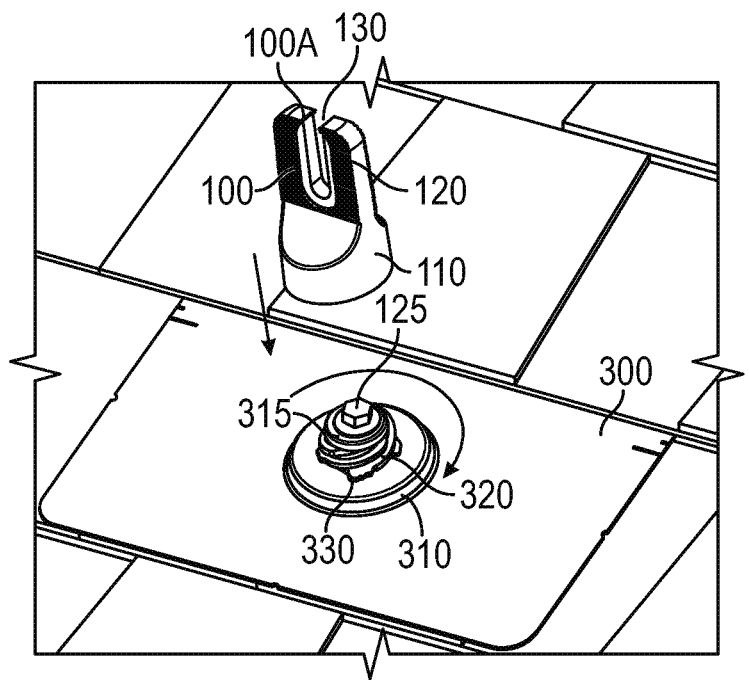
FIG. 15 illustrates a perspective view of the next step showing the bracket being lowered onto the flashing and turned in a clockwise direction along the threads to secure the bracket to the sealed flashing.
Figure 16:
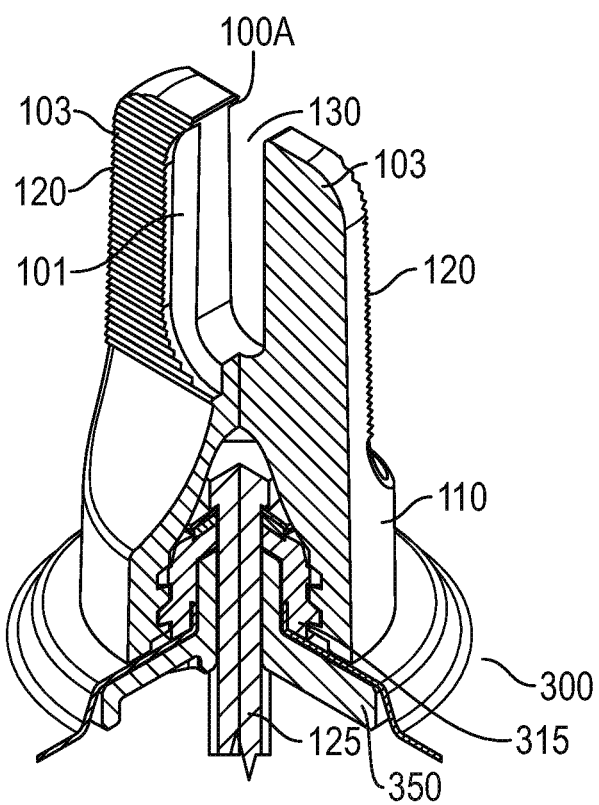
FIG. 16 illustrates a cross-sectional perspective view of the bracket being fully secured to the flashing.
Figure 17:
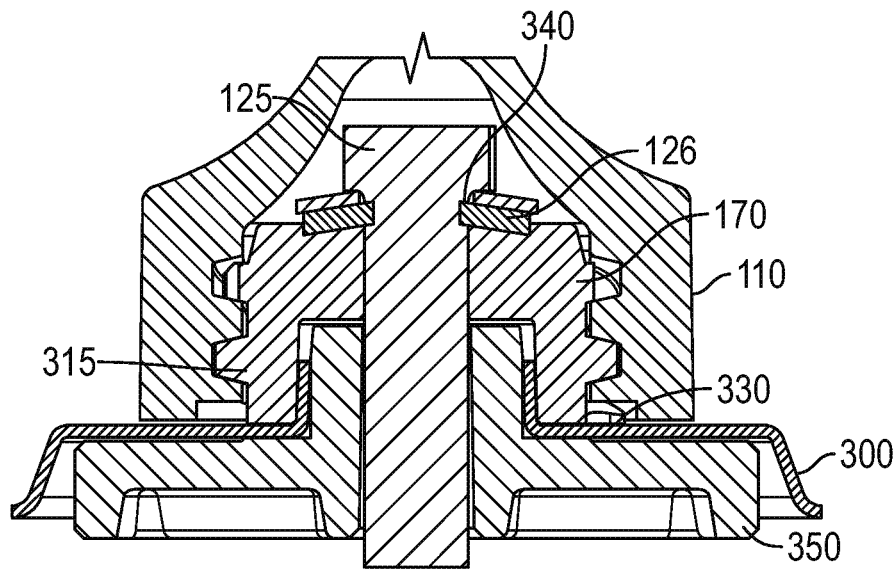
FIG. 17 illustrates a side cross-sectional view of the bracket and flashing in the secured position including the sealing details.
Figure 18:
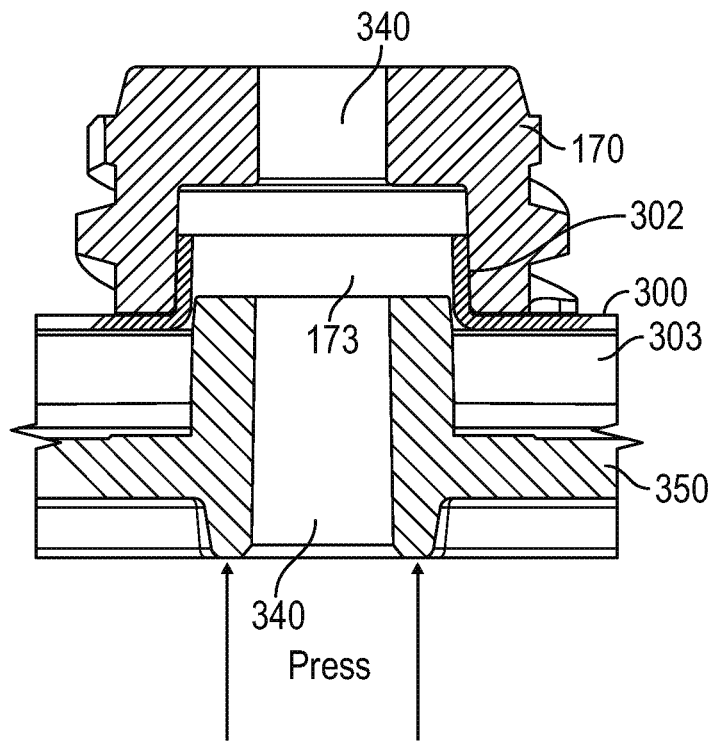
FIG. 18 illustrates a side cross-sectional view of the first step in the manufacturing process of the flashing showing the how the flashing is sealed by press fitting.
Figure 19:
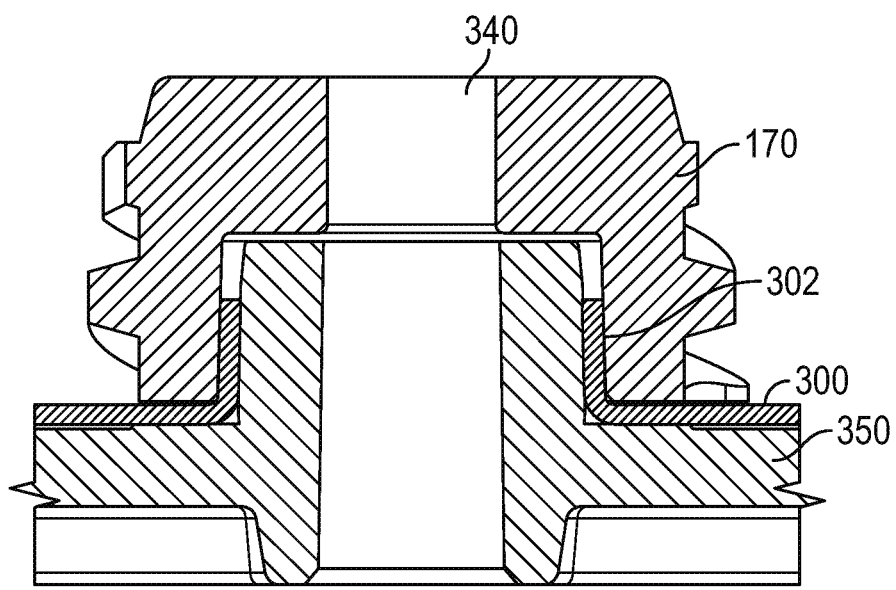
FIG. 19 illustrates a side cross-sectional view of the second step in the press-fitting process showing a sealed flashing.
Figure 20:
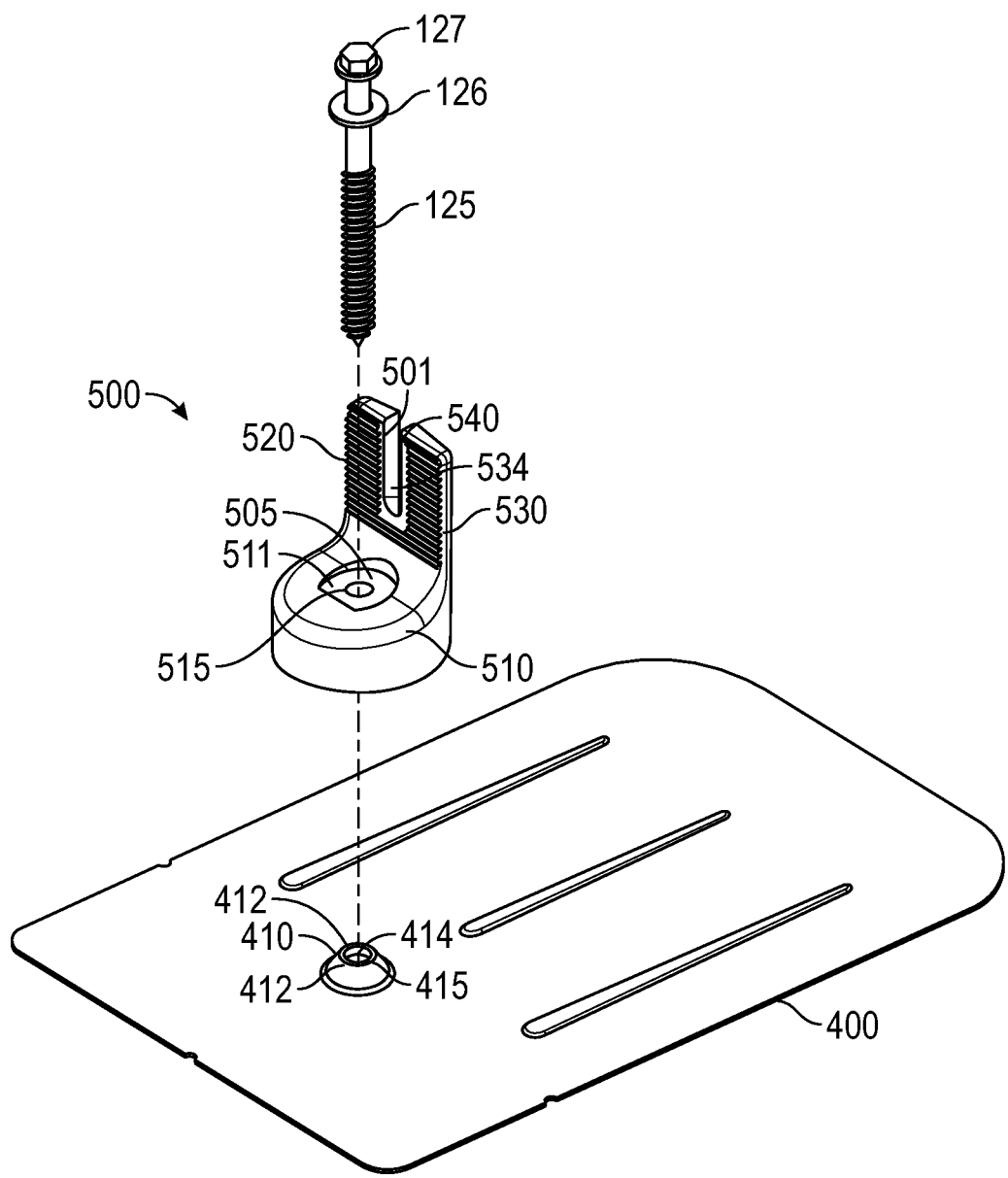
FIG. 20 illustrates an exploded view of an exemplary embodiment of an assembly of a flashing, bracket and fastener assembly.

FIG. 20 illustrates an exploded view of an exemplary embodiment of the invention. In this embodiment, a flashing 400 and a bracket 500 is shown. The flashing 400 includes a cone 410 that is embedded within the flashing 400. The cone 410 extends upward from the flashing 400 and tapers inward to a cone lip or edge 412 around the circumference at the top of the cone 410 that forms an opening 414. The bracket 500 is comprised of two primary elements—a base 510 and a generally U-shaped guide 530 that extends upward from the base 510. The base 510 is generally round but it can take on other shapes such as oblong and polygonal as will be described and illustrated below. The top portion of the base 510 comprises a recess 505 and an opening 515 in the middle of the recess 505. The area beneath the base 510 provides a space for receiving the cone 410. The assembly also includes a fastener 125. A washer 126 is slidably connected to the fastener 125. The screw 125 can be inserted into the opening 515 and is then bolted into the roof 600 to secure the bracket 500 to the flashing 400. The recess 505 includes a top surface 511 and provides adequate space for the head of the fastener 125 and the washer 126 to rest. The base 510 includes a recess 505 providing a flat area for the washer 126 and the fastener head 127 to land or seat. It is understood that any embodiments may include a base 510 with a flat top not requiring a recess 505.

The U-shaped guide 530, which is identical to the U-shaped guide shown in FIG. 5, forms a pair of members 503 extending from opposing sides of the base 510, which in turn forms an aperture 534. Aperture 534 also includes a recessed path 501 that terminates at a guide lip 540. FIG. 5 demonstrates how once a fastener such as nut and bolt 140 is dropped into the aperture 534, the path 501 allows the nut and bolt 140 to move along the path 501, but the guide lip 540 prevents the edge of the bolt 140A from slipping out of the aperture 534. Each side of the guide 530 also includes ridges 520 for providing added friction to help secure the bracket 500 to the rail guide 200 as shown in FIG. 5. As will be discussed in various embodiments below, the cone lip 412 may assume different shapes that will allow it to conform to various embodiments of structures within the base 510 of the bracket 500. The embodiments herein include brackets with generally U-shaped guides. It is understood that the guide 130 can include a closed topped aperture, a slotted opening or other opening appropriately sized and shaped to receive a connector to either directly connect a rail guide to the bracket 500 or some other intermediary bracket between the bracket 500 and the rail guide.

Figure 21:
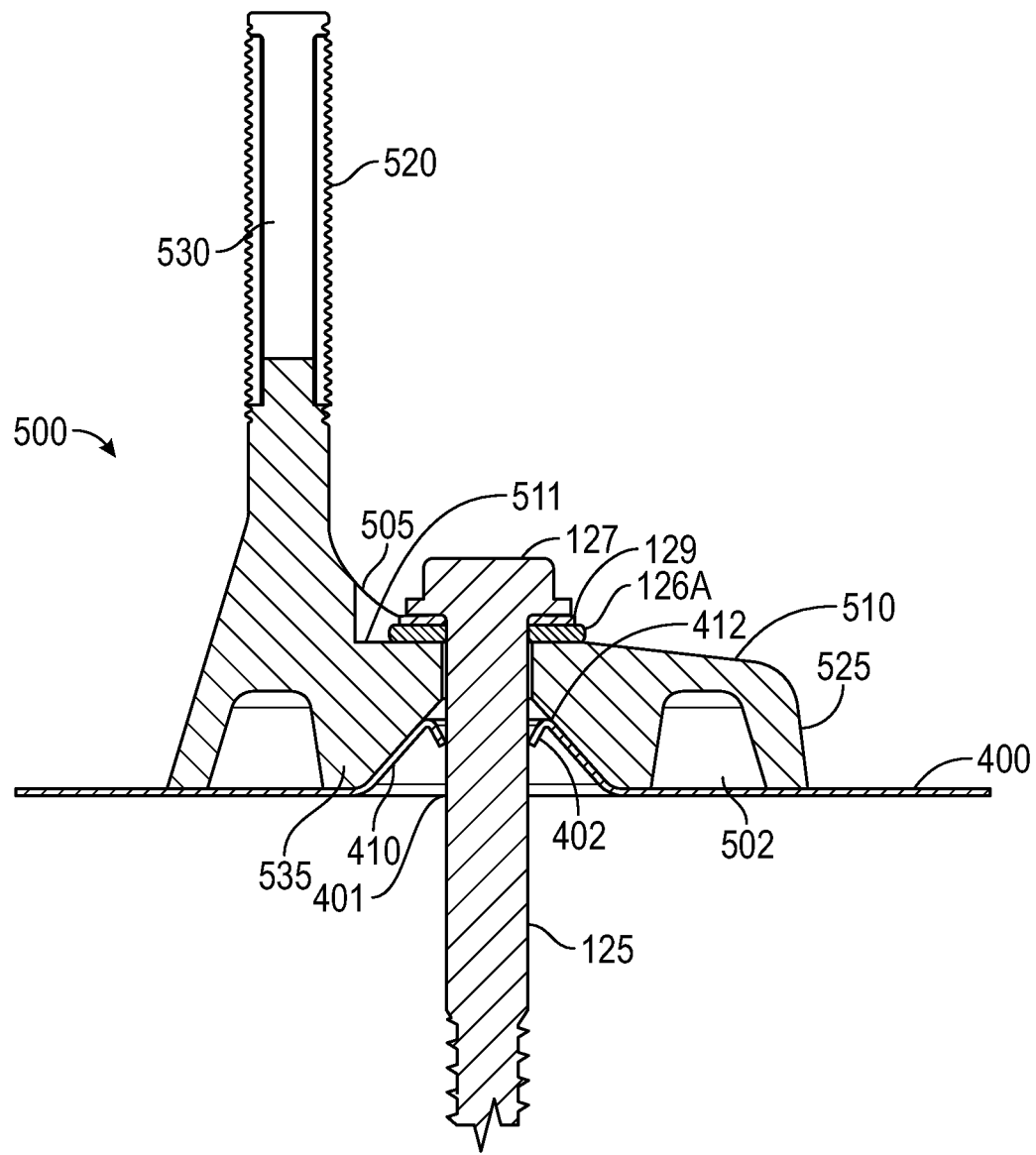
FIG. 21 illustrates a side cross-sectional view of the elements in FIG. 20 fully assembled.

FIG. 21 shows an assembled side cross-sectional view of the bracket 500. The inside of the bracket 500 is shaped to conform to the contour of the outer surface of the cone 410 and the cone lip 412 so that the bracket 500 can create an interference fit snug with the cone 410. This provides an advantage to an installer of the assembly as the bracket 500 will remain static without having to permanently secure the bracket 500 to the flashing 400. This enables the installer to permanently secure the assembly to the roof without having to hold the bracket 500 in place and without the bracket 500 accidentally rotating or falling off the bracket and possibly off the roof 600. In this embodiment, the cone lip 402 of the top edge 412 of cone 410 extends downward and inward toward the center of the opening 515. The washer 126 including a rigid portion 129 and a deformable portion 126A is also provided so that when the fastener 125 is inserted into the aperture 515, the washer 126 can fit within the recess 505 of the base 510 and create a water-resistant seal at the top surface 511 of the base 510 providing protection against water infiltration to the hole 401 in the roof 600 through the hole 515.

The cone lip 402 of the edge 412 also provides an interference fit around the outer surface of the fastener 125 to provide further water-resistance over the hole 401 in the roof 600. The base 510 also includes an outer shell 525 and an inner shell 535 that forms a void 502 between the shells 525 and 535. The outer shell 525 provides load distribution while the inner shell 535 and outer shell 525 both provide water resistance elements.

Figure 22:
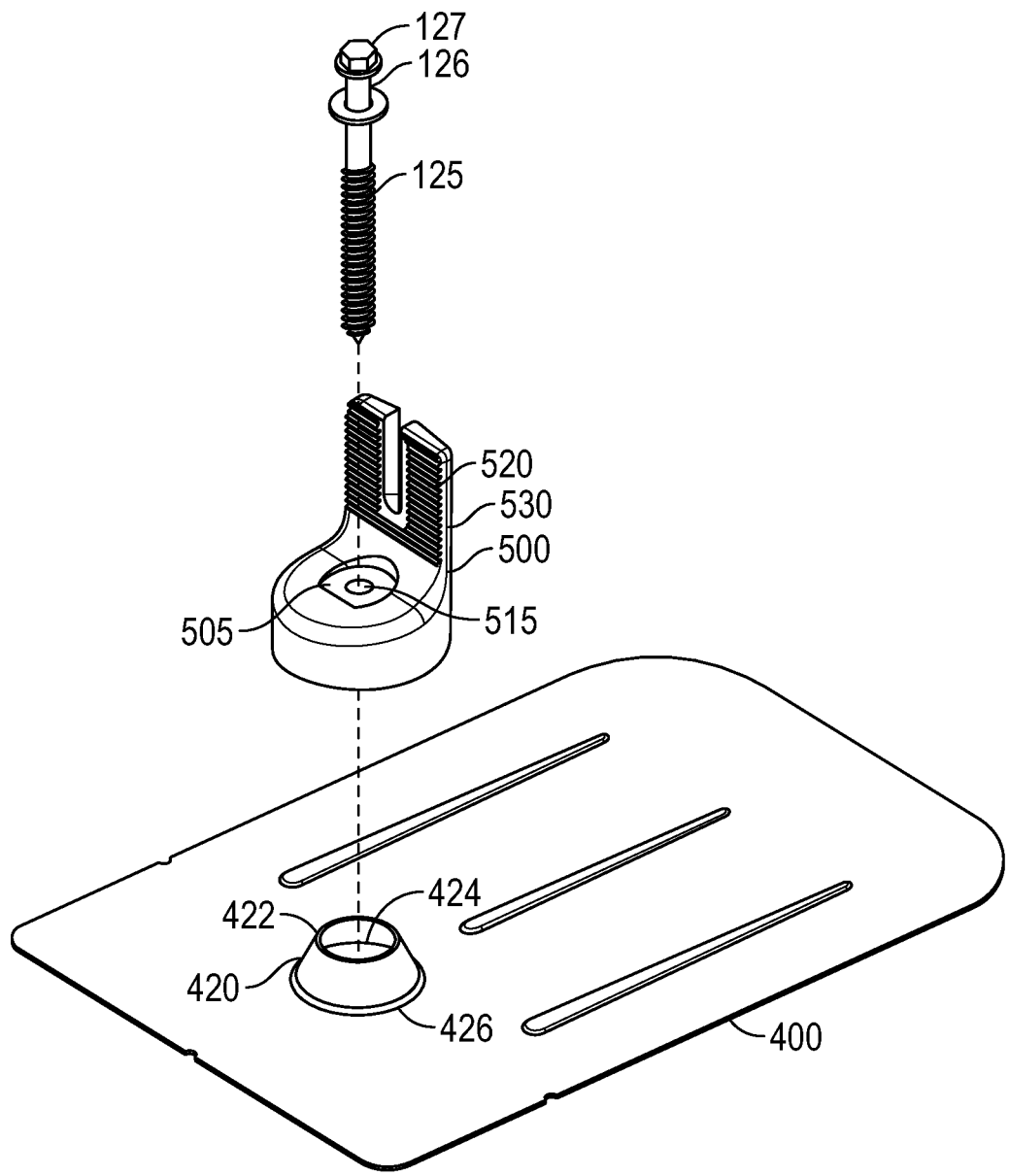
FIG. 22 illustrates an exploded view of an alternate exemplary embodiment of a flashing, bracket, and fastener assembly.
Figure 23A:
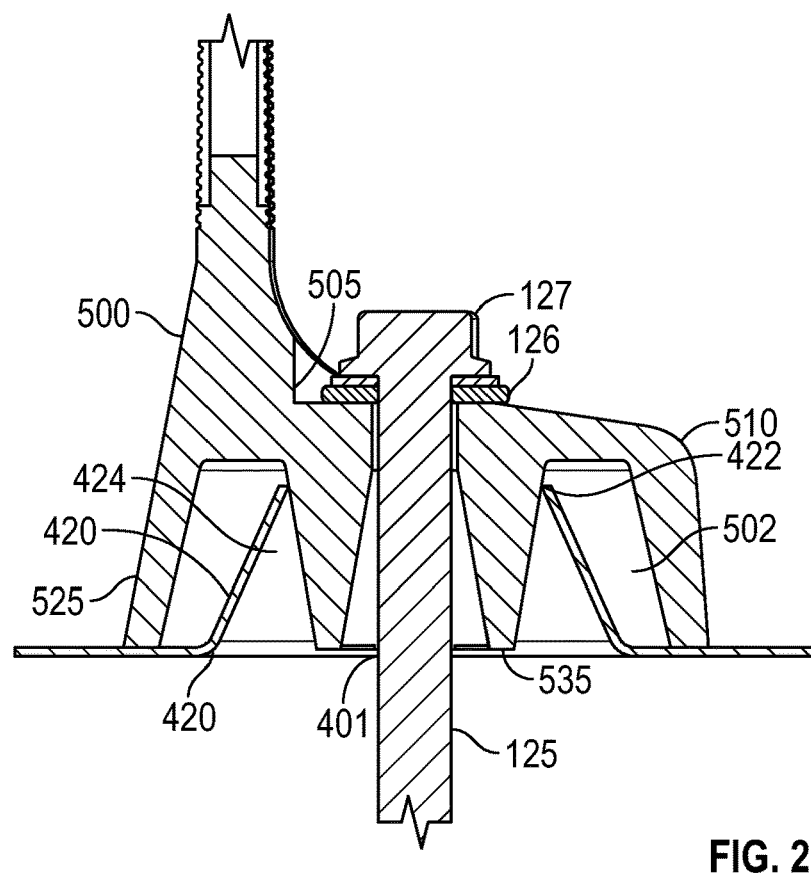
FIG. 23A illustrates a side cross-sectional view of the fully assembled elements in FIG. 22 with alternate embodiments of the base of the bracket and the flashing.
Figure 23B:
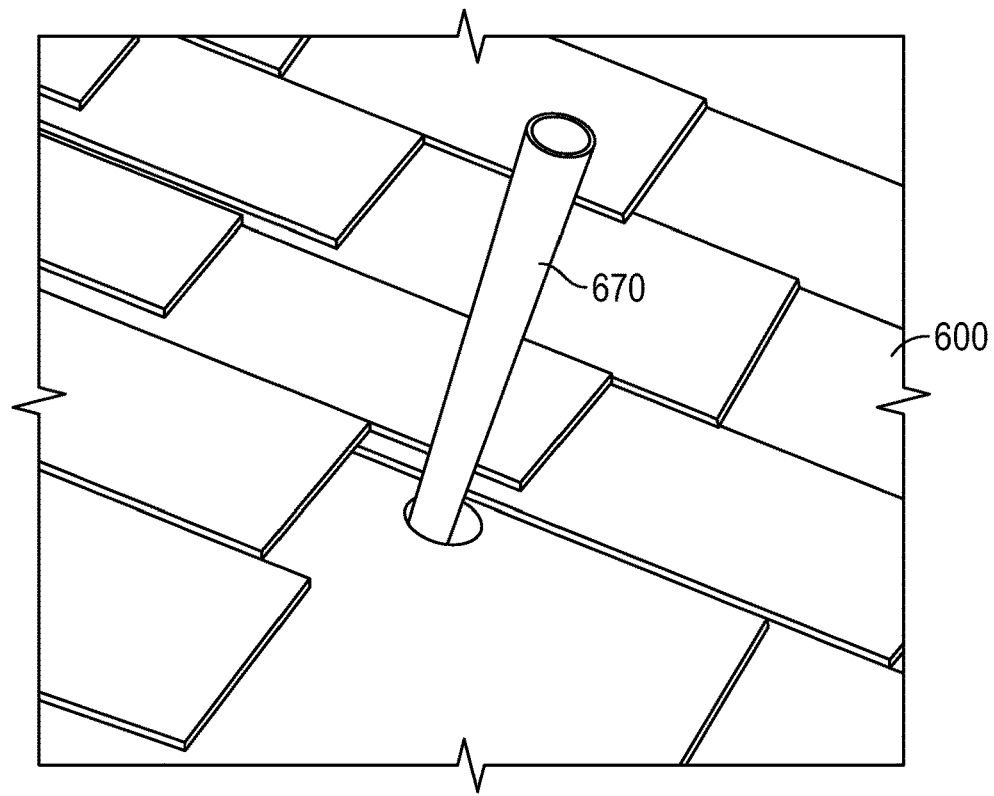
FIG. 23B illustrates a standard shingled roof with a conduit rising out of the roof.

FIGS. 22-23A and B illustrate a variation of the embodiment shown in FIGS. 20-21. As shown in FIG. 22, the flashing 400 includes a cone 420 that is embedded within the flashing 400 and extends upward from the flashing to a cone lip 422 around the circumference of at the top of the cone 420 that forms an opening 424. In this embodiment, the cone lip 422 forms a singular edge and the diameter of the opening 424 is large enough to accommodate conduit 670 as shown in FIG. 23B that emerges from the roof 600. The opening 424 in the cone 420 also provides the ability to view a previously created pilot hole 401 into the roof 600 that makes it easier to align the flashing 400 and the bracket 500 over the pilot hole 401. This feature is present in all the embodiments of the brackets discussed herein.

FIG. 23A illustrates a variation of the embodiment for bracket 500. The cone 420 fits within the void 502 between the inner and outer shells 525 and 535. The width of the inner shell 535 tapers conically downward from the top of the base 510 so that it creates an interference fit with the cone lip 422 when the bracket 500 is secured to the cone 420. By doing so, the interference fit creates a water-resistant seal to prevent water from entering the hole 401 of the fastener 125 in the roof 600. The interference fit also enables the bracket 500 to remain static, resisting separation from the flashing 400 and rotation around the cone 450 prior to permanent assembly of the bracket 500 and the flashing 400. This enables the installer to permanently secure the assembly to the roof without having to hold the bracket 500 in place and without the bracket 500 accidentally rotating around the cone 420 or falling off the flashing 400 and possibly off the roof 600. The washer 126 is also provided so that when the fastener 125 is inserted into the opening 515 of the bracket 500 and provides a seal to resist water from entering the hole 401 where the fastener 125 is inserted into the roof 600.

Figure 24A:
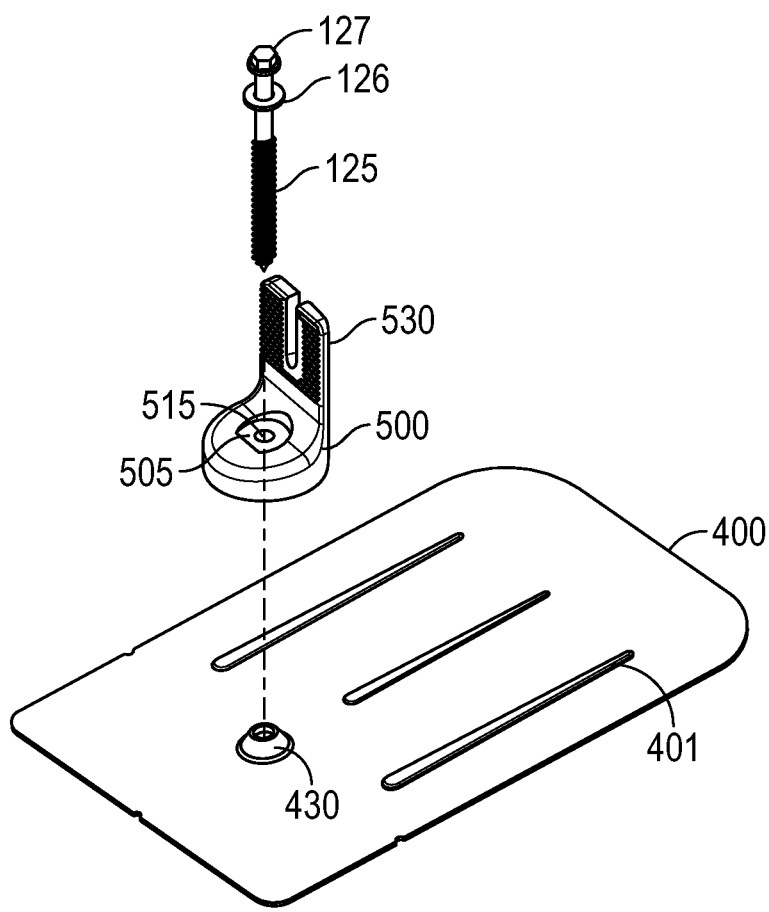
FIG. 24A illustrates an exploded view of an alternate exemplary embodiment of a flashing, bracket, and fastener assembly.
Figure 24B:
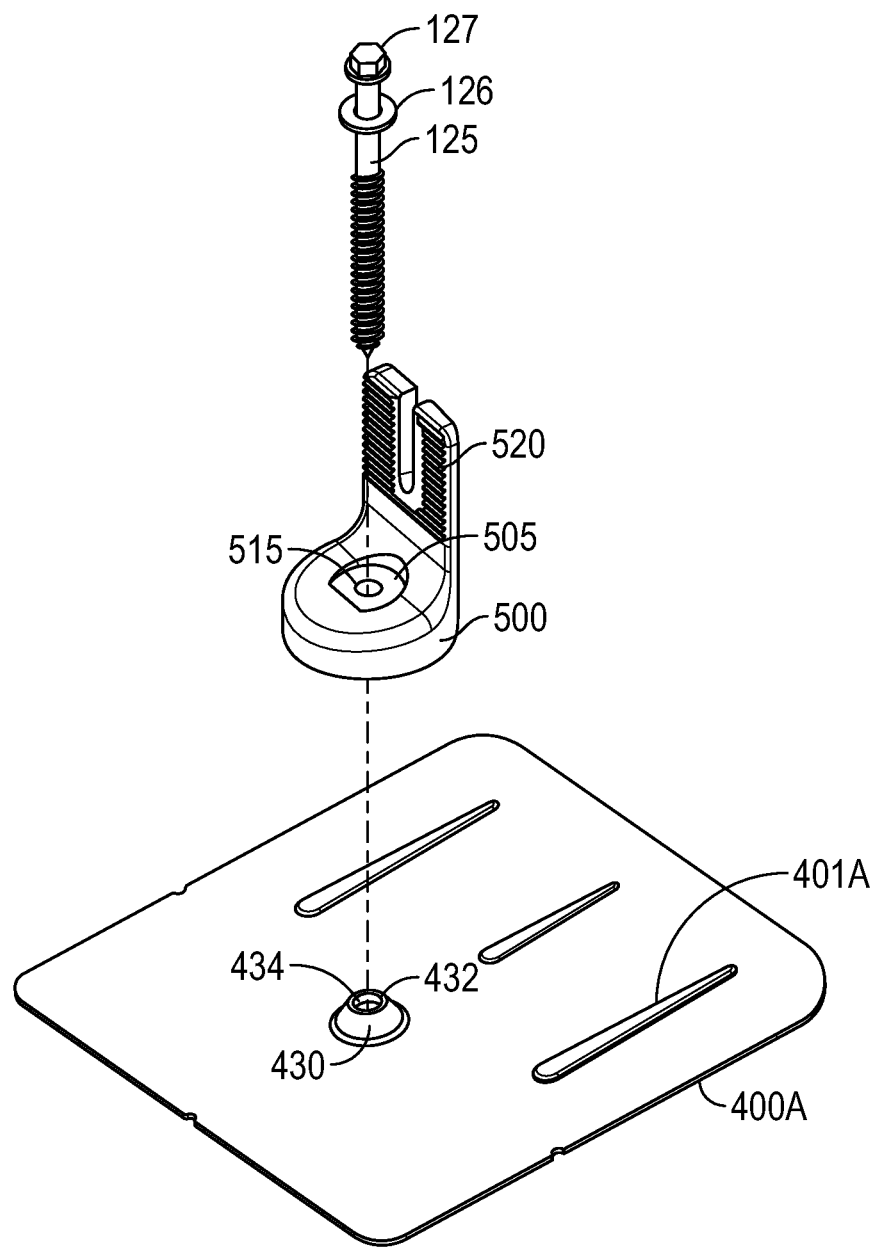
FIG. 24B illustrates an exploded view of the embodiment shown in FIG. 24 that utilizes a shortened flashing.

FIG. 24A illustrates another variation of the embodiment shown in FIGS. 22-23A and B. In this embodiment, the flashing 400 includes ribs 401 and an alternate exemplary cone 430 that are embedded within the flashing 400. FIG. 24B illustrates an exploded perspective view of the embodiment shown in FIG. 24A that shows an alternate exemplary embodiment of a shortened flashing 400A with shortened ribs 401A. The short flashing 400A enables the installer to bypass the traditional flashing installation which requires separating shingles and removing roofing nails in order to extend the top edge of the flashing up under the third course of shingles thereby creating what is commonly known as headlap. The third course of shingles is the second course above and on top of the flashing. Creating this headlap has historically been a critical waterproofing and water-shedding requirement of flashing penetrations in a shingle roof. Today with the predominance of architectural shingles that do not include keyways between tabs and the dramatic reduction in use of the lower cost, less durable three tab shingles, this requirement is no longer critical and the benefit of not separating shingles and removing nails outweighs the benefit of creating the headlap on every flashing. Where the headlap is required such as at the joints between shingles the standard roofing solution commonly known and used by roofers, is to add a supplemental small piece of flashing, often referred to as a card stock, to extend the flashing up under the course above.

Figure 25A:
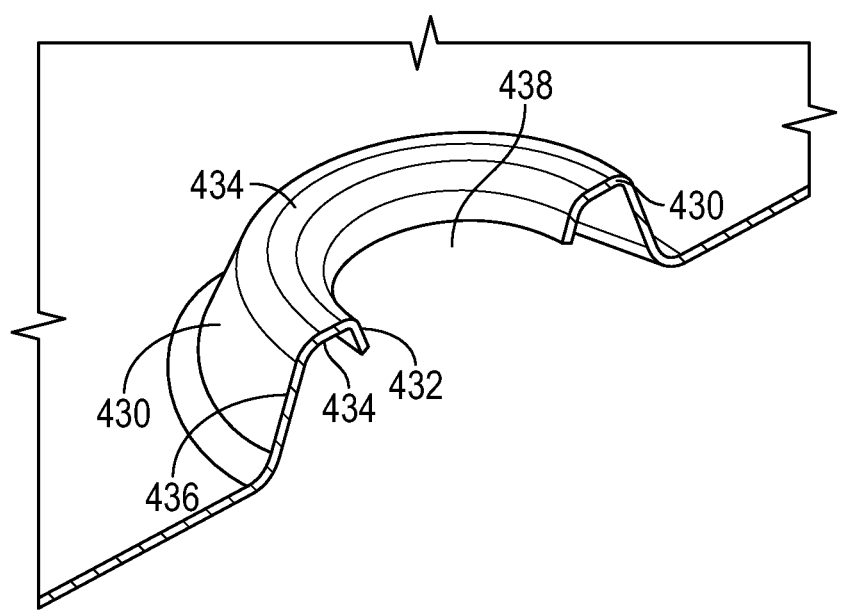
FIG. 25A illustrates a detailed perspective cross sectional view of the alternate exemplary embodiment of the cone with a rounded top surface.

As shown in FIG. 25A, a perspective cross-sectional detailed view of the cone 430 is shown. The cone 430 includes an outer surface 436 that extends upward from the flashing 400 and tapers inward to a top edge 434 with a cone lip 432 that tapers downward toward the center of an opening 438 formed by the circumference of the lip 432. The top edge 434 can be a single radius providing a fully rounded top or it can include a flat area at the apex of the cone as shown in FIG. 25A.

Figure 25B:
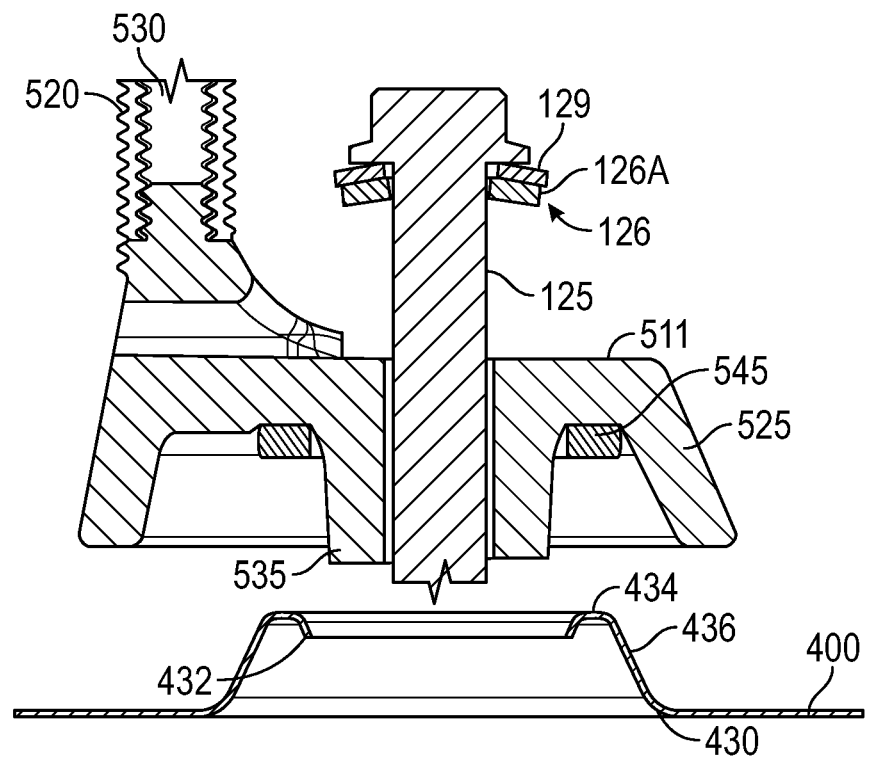
FIG. 25B illustrates an exploded side cross-sectional view of the embodiment shown in FIGS. 24A and B with the cone of FIG. 25A with an alternate embodiment of the lag seal and seal for use between the cone and the bracket.

FIG. 25B is an exploded side cross-sectional view of an exemplary embodiment including the flashing cone 430 shown in FIG. 25A that shows the cone 430, the bracket 500 and the fastener 125 separated and the deformable seals 126A and 545 as they are prior to assembly. This embodiment also includes an exemplary embodiment of the sealing washer 126. As shown, washer 126 includes both the lower rubber portion 126A and an upper rigid portion 129 that is positioned directly above the rubber portion 126A. The washer 126 prior to assembly is convex. The deformable seal portion 126A and the internal seal 545 are not compressed and have at least one greater dimension prior to assembly on the roof 600 and compression between their adjacent parts. The washer 126 can be a bonded sealing washer with the deformable portion 126A and the rigid portion 129 bonded together or the two parts can be separate or loose prior to assembly. These parts 126A and 129 can be used independently or together.

Figure 25C:
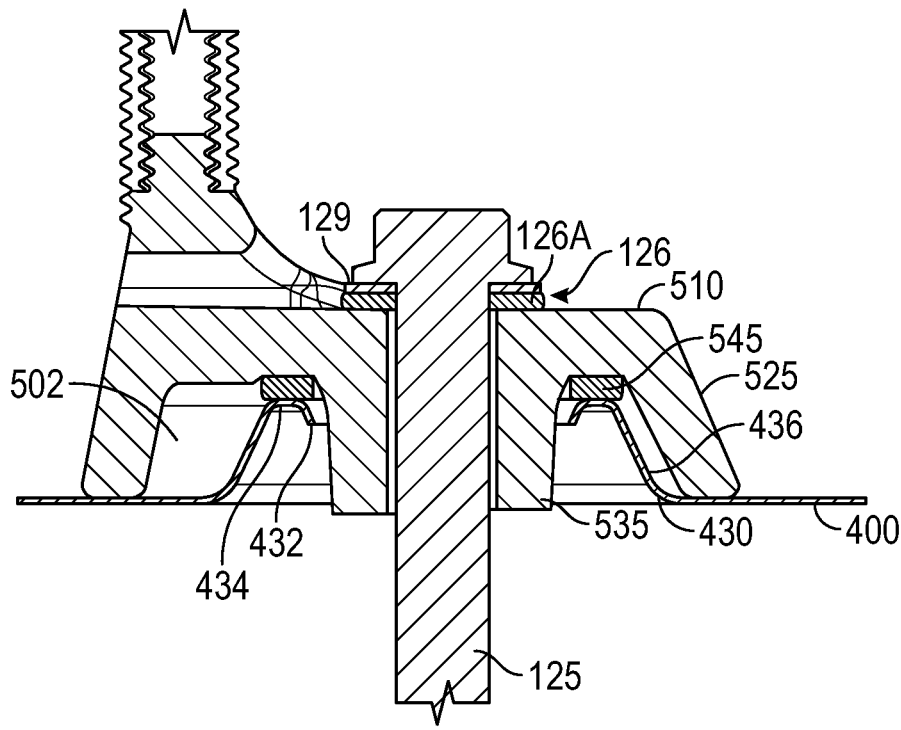
FIG. 25C illustrates a side cross-sectional view of the embodiment in FIG. 25B that is assembled.

FIG. 25C illustrates a side cross-sectional view of the assembled embodiment in FIG. 25B. As shown, when the fastener 125 is fully inserted and tightened, the mount assembly is fully installed and assembled, the rigid portion 129 flattens and compresses the rubber portion 126A against a top surface 511 of the base 510 and an outer surface of the fastener 125, so that it bulges at its outer edges, and seal 545 is a gasket that is compressed between the top inside surface of the void or cavity 502 and the top edge 434 of the flashing cone 430 to create a water-resistant seal preventing water from infiltrating the roof through the hole 401 in the roof 600. In FIGS. 25B and 25C the lip 432 does not contact the inner shell 535, but this embodiment could include the resistance fit between lip 432 and shell 535 and provide the benefits described above by the resistance fit of the bracket 500 on the flashing cone 420.

Figure 28:
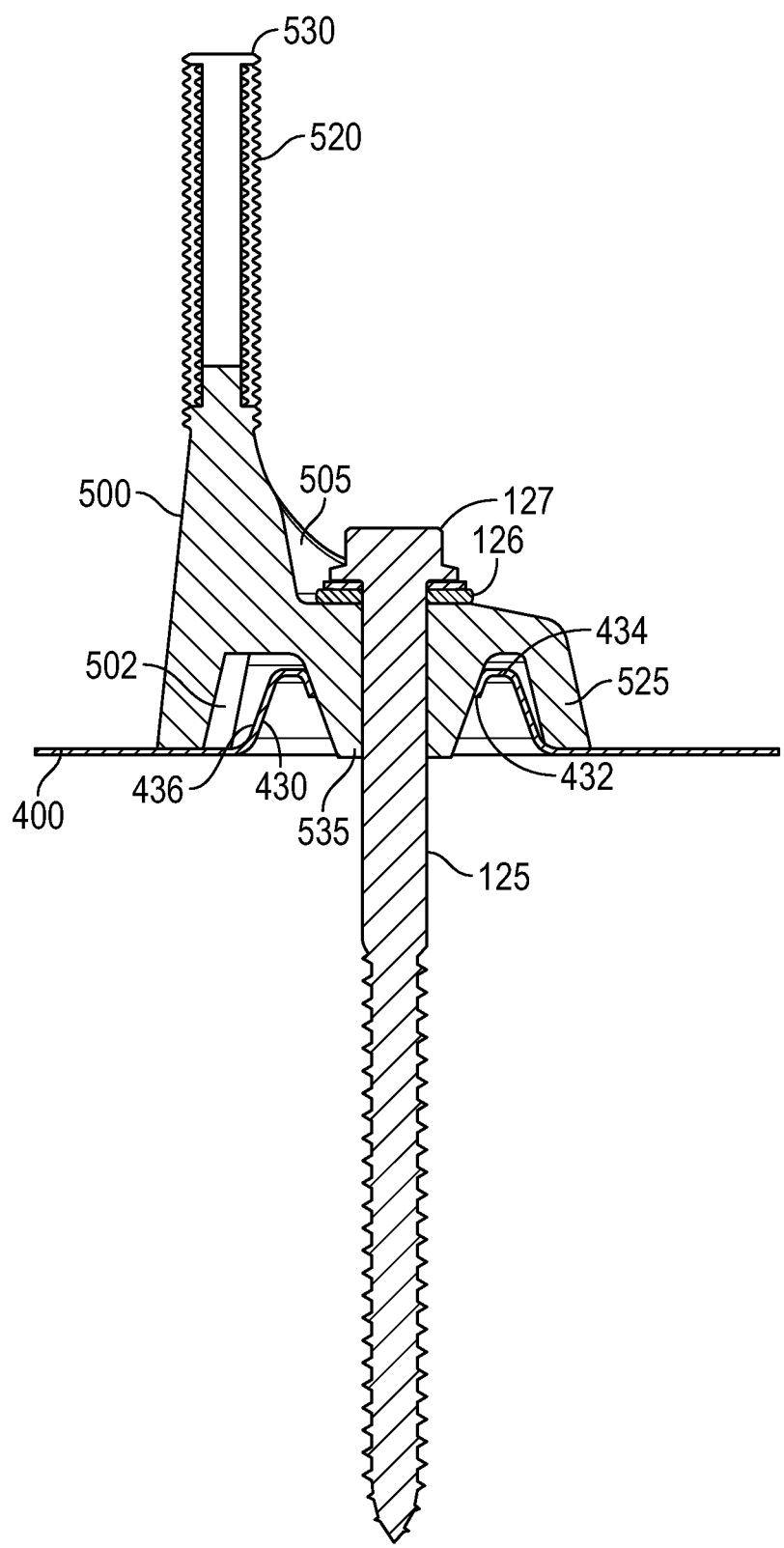
FIG. 28 illustrates a side cross-sectional view of the fully assembled elements in FIGS. 24A and B-25A-C and 27 with an alternate embodiment of the flashing.
Figure 29:
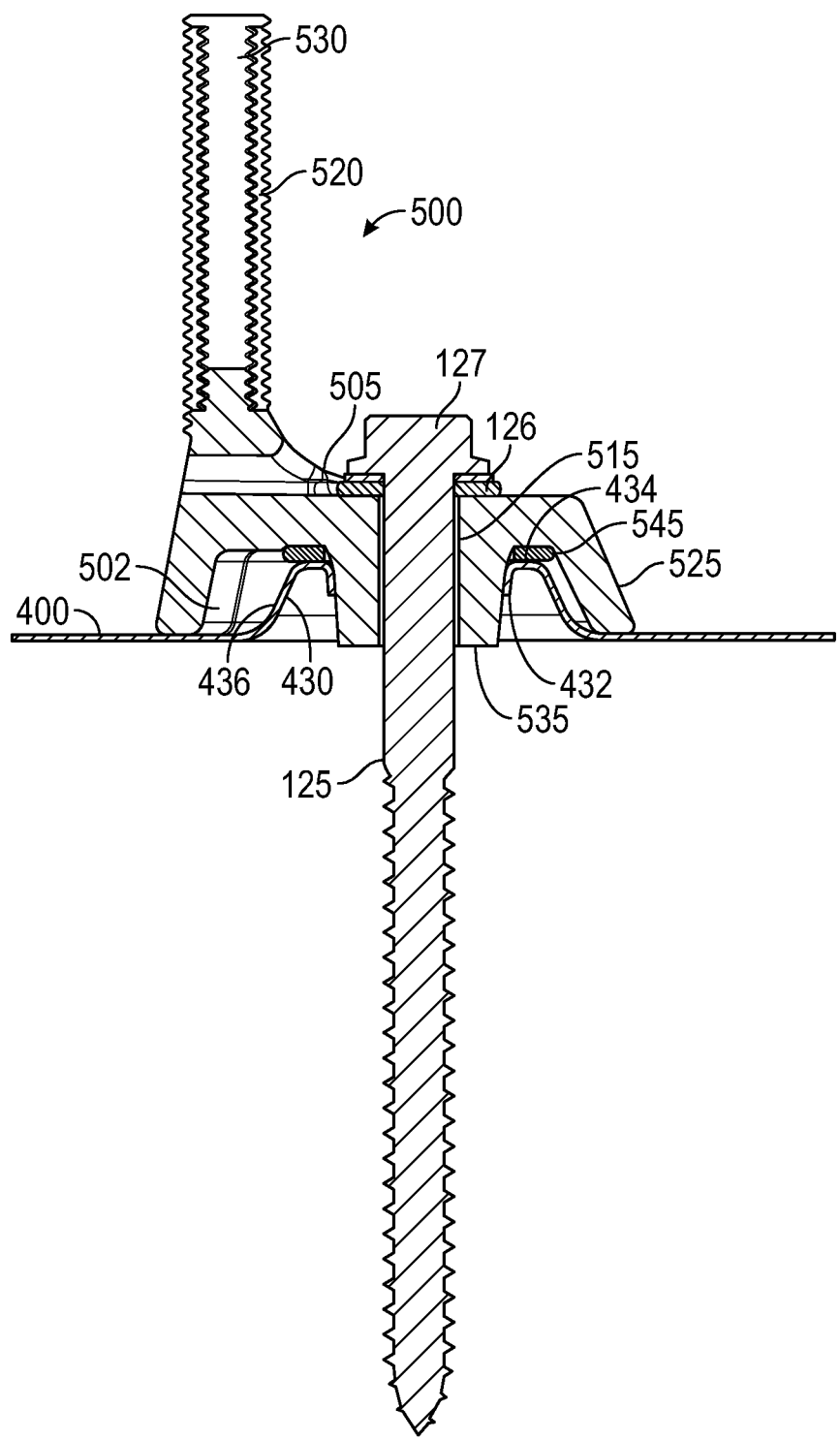
FIG. 29 illustrates a side cross-sectional view of an alternate embodiment of the fully assembled elements in FIG. 28 with an alternate flashing seal provided.

A front cross-sectional view of the assembled bracket 500 is shown in FIG. 26 with the perspective and bottom angled views of the bracket 500 shown in FIG. 27. In FIG. 26 the seal 545 is absent. Various embodiments may either include or exclude the seal 545. As shown in FIG. 27, the bracket 500 includes an outer shell 525 and an inner shell 535. The inner shell 535 tapers downward and inward from the top of the interior of the base 510. The space between the outer shell 525 and inner shell 535 forms the void 502. In this embodiment, the cone 430 fits within the void 502 of the bracket 500. The inner shell 535 is shaped to fit directly into the opening 438 of the cone 430 and conform to the rounded top edge 434 and the cone lip 432 of the cone 430. This is accomplished by including the downward-facing tapered inner shell 535 with an opening 515 for enabling the fastener 125 to pass directly through it. The interference between the outer surface of the inner shell 535 and the cone lip 432 of the cone 430 not only creates a water-resistant seal, it also enables an installer to secure the bracket 500 so that it will neither dislodge from or rotate around the cone 430 of the flashing without having to first secure it with a separate connecting means. This allows the bracket 500 to remain fixed in place until it can be further secured with the fastener 125. FIG. 28 illustrates a side cross-sectional view of the bracket 500 shown in FIG. 26. FIG. 29 illustrates the same side cross-sectional view that includes an internal seal 545 that provides additional water-tight sealing capabilities. The seal 545 is generally disc/washer-shaped and is positioned between the inner upper surface of the base 510 of the bracket 500 and the top surface 434 of the cone 430. Many embodiments herein include flashing cones, such as cone 430, that extend upwards into voids or recesses, for instance 502, some embodiments include a gasket or seal between the top of the cones and an upper surface of the voids or recesses, such as seal 545. It is understood that any appropriate embodiments herein can either include or exclude the gasket or seal.

Figure 30:
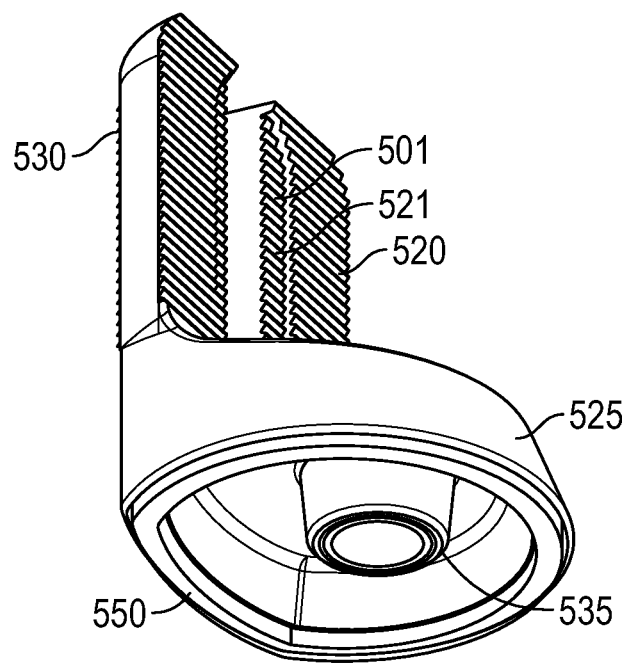
FIG. 30 illustrates a bottom perspective view of an alternate embodiment of the bracket.
Figure 31:
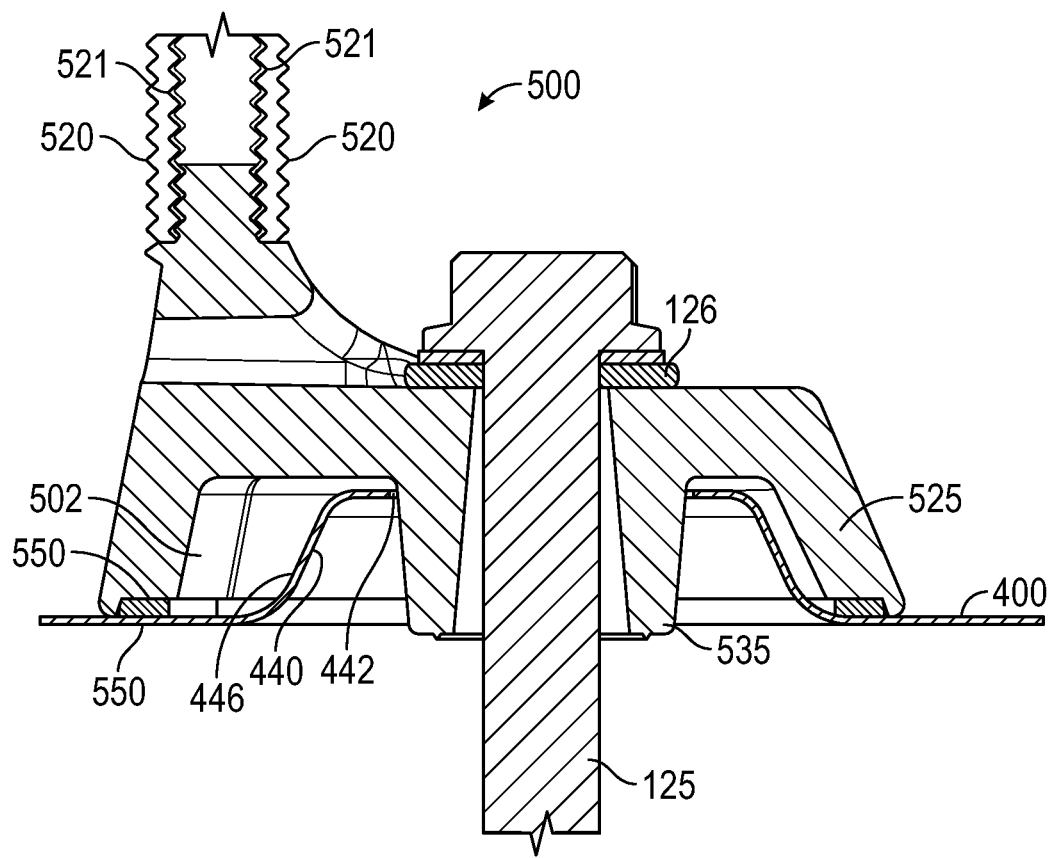
FIG. 31 illustrates a side cross-sectional view of the bracket of FIG. 30 with an alternate embodiment of the flashing that is fully assembled.

FIG. 30 illustrates a bottom perspective view, and FIG. 31 illustrates a side cross-sectional view of an alternate embodiment of the bracket 500. In this embodiment, an outer shell seal 550 is located on a bottom surface of outer shell 525. The seal 550 is a gasket between a bracket bottom surface and the top surface of the flashing and can be embedded within the bottom of the perimeter of the outer shell 525. The outer shell seal 550 is compressed between the bracket 500 and the flashing 400 and provides an additional water-resistant seal preventing water infiltration into the roof 600 through the hole 401. The outer shell seal 550 can be used on the outer shells 525 of any of the embodiments of the brackets 500 described herein. An added element shown in this embodiment of the bracket 500 are a plurality of ridges 521 on the inner recessed path 501 of the vertical U-shaped guide 530. The ridges 521 provide greater traction between the securing nut 140 as shown in FIG. 5, and the guide 530 is configured to prevent vertical movement when the nut 140 secures the rail guide 200 to the bracket 500. This feature can also be included on all embodiments of the brackets 500 provided herein. Also shown in FIG. 31 is an alternate embodiment of a cone 440 of the flashing 400. In this embodiment, the cone 440 includes an outer surface 446 that extends upward from the flashing 400 and an edge 442 that extends toward the center of the bracket 500 parallel to the flashing 400. In this embodiment, the edge 442 provides an interference fit parallel to the flashing 400 with the inner shell 535 when the bracket 500 is secured to the flashing 400.

FIGS. 30-31 illustrate an embodiment including a gasket or seal, such as seal 550, between a portion of a bottom surface near the perimeter of a bracket base, such as the bottom of shell 525 of base 510 of bracket 500 and a top surface of a flashing, such as flashing 400. It is understood that any appropriate embodiments herein can either include or exclude a corresponding gasket or seal.

Figure 32:
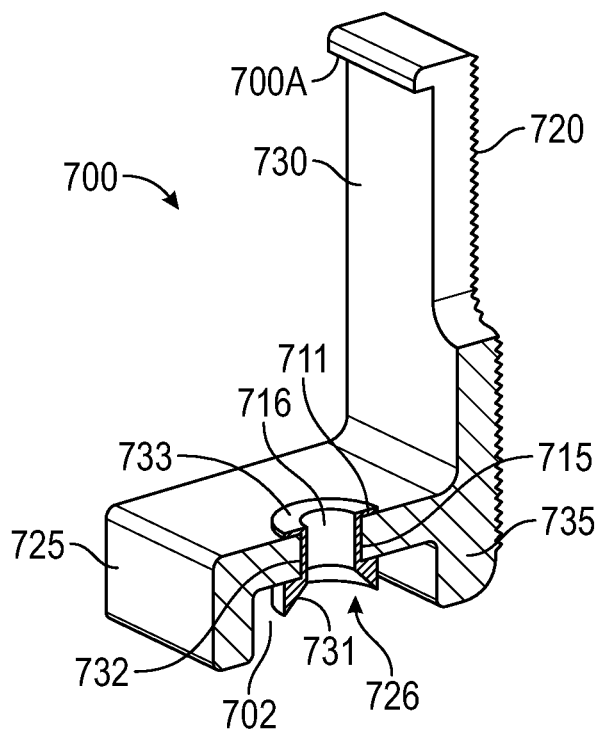
FIG. 32 illustrates a perspective cross-sectional view of an alternate embodiment of a traditional L-foot bracket shown in FIG. 2.
Figure 33:
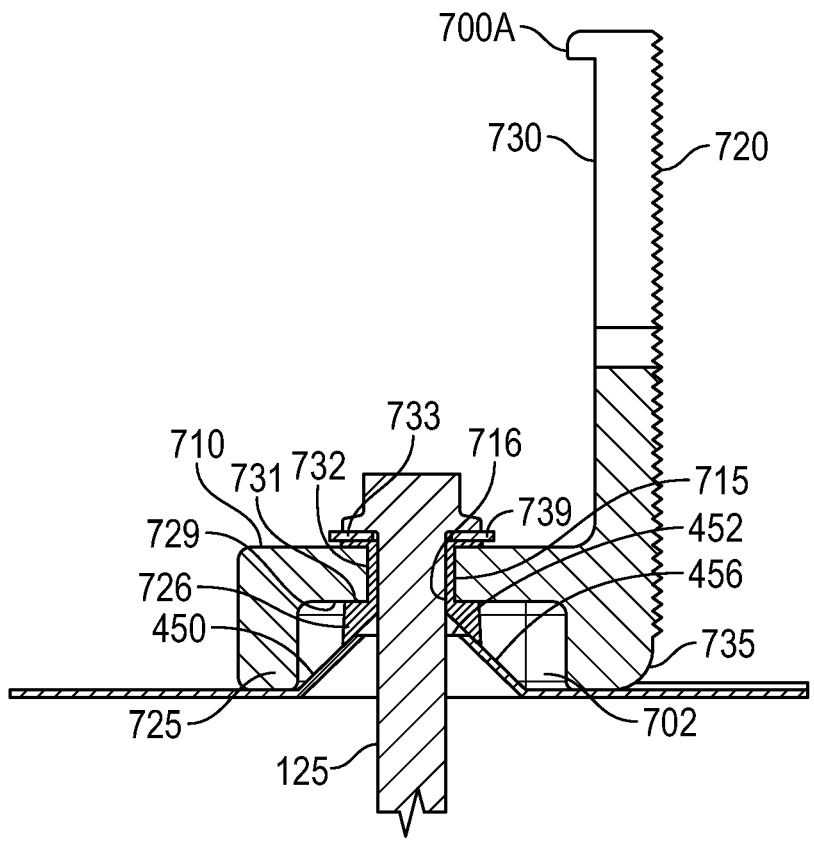
FIG. 33 illustrates a side cross sectional view of the L-foot bracket shown in FIG. 32 that is fully assembled to an alternate embodiment of the flashing.

FIGS. 32 and 33 show a perspective and side cross-sectional view respectively of an L-Foot bracket 700. As shown in FIG. 32, the bracket 700 includes a base 710 that includes a central opening 715, a front leg 725 and a rear leg 735. Like the bracket 500, the L-foot bracket 700 includes a U-shaped guide 730 that extends upward from the rear of the base 710. The U-shaped guide 730 includes ridges 720 on the outer surface of the guide 730 and a lip 700A. The base 710 of the bracket 700 includes a void 702 beneath a base 710. As shown in FIG. 33, The L-Foot bracket 700 includes a preformed rubber or other suitable deformable material seal 726 that can be pre-assembled into the central opening 715 of the bracket 700. The preformed deformable seal 726 has a flange portion 733 that contacts a top surface 711 of the base 710, a generally cylindrical central portion 732 that sits within the central opening 715 of the base 710, a lower portion 731 that is within the void 702 of the base 710, and a through hole 716 that extends through the flange portion 731, the central portion 732 and the lower portion 731. The through hole 716 includes an upper cylindrical portion and a lower upward tapering recess. The lower upward tapering recess of the through hole 716 of the seal 726 conforms to a conical upward tapering outer surface 456 of a cone 450. The cone 450 terminates at an edge 452. When assembled, the fastener 125 is inserted through the through hole 716 of the seal 726 and through the cone 450. By doing so, this secures the bracket 700 to a roof 600 and compresses the seal 726 against the outer surface of the fastener 125, the outer surface 456 and the edge 452 of the cone 450, the top surface 711 of the bracket base 710, a bottom surface of a washer 739, an inside surface of the opening 715, and an inside surface 729 of the void 702 to create a water-resistant closure within the bracket 700. The top surface 711 of the base 710 where the flange portion 733 of the seal 727 sits can be recessed or counterbored to provide a cavity that conforms to the size and shape of the flange portion 733, such that when the flange portion 733 is compressed appropriately, the washer 739 contacts the surrounding area of the top surface of the base 710.

In FIGS. 32 and 33, the cone 450 and the lower recess of the seal 727 are shown with consistently tapering sides shown in cross sectional view as straight or flat sides, however the sides can be curved or rounded, convex or concave, consistent, non-consistent or varying tapering sides. These interacting parts conform in shape and size to each other in such a way that when the apparatus is fully assembled the outer surface 456 of the cone 450 and the inside surface of the tapering recess of hole 716 can contact and create a seal that resists water or moisture.

In FIGS. 32 and 33 the embodiment is shown with a front leg 725 and a rear leg 735. The base 710 can also include side legs that are perpendicular to and extend between the front leg 725 and the rear leg 735 thus forming an enclosed inner cavity within the base 710, which can be orthogonal, rounded, symmetrical or asymmetrical and accommodates the lower portion 731 of the seal 727 and the cone 450 of the flashing 400.

Figure 34:
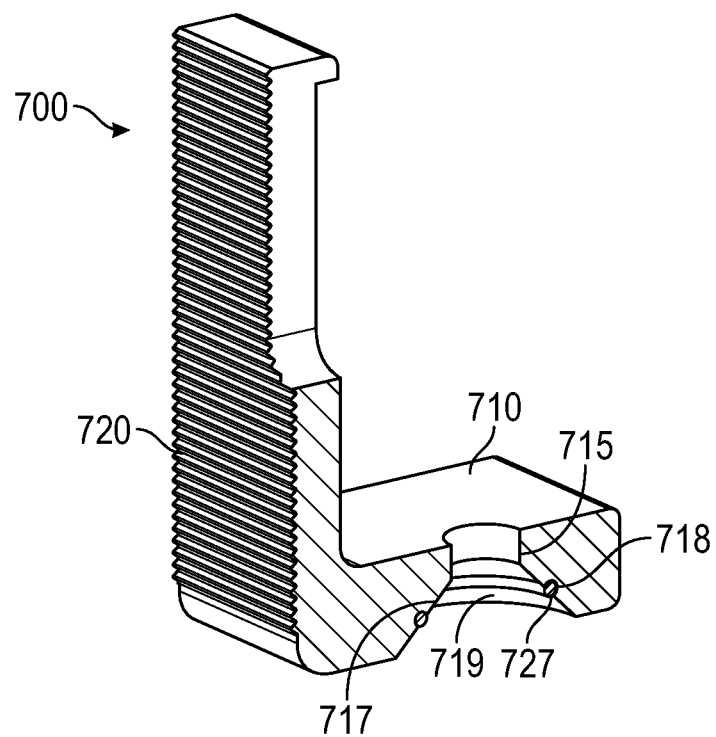
FIG. 34 is a perspective cross-sectional view of another exemplary embodiment of a traditional L-foot bracket.
Figure 35:
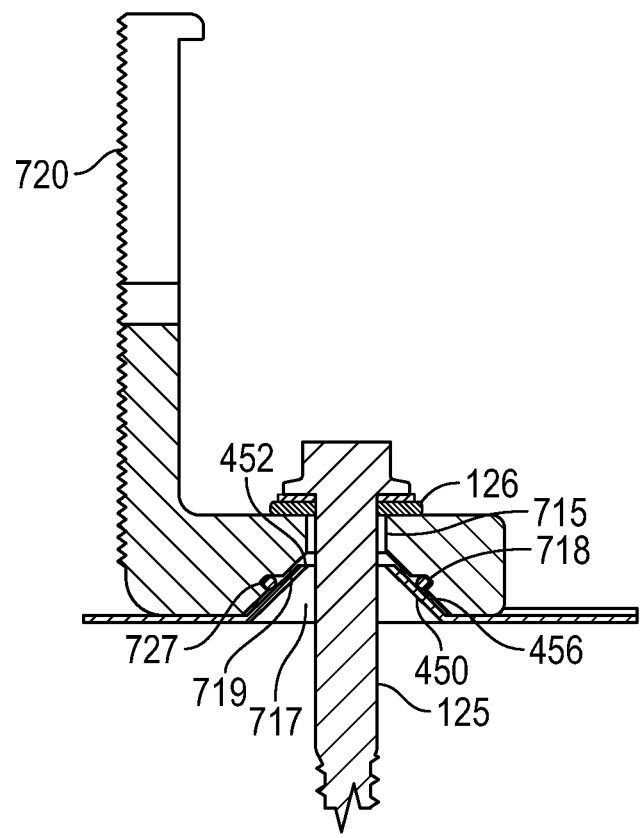
FIG. 35 is a side cross-sectional view of the L-foot bracket in FIG. 34 that is fully assembled to an alternate embodiment of the flashing.

FIGS. 34 and 35 illustrate perspective and side cross-sectional views respectively of another exemplary embodiment of the L-foot bracket 700. As shown in FIG. 34, in this embodiment, the base 710 includes a conical void 717 that tapers upward from the bottom of the base 710 to cylindrical opening 715 which extends upward to the top of the base 710. The conical void 717 includes a ring-shaped seal 727 that forms a seal around the circumference of a portion of the inner surface 719 within the conical void 717 of the base 710 when it is secured to the cone 450. The ring-shaped seal 727 can be preassembled in a recess 718 of the inner surface 719 of the base 710. The ring-shaped seal 727 and the recess 718 seen in cross sectional view can be round as shown in FIGS. 34 and 35 or can be any other suitable shape that allows the seal 727 to conform to the recess 718 and create a seal by contacting and compressing against the outer surface 456 of the cone 450. FIG. 35 illustrates a fully assembled system that shows the inner surface 719 of the base 710 conforming to the cone 450 of the flashing 400. As can be seen, when the fastener 125 is inserted through the washer 126, the opening 715, and the hole though the flashing cone 450 and tightened, the ring-shaped seal 727 presses against the outer surface 456 the cone 450 and creates a water-resistant seal between the cone 450 and the base 710 of the bracket 700. The washer 126 forms another seal at the top of the base 710 when the fastener 125 is fully tightened as described in more detail regarding FIG. 25C.

In FIGS. 34 and 35, the cone 450 and the void 717 are shown with consistently tapering sides shown in cross sectional view as straight or flat sides, however the sides can be curved or rounded, convex or concave, consistent, non-consistent or varying tapering sides. These interacting parts conform in shape and size to each other in such a way that when the apparatus is fully assembled the outer surface 456 of the cone 450 and the ring-shaped seal 727 contact and create a seal that resists water or moisture.

In FIGS. 32 through 35, the brackets 700 are shown with ridges 720 and lips 700A on one side of the upward extending body portions or guides 730 of the bracket 700. However, these brackets 700 can also have the ridges, raised portions and or serrations 720, the lips 700A, and the recessed paths with or without ridges on either or both sides of the guides 730.

Figure 36:
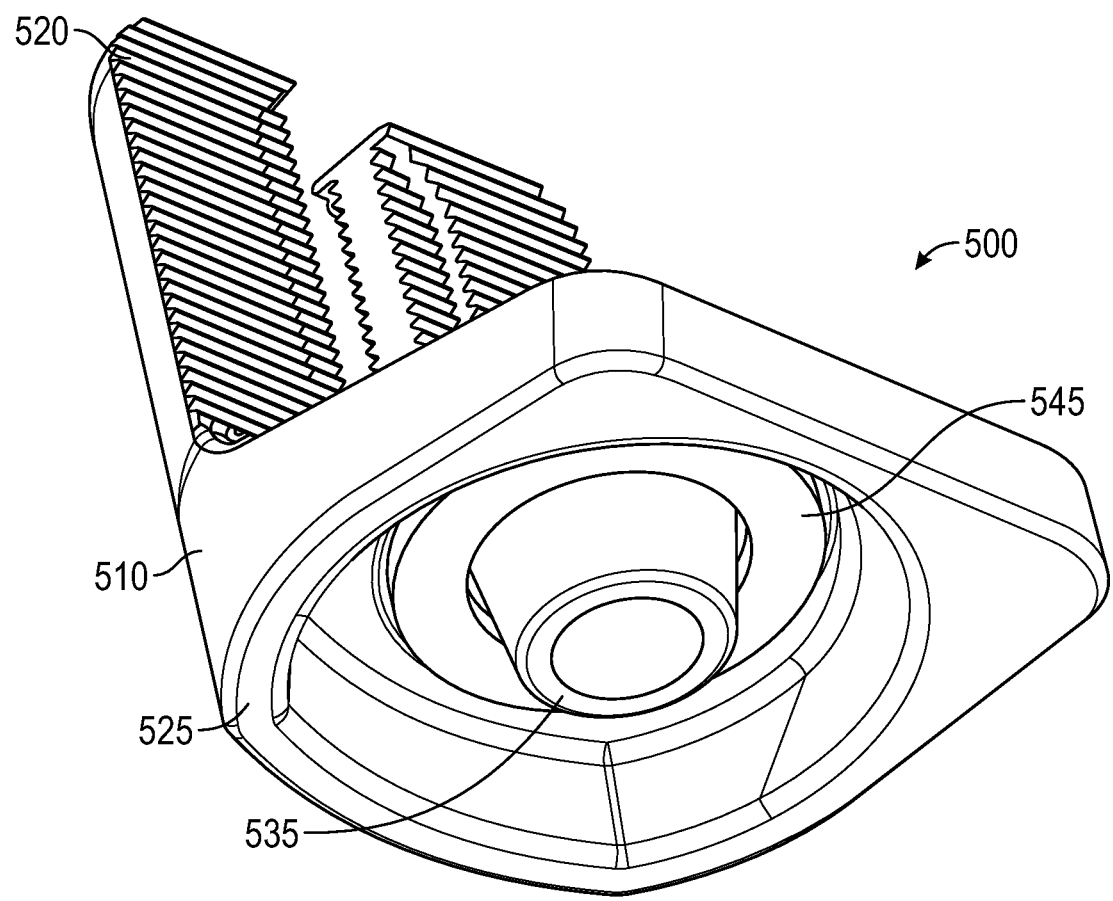
FIG. 36 is a bottom perspective view of an alternate embodiment of the bracket.

FIG. 36 illustrates an alternate embodiment of the bracket 500. As shown in the bottom perspective view of the inside of the base 510 of the bracket 500, the internal seal 545 can be preassembled to the upper surface of the base 510 and fits over the inner shell 535. Internal seal 545 is a preformed deformable seal that acts as a gasket between the bracket 500 and the flashing 400.

Figure 37:
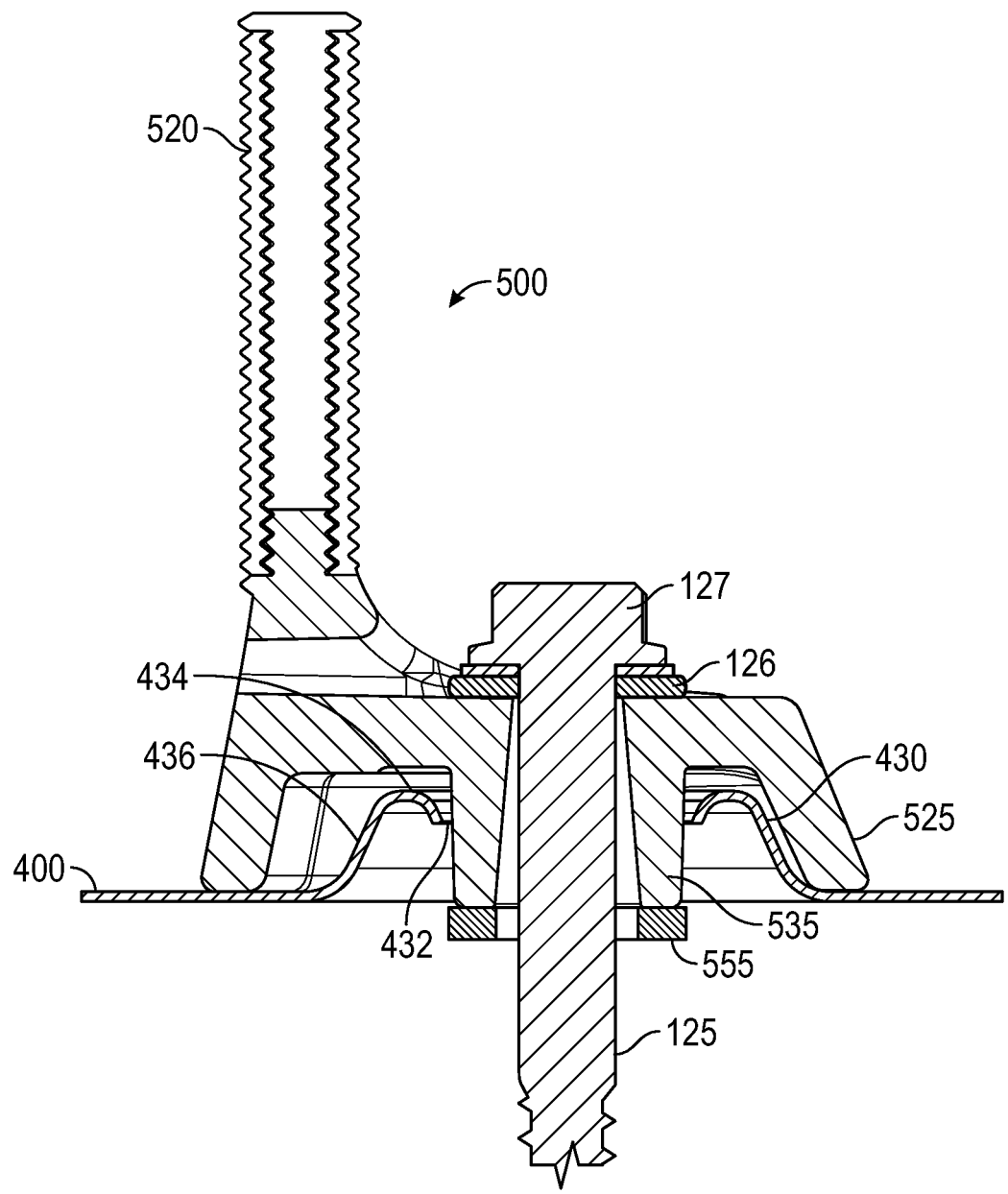
FIG. 37 is a side cross sectional view of an alternate embodiment of the bracket and the flashing that is fully assembled.
Figure 38:
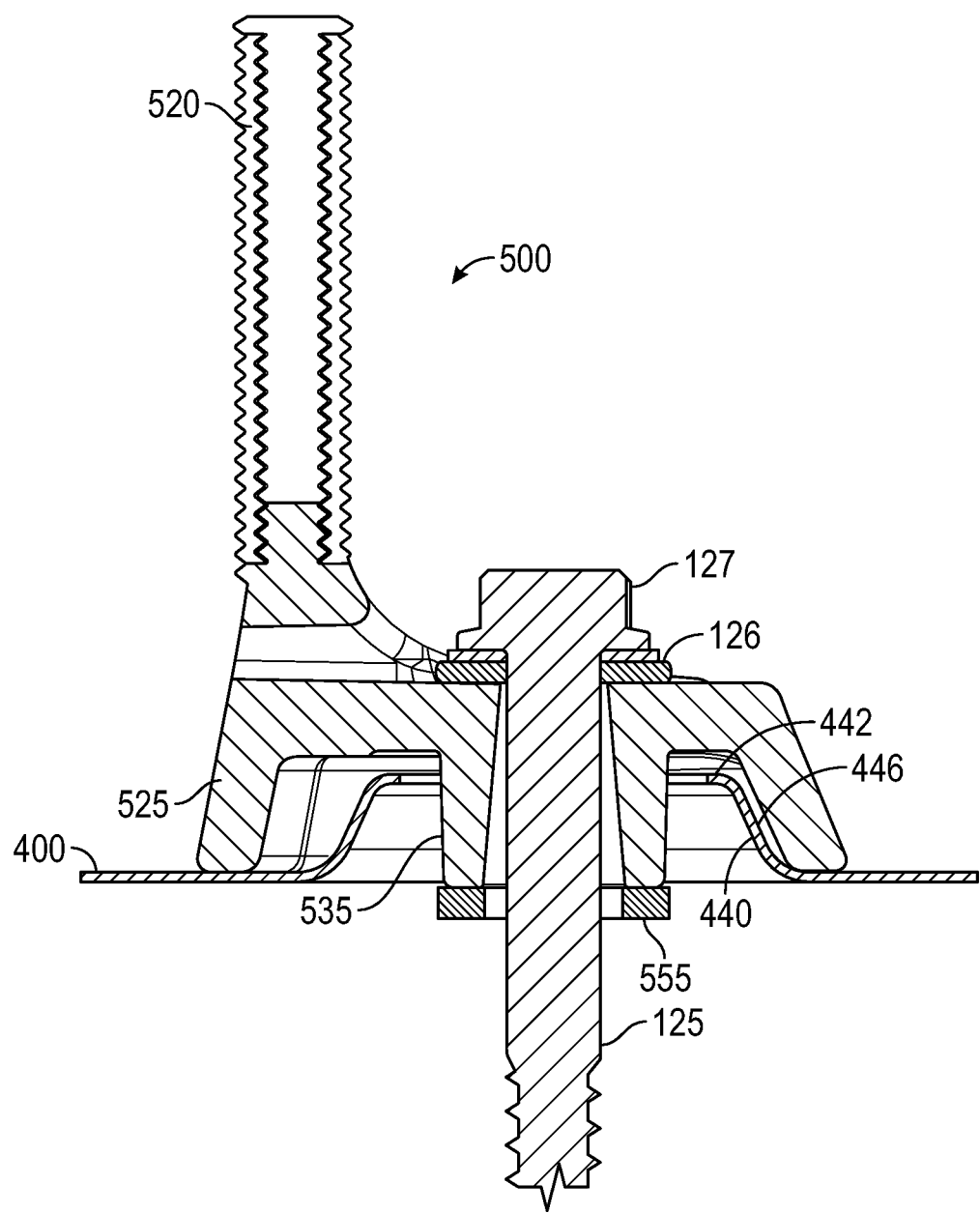
FIG. 38 is a side cross sectional view of the bracket of FIG. 37 with an alternate embodiment of the flashing that is fully assembled.

FIGS. 37 and 38 each illustrate a side cross-sectional view of another exemplary embodiment of the bracket 500. The bracket 500 includes preformed deformable seal 555 that is secured to the bottom surface of the inner shell 535 within the base 510 of the bracket 500. The preformed seal 555 can be rubber or any polymeric material that is deformable and compressible and can be secured either by using an adhesive or by inserting a portion of or an extending portion of the seal 555 into a recess or recesses on the bottom of the inner shell 535 thereby creating an interference fit between them. When the assembly is fully installed or assembled seal 555 provides a water-resistant closure between the bracket 500 and the roof 600 within the flashing cone 430. FIG. 37 illustrates an embodiment that utilizes cone 430 as shown in FIGS. 25-26 with the soft edge 432 of the cone 430 contacting the tapered portion of the inner shell 535 of the bracket 500. FIG. 38 illustrates an embodiment that utilizes cone 440 as shown in FIG. 31 wherein the edge 442 of the cone 440 is open to avoid contact with the inner shell 535 of the bracket 500. Generally all embodiments herein could either include or exclude the feature whereby the contact and conforming fit between the cone lip or top edge of the cone and the inner shell creates a resistance fit that provides the benefits as discussed above of resisting separation or dislodging of the bracket from the flashing and rotation of the bracket around the cone prior to the permanent assembly of the apparatus on the roof. Generally all embodiments herein that include an inner shell 535 can include or exclude a seal 555 at the bottom of shell 535.

Figure 39:
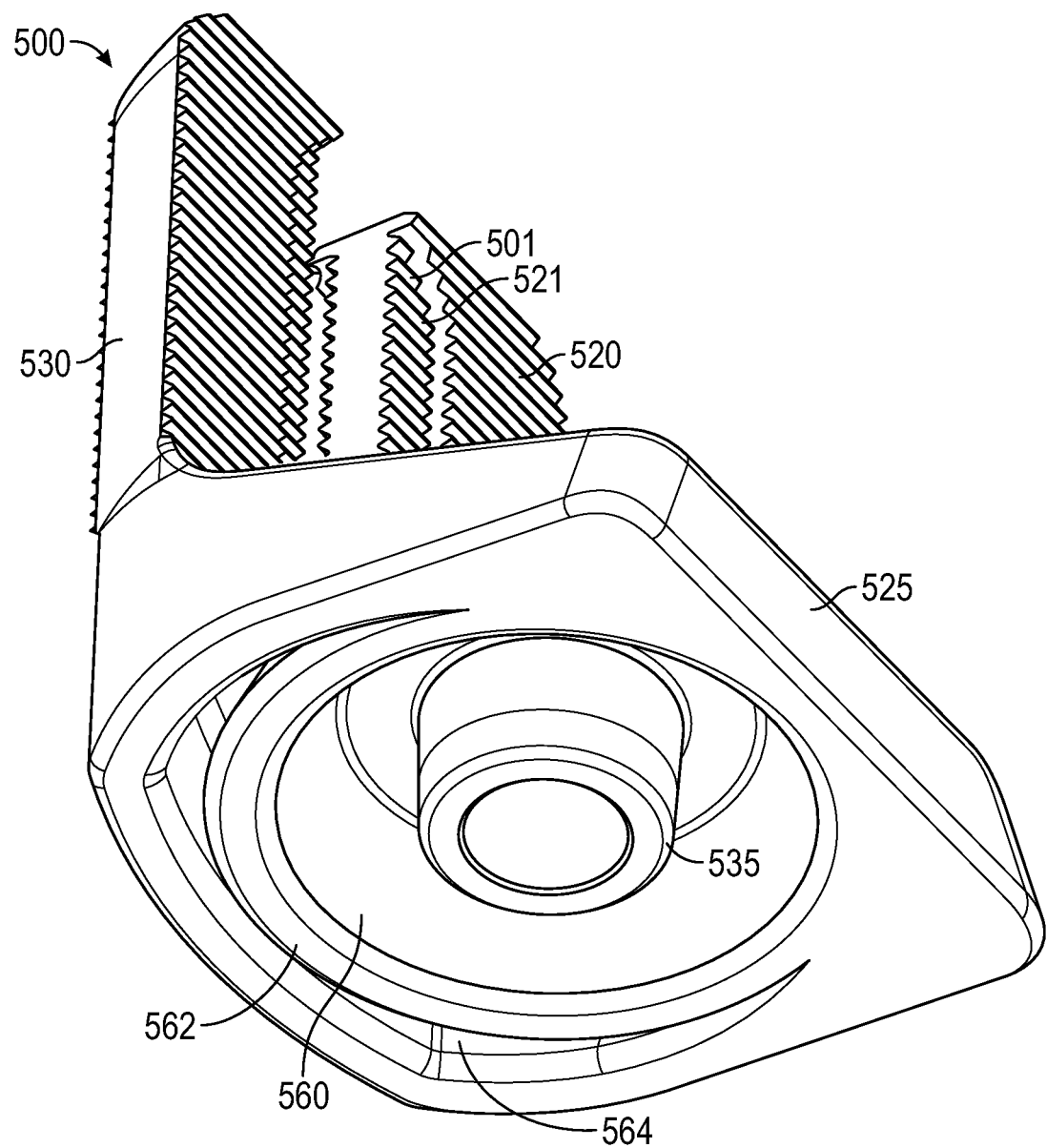
FIG. 39 is a bottom perspective view of an alternate embodiment of the bracket.

FIG. 39 illustrates a bottom perspective view of another exemplary embodiment of a bracket 500. In this embodiment, a secondary concentric internal ring 560 is provided within the base 510 of the bracket 500. The ring or shell 560 extends radially from the front of the base 510 toward the rear of the base 510 to form a circular shell 560 that may border an additional cavity 564. Shell 560 is capable of conforming to the outer surface of, for example, cone 440 when the bracket 500 is secured to the flashing 400. As illustrated in the perspective view of FIG. 40, an alternate embodiment of the flashing 400 is shown wherein, a seal 449 that can be made of rubber or other suitable deformable material and preassembled on to the flashing 400 at the outer perimeter of the cone 440. The ring 560 can also include a recess 562 for receiving the seal 449. When the assembly is fully installed or assembled, the seal 449 is compressed between the flashing 400 and the circular shell 560. This use of the seal 449 can be utilized with any of the flashing and bracket assemblies described herein.

Figure 40:
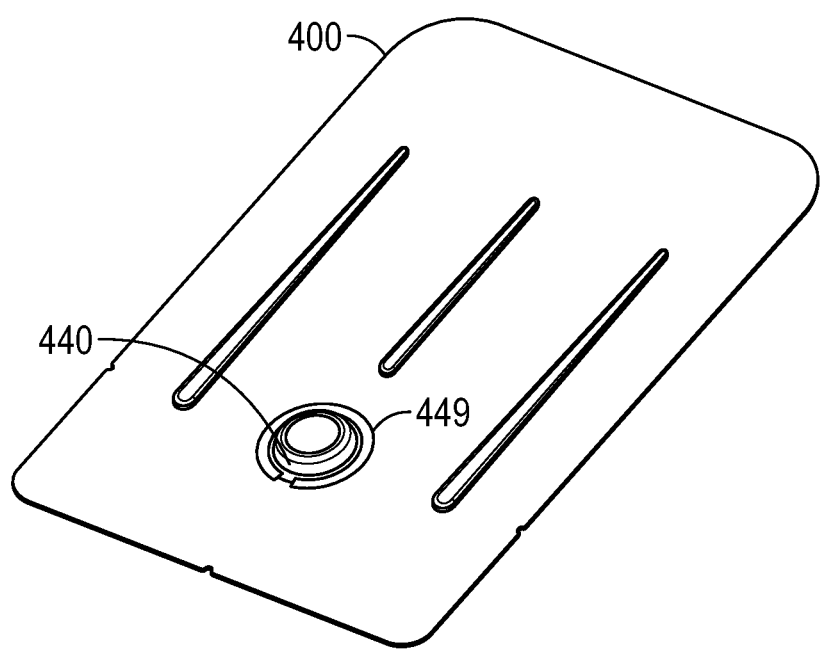
FIG. 40 is a perspective view of an alternate embodiment of the flashing.
Figure 41:
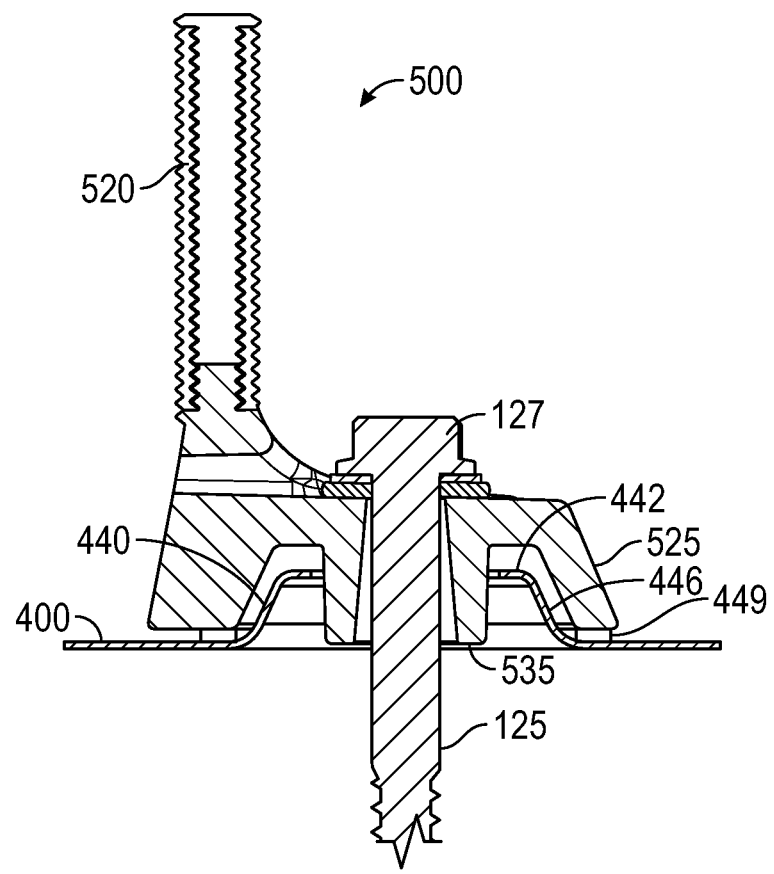
FIG. 41 is a side cross-sectional view of an alternate embodiment of the bracket and the flashing shown in FIG. 40 that is fully assembled.

FIG. 41 illustrates a side cross-sectional view of bracket 500 that utilizes the internal ring 560 when it is secured to the flashing 400. When the bracket 500 is placed over the cone 440, and the fastener 125 is fully inserted and tightened, the seal 449 is compressed between the flashing 400 around the perimeter and at the base of the cone 440 and the bottom of the shell 560. This provides a water-resistant closure between the flashing 400 and the inner portion of the bracket 500. Seal 449 can be continuous around the cone 440 perimeter or it can include a gap located on the downslope side of the cone 440, as shown in FIG. 40, to act as a weep hole or path for any moisture in the interior area to escape.

Figure 42:
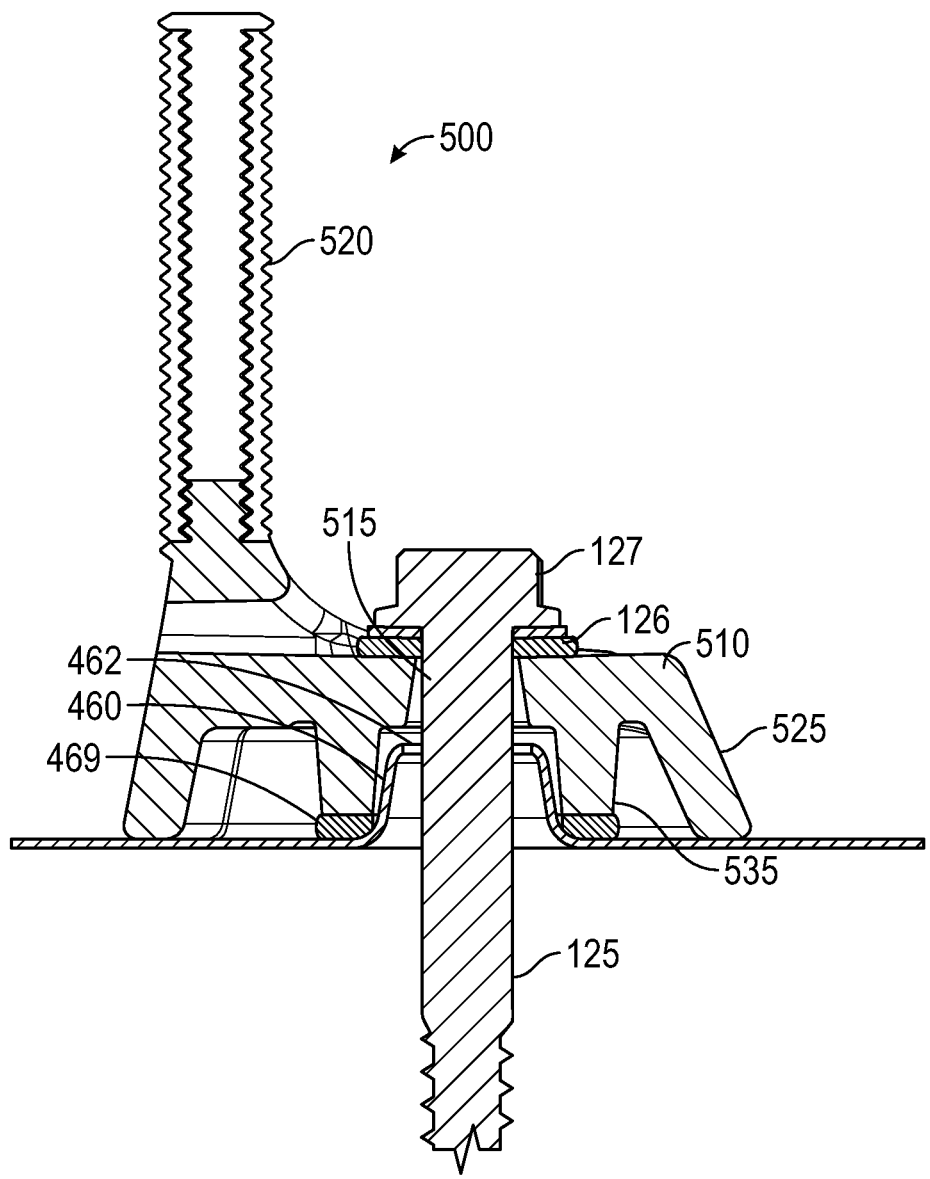
FIG. 42 is a side cross-sectional view of an alternate embodiment of the bracket and the flashing that is fully assembled.

FIG. 42 illustrates a side cross-sectional view of another embodiment of the bracket 500, which also includes an alternate embodiment of a cone 460. In this embodiment, instead of utilizing a seal around the bottom surface of the outer shell 525 of the bracket 500, an inner shell seal 469 is provided on the bottom surface of the inner shell 535. The inner shell seal 469 can be affixed to the bottom surface of the inner shell 535 bracket, or it can be affixed to the surface of the flashing 400 around the perimeter of the cone 460. In this embodiment, when the bracket 500 is fully assembled as shown in FIG. 42, the inner shell 535 is placed over the outside of the cone 460 and the fastener 125 is inserted through the opening 515 of the base 510 and the washer 126. When the fastener 125 is fully tightened, inner shell seal 469 is compressed between the flashing 400 and the inner shell 525 of the bracket 500, thus creating a water resistant seal preventing water from infiltrating the roof. The washer 126 also creates an additional water-resistant seal between the fastener 125 and the base 510.

Figure 43:
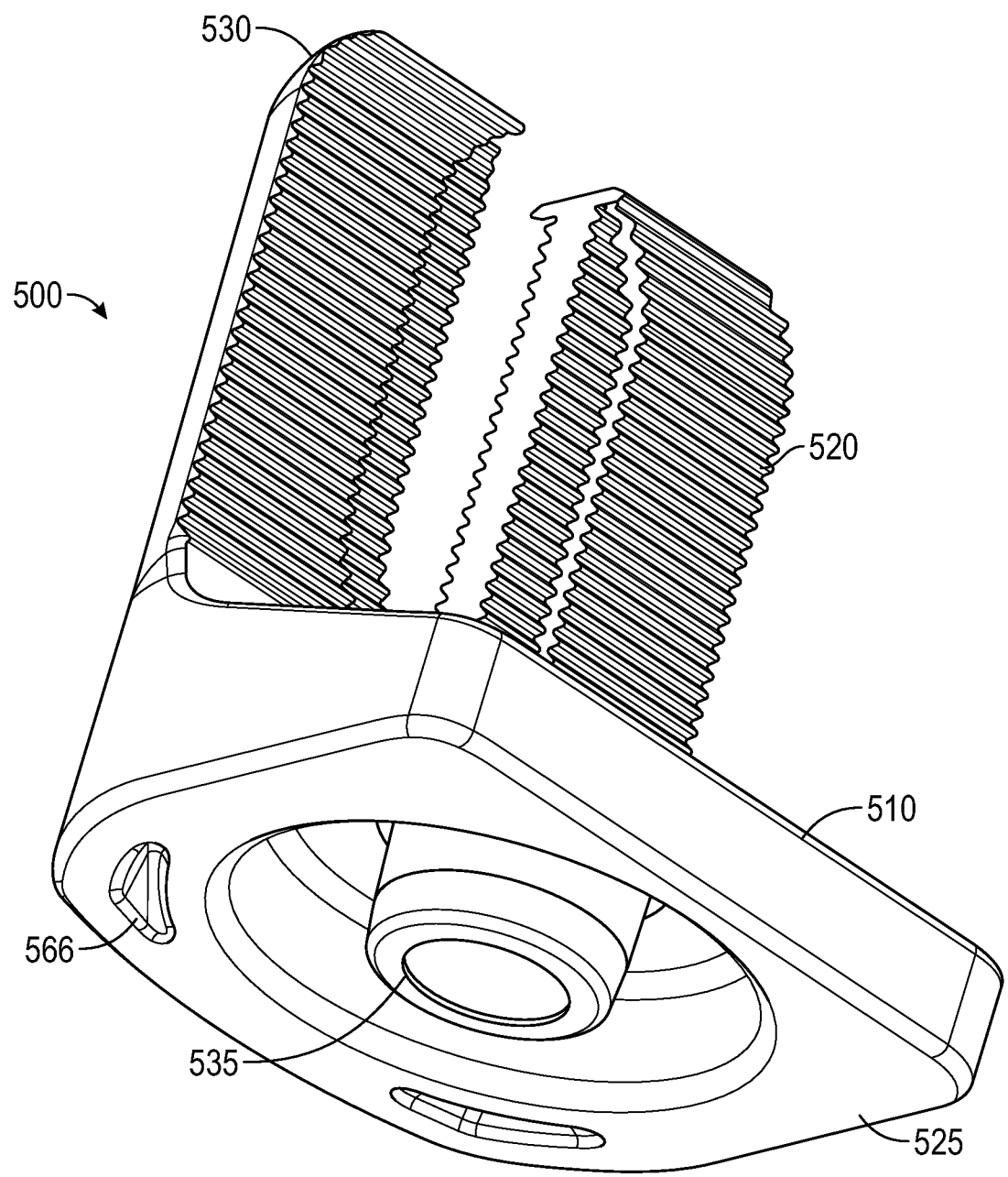
FIG. 43 is a bottom perspective view of an alternate embodiment of the bracket.

FIG. 43 illustrates a bottom perspective view of an additional exemplary embodiment of the bracket 500 as shown in FIG. 39. In this embodiment, the secondary concentric internal ring 560 fully integrates the outer shell 525 of the base 510 such that it covers more surface are beneath the base 510. The integrated outer shell 525 and ring 560 may also include a pair of optional cavities 566. The concentric ring 560 is configured to mate with a concentric seal 449 around the cone 440. It is understood that the complimentary nature of the shapes of the ring 560 and the seal 449 can be round or some other symmetrical or asymmetrical shape. When the bracket 500 is assembled, the secondary concentric internal ring 560 will rest upon the seal 449, as shown in FIG. 41, to provide a water-resistant closure.

Figure 44:
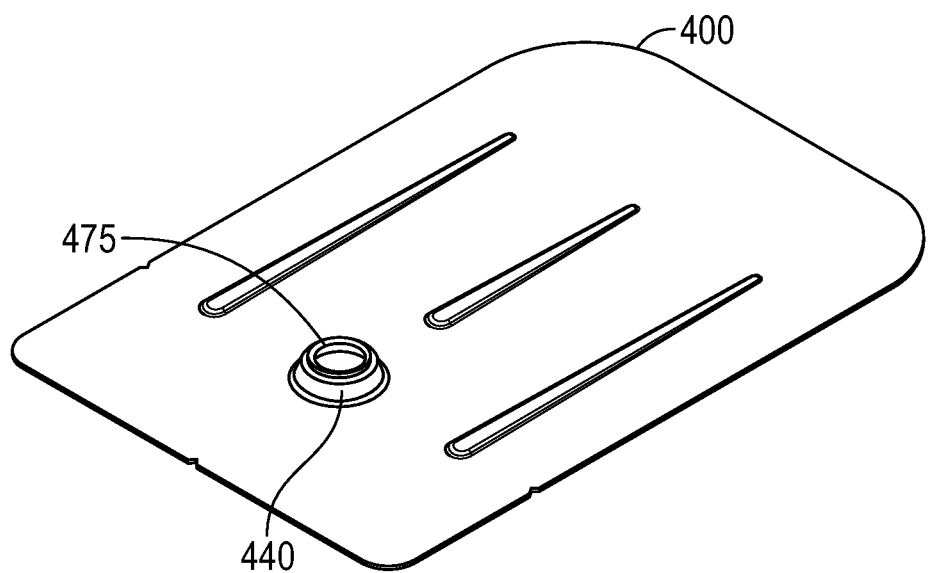
FIG. 44 is a perspective view of an alternate embodiment of the flashing.
Figure 45:
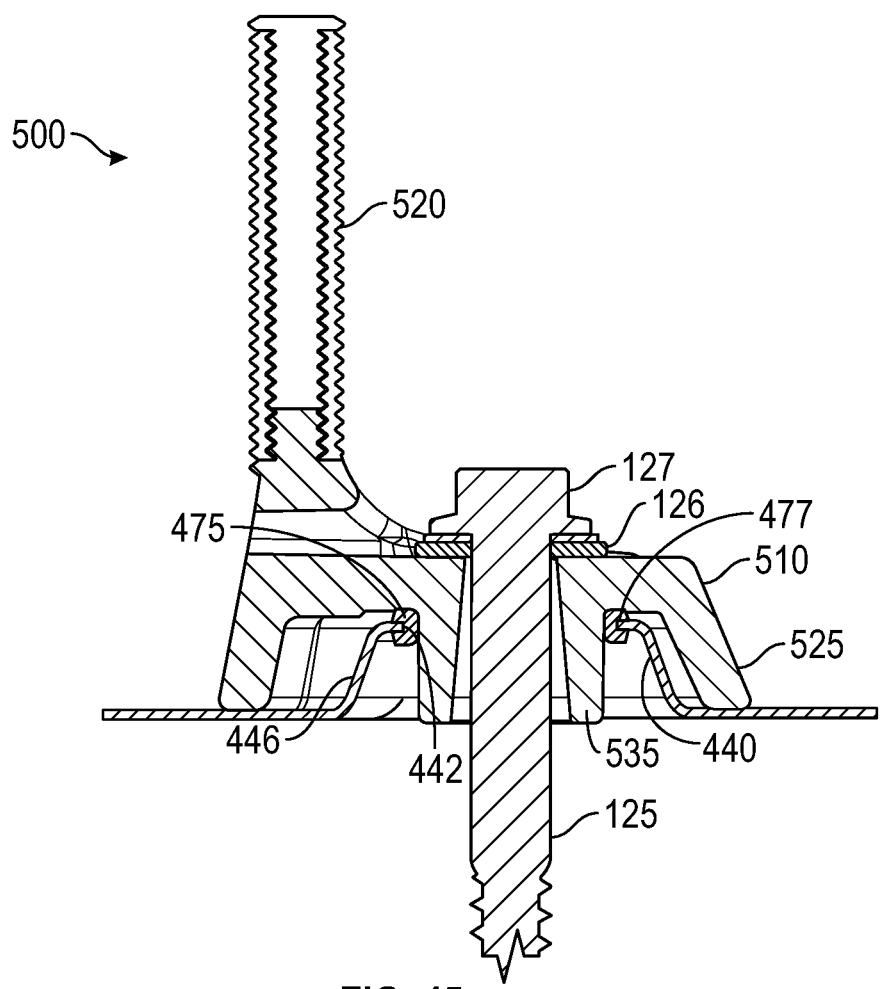
FIG. 45 is a side cross-sectional view of the flashing of FIG. 44 with an alternate embodiment of the bracket that is fully assembled.

FIG. 44 illustrates a perspective view of another exemplary embodiment of a flashing 400 with the cone 440. In this embodiment, a wraparound seal 475 is a generally U-shaped seal with a groove 477 and is comprised of rubber or a deformable material as shown in FIG. 45. The wraparound seal 475 is secured around the edge or lip 442 in the groove 477 of the cone 440. FIG. 45 provides a side cross-sectional view of the bracket 500 that is assembled on to the cone 440 with the wrapround seal 475. When the bracket 500 is secured to the flashing 400, the bracket 500 is placed over the cone 440 with the fastener 125 fully inserted through the opening 515 and tightened into the roof 600. As can be seen, the wraparound seal 475 provides a water-resistant seal between the edge 442 and the inner shell 535 of the base 510. The multi-part sealing washer 126 also creates an additional water-resistant seal between the fastener 125 and the opening 515 of the base 510.

Figure 46:
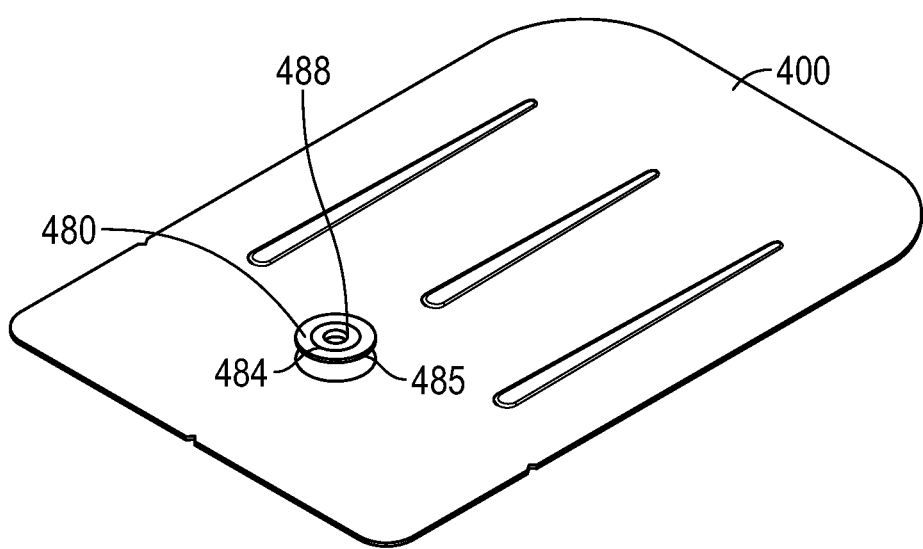
FIG. 46 is a perspective view of an alternate embodiment of the flashing.
Figure 47:
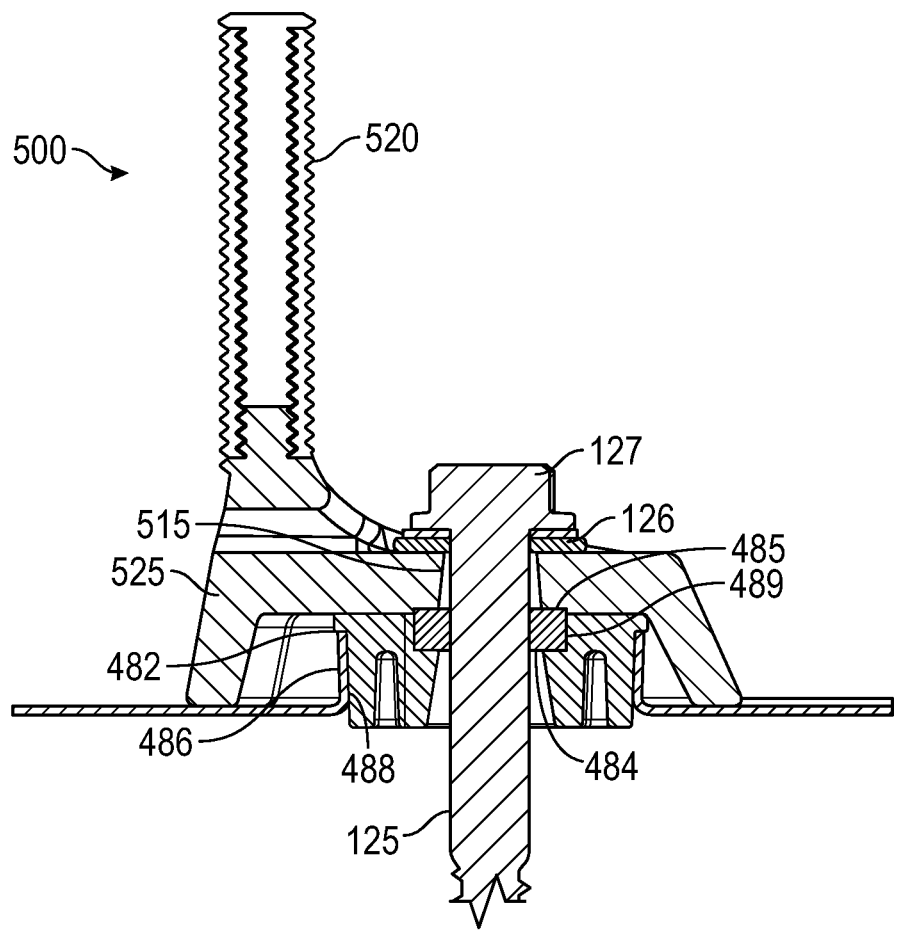
FIG. 47 is a side cross-sectional view of the flashing of FIG. 46 with an alternate embodiment of the bracket that also includes a dock—all elements being fully assembled.

FIG. 46 illustrates a perspective view of another exemplary embodiment of the flashing 400. In this embodiment, a dock 480 that is generally made of a rigid material and can be generally the shape of a disk. The dock 480 also includes an opening 484 in the center of the dock 480. FIG. 47 provides a side cross-sectional view of an alternate exemplary embodiment of the bracket 500. As shown, the flashing 400 includes a generally vertical protrusion 486 that forms an aperture 488 with the vertical protrusion 486 terminating at a lip 482 that encircles the aperture 488. The dock 480 is secured within the aperture 488 by press fitting it into the vertical protrusion 486 and the lip 482 thus creating a water resistant seal between the dock 480 and the flashing protrusion 486. The dock 480 can also include a recessed portion 489 for receiving a ring-shaped seal 485. When the seal 485 is placed between the base 510 and the dock 480, the seal 485 is compressed between the recessed portion 489 of the dock 480, the outer surface of the fastener 125 and an inside upper surface of the base 510. This creates an additional water-resistant seal preventing water entering the roof 600.

As shown in FIG. 47, the bracket 500 is assembled by placing the base 510 over the vertical protrusion 486 and dock 480 with the upper surface of the inner portion of the base 510 contacting the dock 480 and the seal 485 that sits within the recessed portion 489. The fastener 125 is then inserted and tightened through the aperture 515 of the bracket and the openings of the seal 485 and the dock 480. This combination creates a water-resistant seal between the bracket 500, the dock 480 and the fastener 125 preventing water infiltrating the hole 401. The washer 126 also creates an additional water-resistant seal between the fastener 125 and the base 510 preventing water accessing the opening 515.

Figure 48:
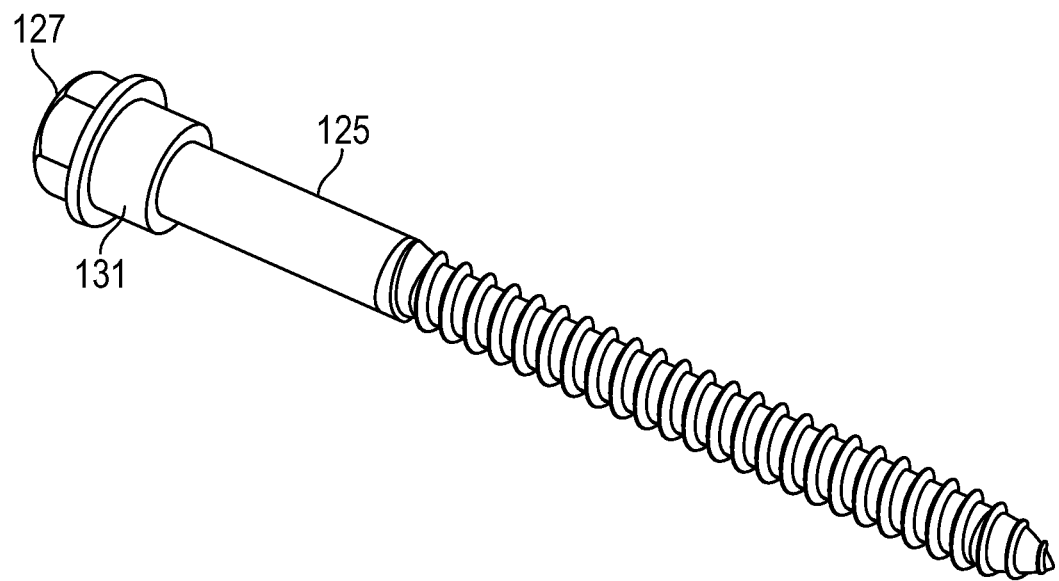
FIG. 48 is a perspective view of the fastener with an alternate embodiment of the seal.
Figure 49:
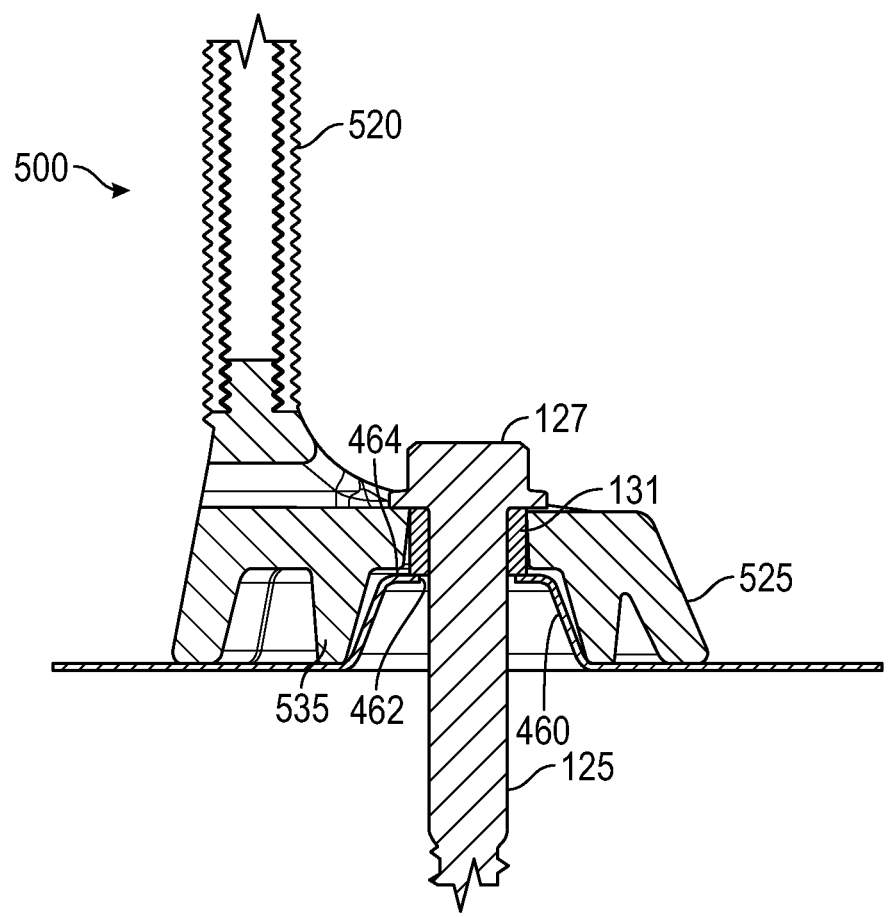
FIG. 49 is a side cross-sectional view of the fastener and seal shown in FIG. 48 with an alternate embodiment of the bracket and the flashing shown in FIG. 42.
Figure 60:
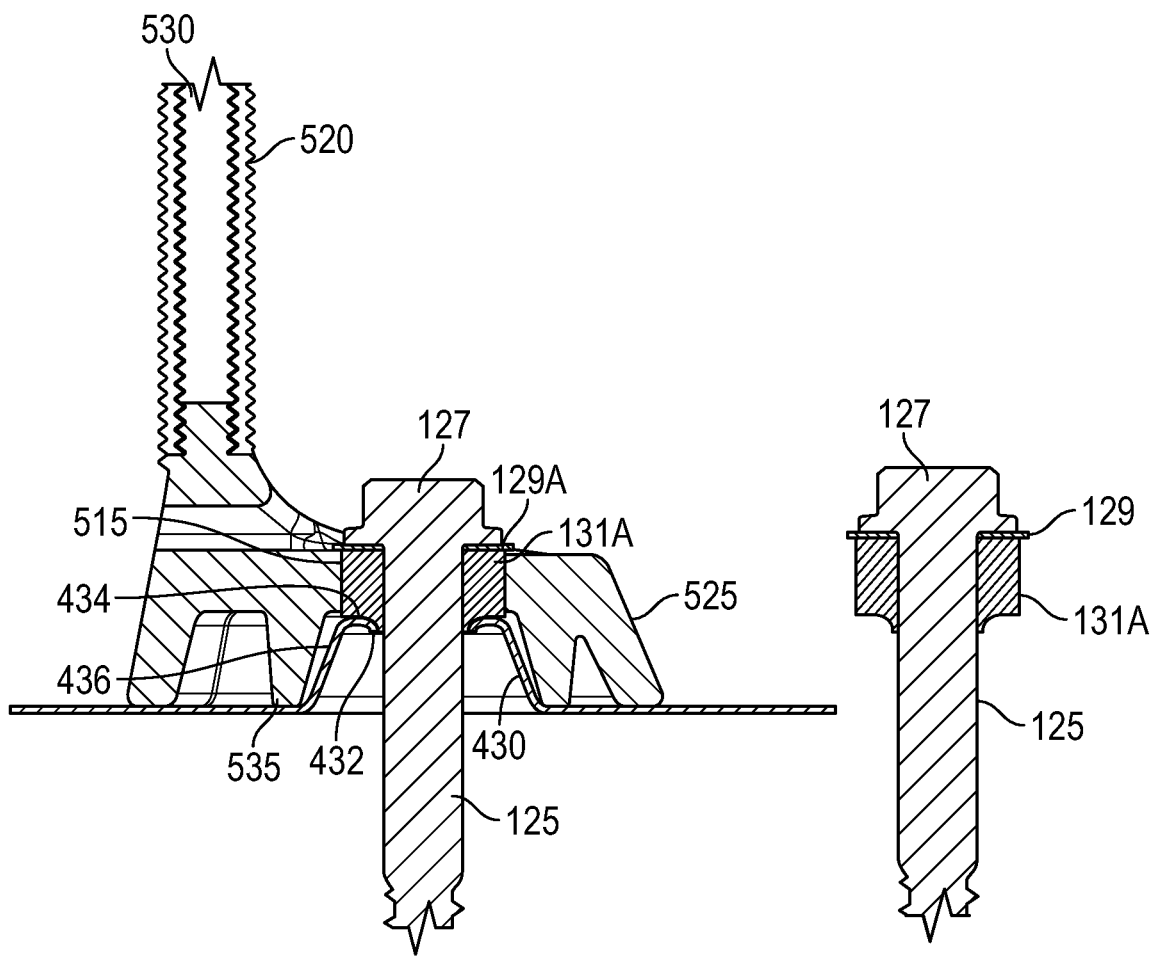
FIG. 60 illustrates a side cross-sectional view of an alternate exemplary embodiment shown in FIG. 49.

FIG. 48 illustrates a perspective view of the fastener 125 with a cylindrical collar seal 131 that can either be manually assembled or pre-assembled on to the lag portion. The collar seal 131 sits near the top of the fastener 125 and directly under the head 127 or the washer 129A (as shown in FIG. 60). FIG. 49 shows a side cross-sectional view of the bracket 500 utilizing the embodiment of the flashing 400 as shown in FIG. 42 that includes cone 460. In this embodiment, the bracket 500 is placed on the flashing 400, the inner shell 535 fits over the cone 460 so that the lip 462 extends parallel toward the center of the opening 515 of the top of the base 510. When the fastener 125 is inserted through the opening 515 of the base 510, and it is tightened, the collar seal 131 compresses between the head 127 and/or the washer 129A and the top surface of the cone lip 462 and the cone edge 464 as shown.

Figure 50:
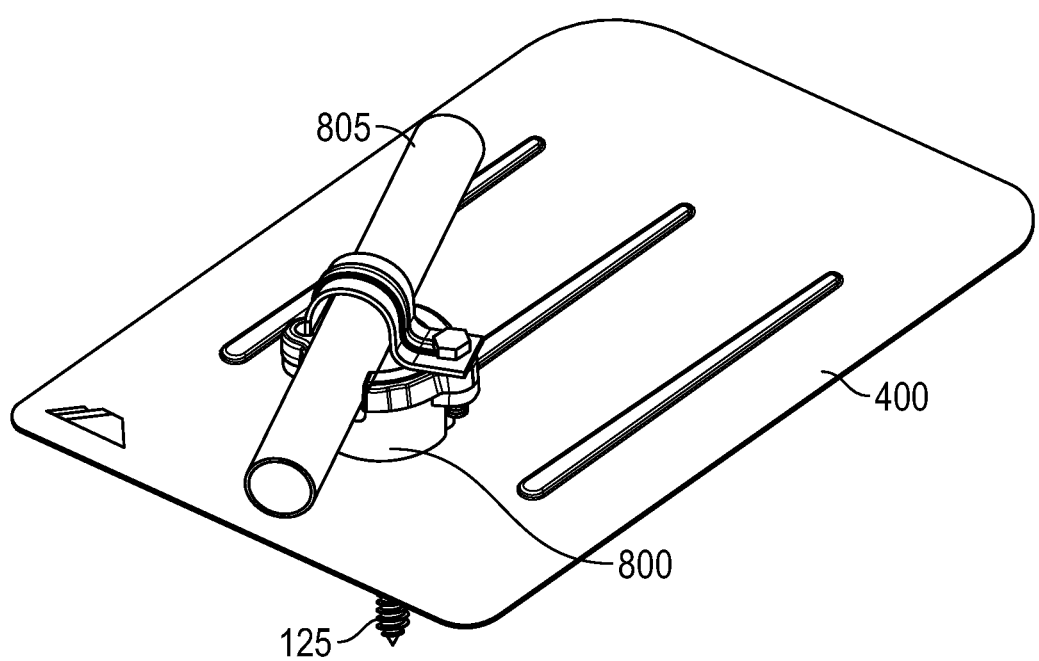
FIG. 50 illustrates a perspective view of an alternate exemplary embodiment that includes a flashing with a conduit mount for holding a conduit.
Figure 51:
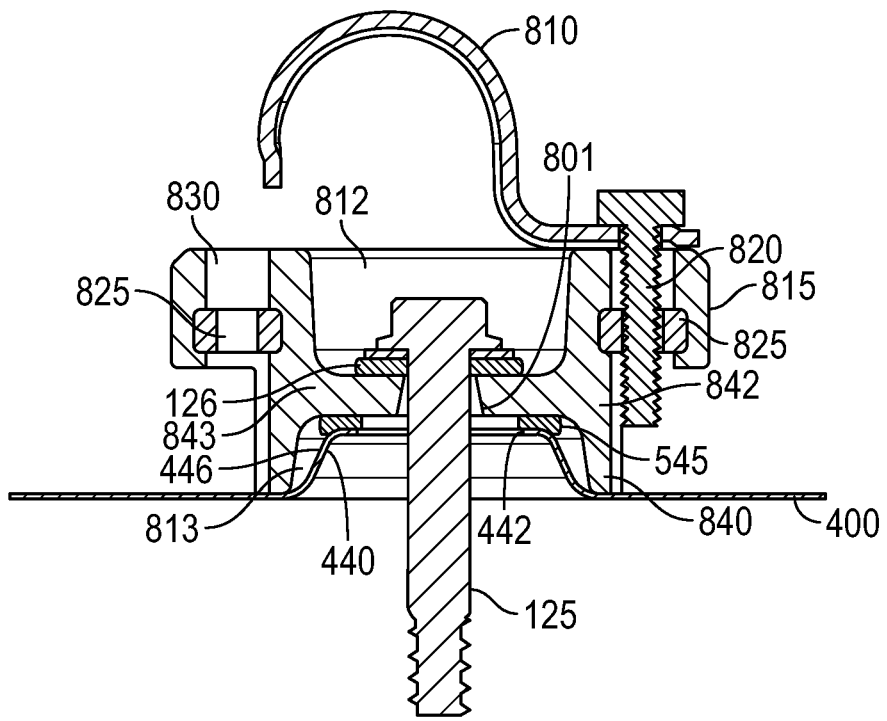
FIG. 51 illustrates a side cross-sectional view of the embodiment shown in FIG. 50.
Figure 52:
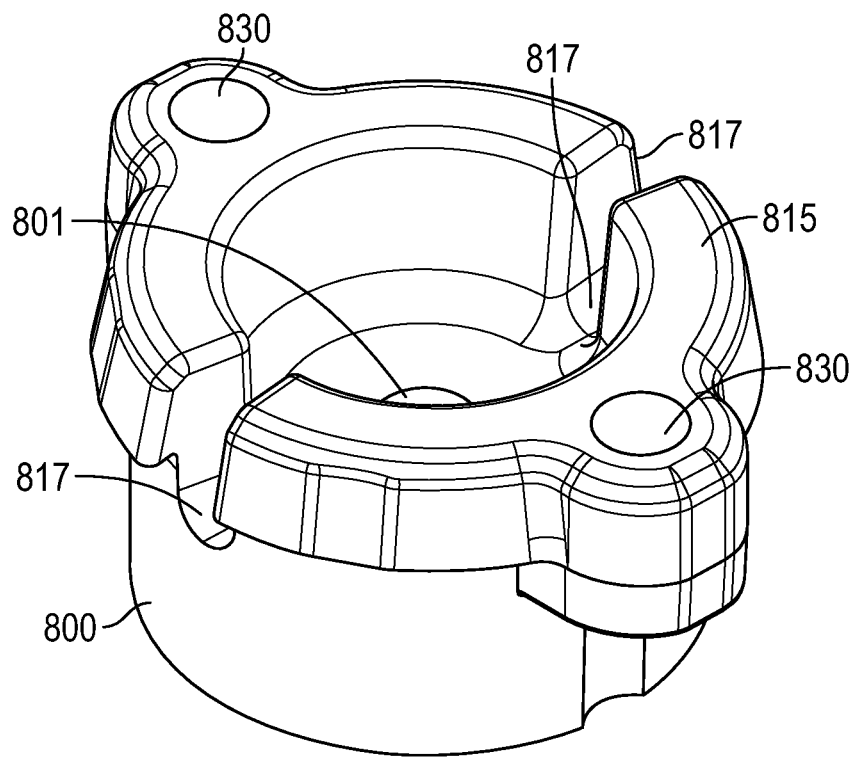
FIG. 52 illustrates a perspective view of the conduit mount shown in FIGS. 50-51.

FIGS. 50 and 51 illustrate a perspective view and a side cross-sectional view respectively of an assembly that uses the flashing 400 with an accessory mount 800 for holding a conduit 805, pipe or other accessory or structure. Referring to FIG. 51, the flashing 400 utilizes, by way of one example, cone 440 that comprises outer surface 446 that extends upward from the flashing 400 to the edge 442 that extends from the outer surface 446. It is understood by one of ordinary skill in the art that other suitable cones described herein could be substituted for cone 440. The mount 800 includes a base 840. The base 840 comprises an outer cylindrical shell 842 and a disk-shaped center area 843 that forms an upper cylindrical recess 812 and a lower cylindrical recess 813. The center area 843 of the base also includes opening 801, as shown in FIG. 52. When the base 840 is secured to the flashing 400, it is placed over the cone 440 so that base 840 is positioned around the perimeter of lower portion of the cone 440, and the cone 440 is within the lower recess 813. The internal seal 545 is positioned and compressed between the top surface of the lower cylindrical recess 813 and the edge 442 of the cone 440 to provide a water-resistant seal. The fastener 125 is then inserted through the opening 801 into the roof with the washer 126 being positioned between the head 127 of the fastener 125 and the bottom surface of the upper recess 812 to provide a water-resistant seal when tightened.

The top of the base 840 also includes a cap portion 815. The cap portion 815 includes a pair of opposite openings 830 positioned on the perimeter of the base 840. Each opening 830 includes a threaded nut 825 embedded within the opening 830. Conduit 805 pipe or other accessories or structures can be secured to the top of the cap portion 815 by way of a conduit strap 810 or other straps and brackets utilizing one or more mounting holes to connect conduit, pipe or other accessories or structures. The conduit strap 810 is shaped to conform to the cylindrical shape of the conduit 805 and is secured on one end at either opening 830 of the cap portion 815. The conduit strap 810 is secured to the cap portion 815 by inserting a bolt 820 through the end of the conduit strap and into the opening 830 so that the bolt 820 can be tightened through the nut 825. Once secured, the conduit strap 810 secures the conduit 805 to the conduit mount 800.

FIG. 52 illustrates a perspective view of the conduit mount 800. In this embodiment, the cap portion 815 includes water drainage slots 817 on sides of the cap portion 815 and disposed separately from each of the openings 830 on the cap portion 815.

Figure 53:
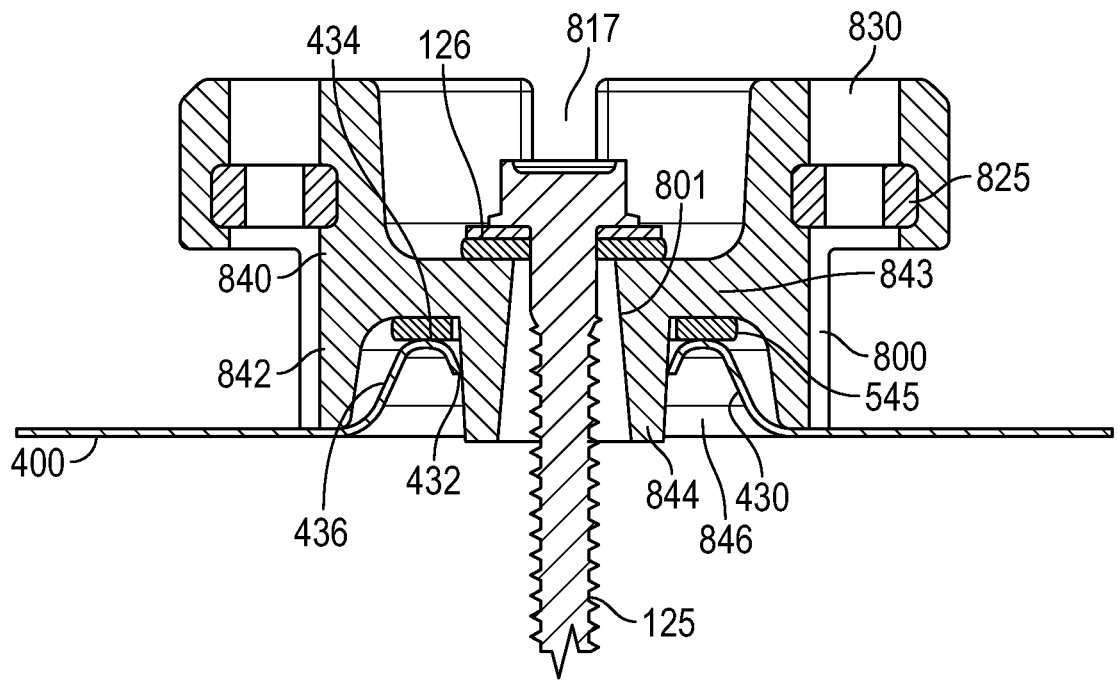
FIG. 53 illustrates a side cross-sectional view of an alternate embodiment of the conduit and accessory mount shown in FIG. 51.

FIG. 53 illustrates a side cross-sectional view of an alternate embodiment of the conduit mount 800 that provides a base 840 with an inner shell 844 that extends downward and tapers outward from the opening 801 in the central area 843. The outer shell 842 and the inner shell 844 form recess 846. In this embodiment, the flashing 400 includes cone 430 such that when the mount 800 is assembled, the mount 800 is placed over the cone 430 so that it fits within the recess 846. The internal seal 545 is positioned between the top surface of the recess 846 and the rounded top edge 434 of the cone 430 to provide a water-resistant seal.

FIGS. 50-53 illustrate exemplary embodiments of a mount 800 that can be referred to as a conduit mount or an accessory mount. It is used to mount any number of conduit, pipes, accessories, structures, junction boxes, Unistrut, etc. utilizing either or both of the side holes 830 and nuts 825. It is understood that the mount 800 can utilize a variety of the cones and seals described herein and is not limited to the options shown in FIGS. 50-53.

Figure 54:
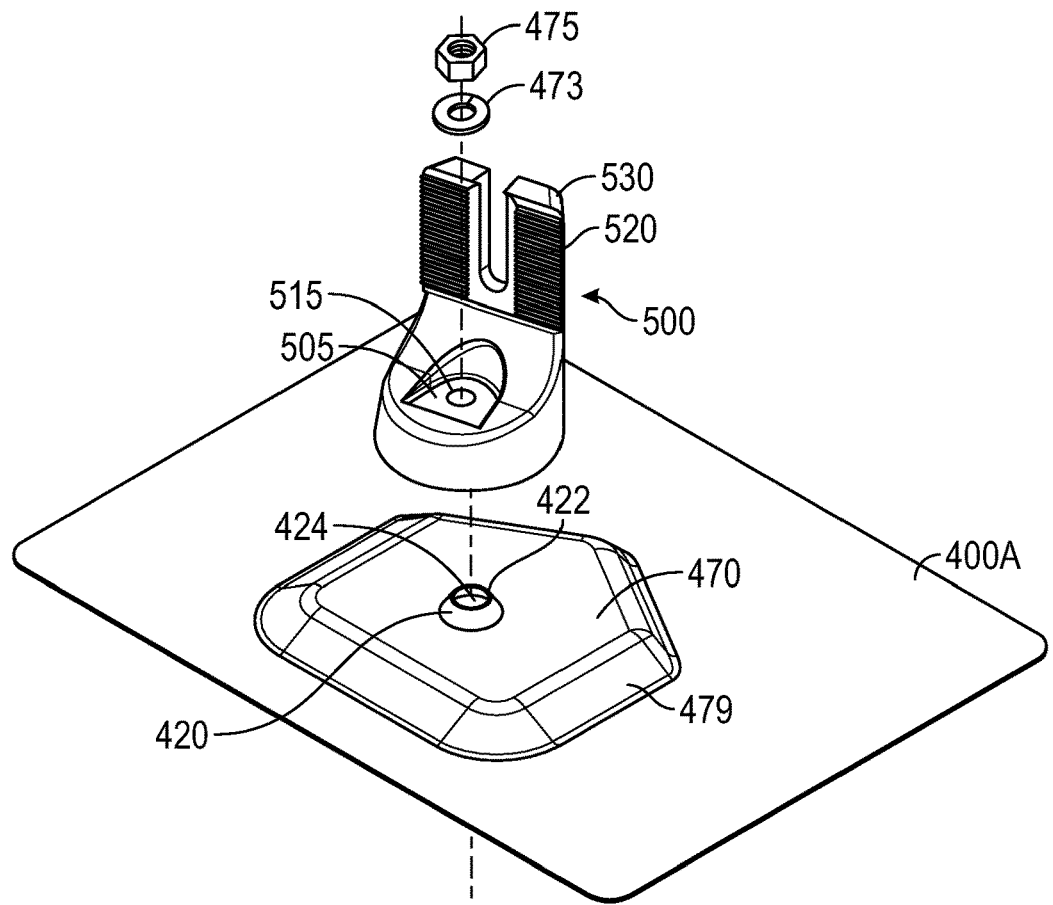
FIG. 54 illustrates a perspective exploded view of an alternate exemplary embodiment of the bracket/flashing assembly that includes an exemplary deck mount.
Figure 55:
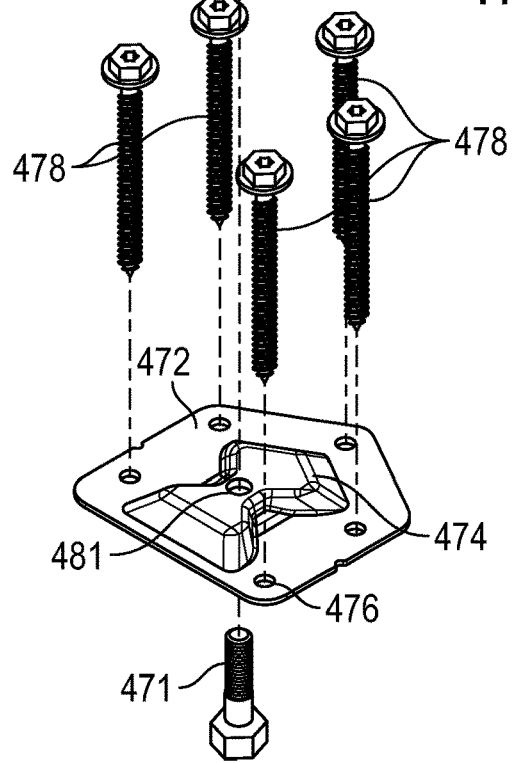
FIG. 55 illustrates a perspective exploded view of an exemplary base plate for use with the deck mount of FIG. 54.

FIG. 54 illustrates a perspective exploded view of an alternate exemplary embodiment of flashing 400A. The flashing 400A includes a pentagonal raised portion 470. FIG. 55 illustrates a perspective exploded view of a pentagonal base plate 472. The raised portion 470 is raised above the surrounding area of the flashing 400A and provides space for fitting the base plate 472 and the heads of the screws 478 beneath it. It is understood that the shape of both the raised portion 470 of the flashing 400A and the base plate 472 are not limited to a specific geometrical shape. A central area of the raised portion 470 includes, by way of example, cone 420 with edge 422 and opening 424. The edge 479 of the raised portion 470 tapers downward toward the surface of the flashing 400A, which enables water to be directed away from the cone 420. The bracket 500 is placed on top of the cone 420 so that it rests on the raised portion 470.

As shown in FIG. 55, the base plate 472 includes a plurality of holes 476 and a raised plate portion 474. The raised plate portion 474 includes a central hole 481 and is raised to enable bolt 471 to fit within it and extend through the central hole 481. It is understood that when assembled, the base plate 472 is first secured to the roof 600 after inserting the bolt 471 through the central hole 481 and then inserting and tightening screws 478 through the holes 476. Once the base plate 472 is secured, the flashing 400A is aligned so that the raised portion 470 fits over the base plate 472 and is supported by the raised plate portion 474. The bracket 500 is then placed over the cone 420. This will enable the bolt 471 to pass through the opening 515 from below and extend upward and into the recess 505 of the bracket 500. Washer 473 is then placed over the threaded portion of the bolt 471 and then secured with the nut 475, which provides a water-resistant seal within the recess 505 of the bracket 500.

Figure 56:
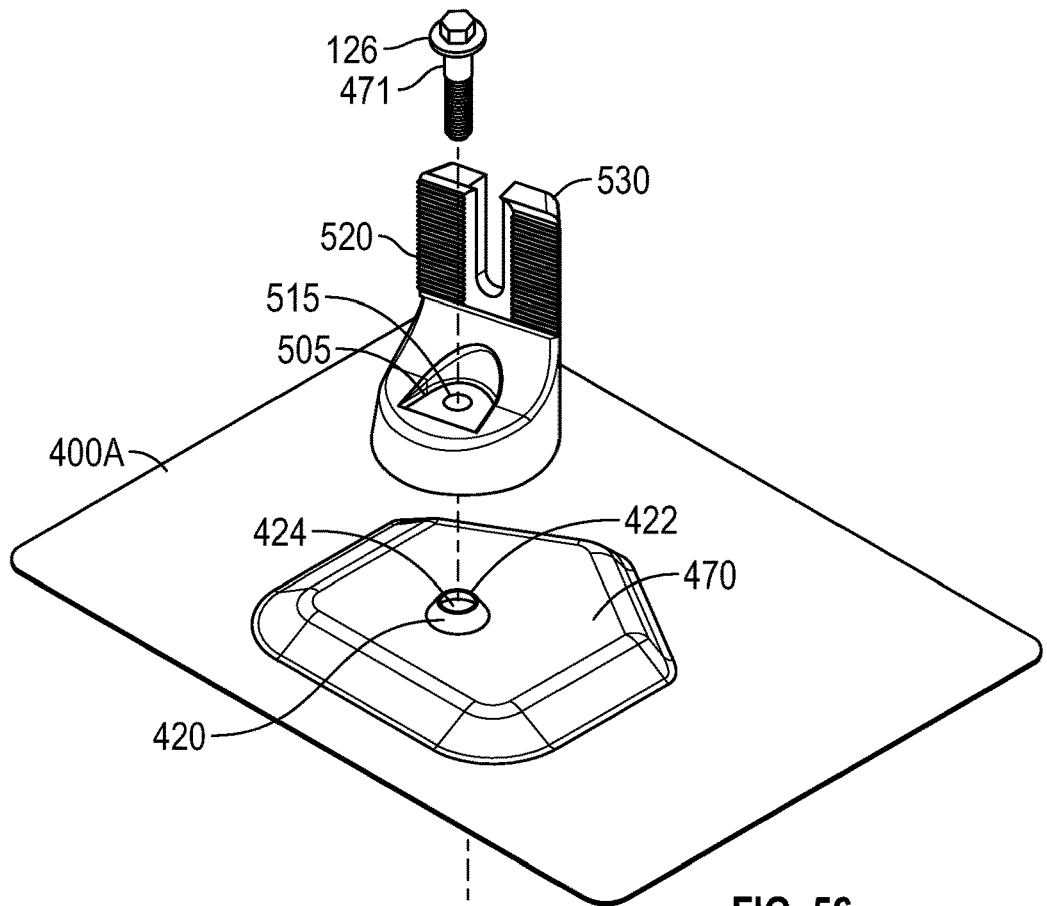
FIG. 56 illustrates the same assembly shown in FIG. 54 with an alternate means to secure the bracket to the flashing.
Figure 57:
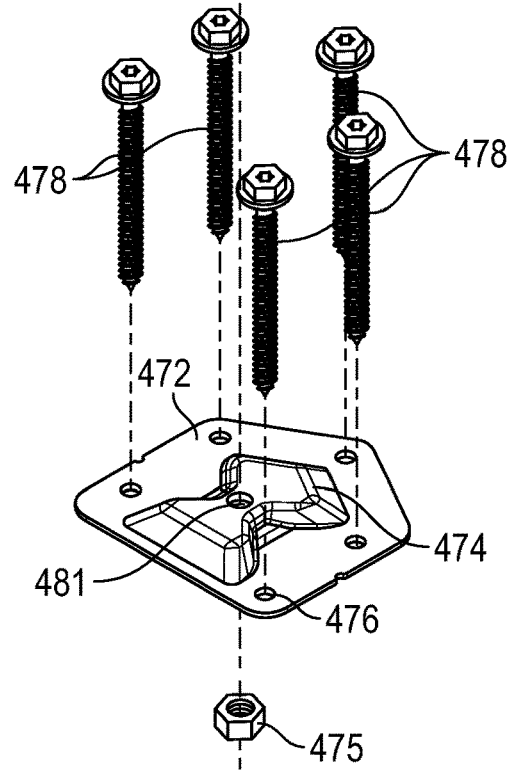
FIG. 57 illustrates the same assembly shown in FIG. 55 with an alternate means to secure the base plate to the flashing.

FIGS. 56 and 57 illustrate the same perspective exploded views of FIGS. 54 and 55 except when assembled, the bolt 471 is now shown inserted through the opening 515 in the recess 505 of the bracket 500, hole 481 and tightened into nut 475, which is located beneath the raised plate portion 474 of the base plate 472. Alternately, hole 481 of raised plate portion 474 can be a threaded hole.

FIGS. 54-57 show embodiments utilizing short flashings that take advantage of roofing shingle trends reducing the need for extending up under the third course of shingles in order to create the headlap historically critical to the waterproofing integrity of flashing designs as additionally described regarding. FIG. 24B. The embodiments shown in FIGS. 54-57 further reduce and eliminate the need for taller flashings, separating shingles, removing nails, extending the flashing up under the third course and creating headlap, by connecting the baseplate 472 directly to the deck or roof sheathing using screws 478. This allows the installer to simply relocate the assembly either left or right on the roof 600 to avoid shingle joints or keyways and forgo the use of supplemental card stock. Alternately the embodiments shown in FIGS. 54-57 can include a taller flashing or the installer can utilize supplemental card stock to locate the apparatus at the shingle joint or keyway.

Figure 58A:
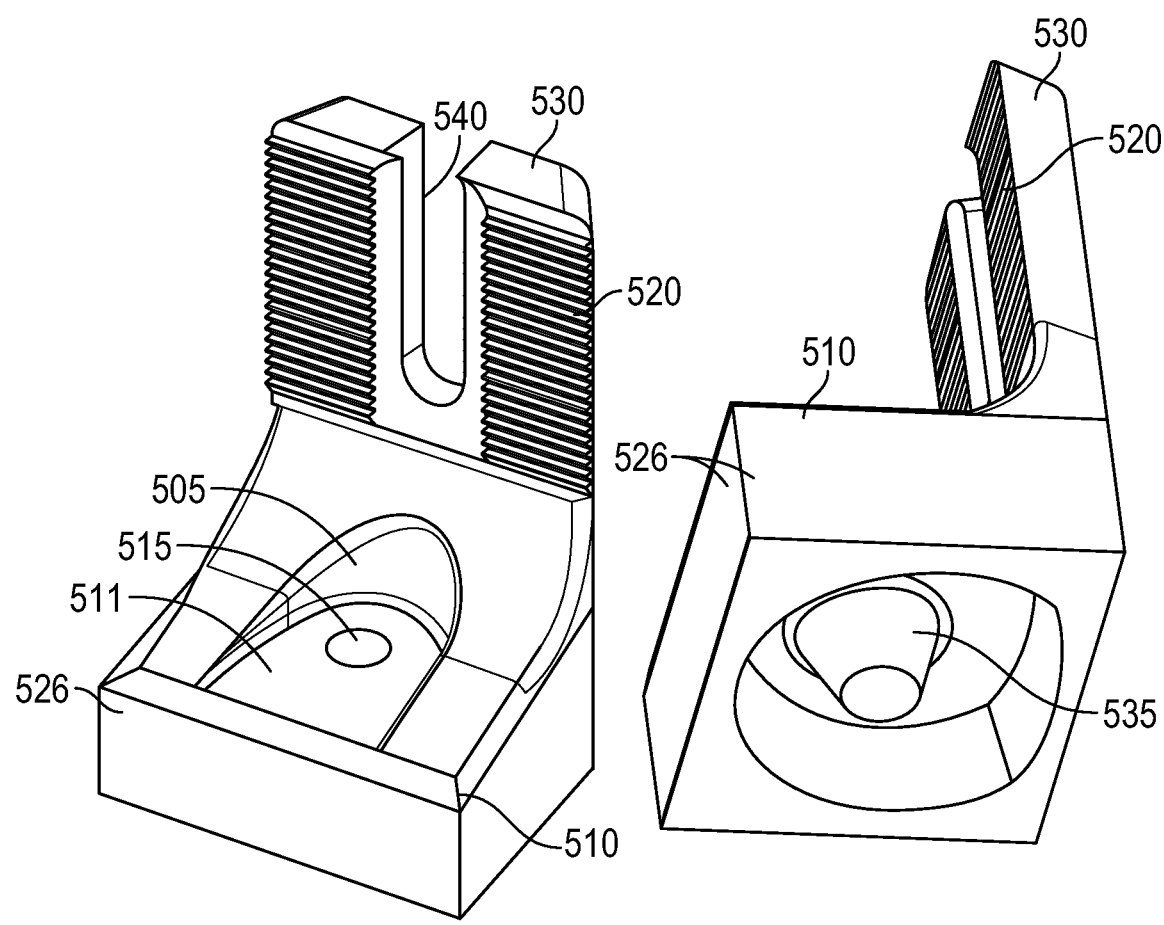
FIG. 58A illustrates a perspective view and a bottom perspective view of an alternate exemplary embodiment of the bracket with a rectangular base.
Figure 58B:
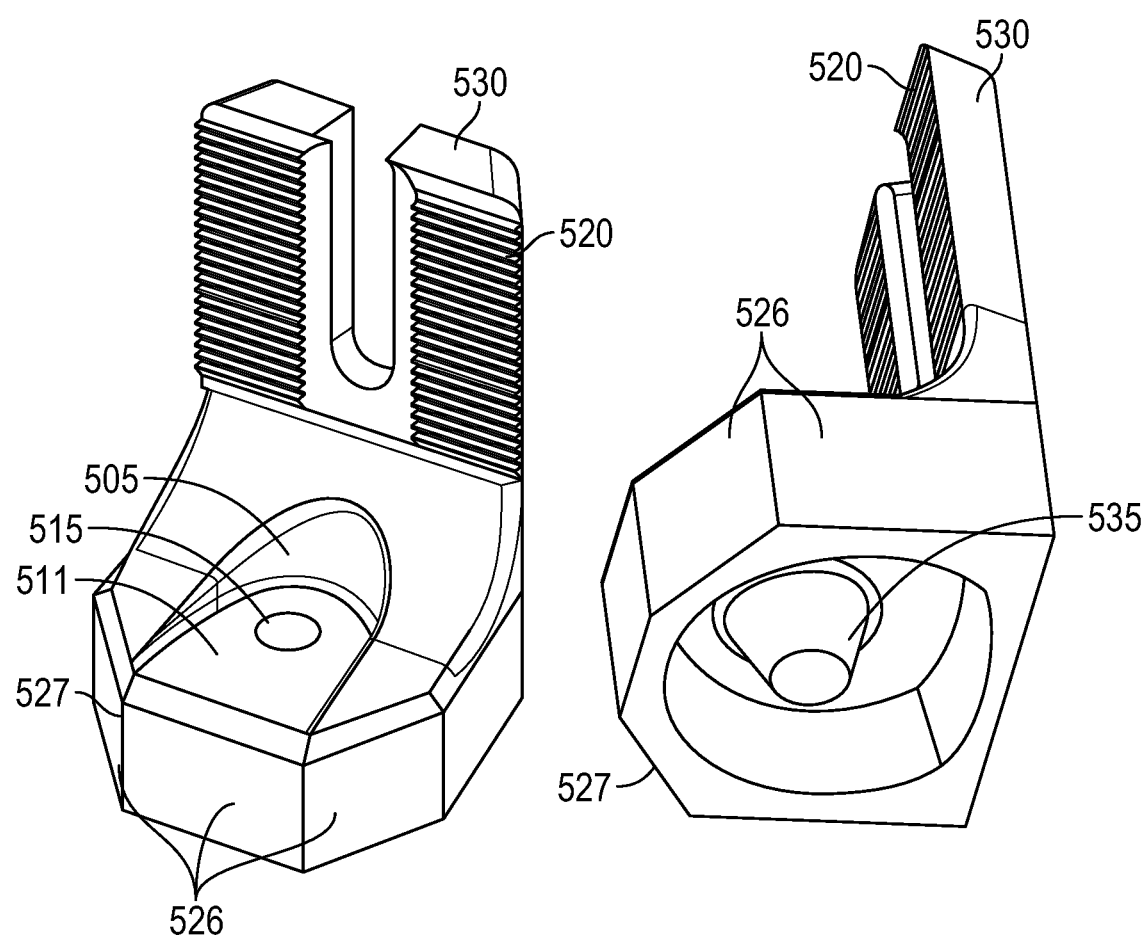
FIG. 58B illustrates a perspective view and a bottom perspective view of an alternate exemplary embodiment of the bracket with a polygonal base.

FIGS. 58A and 58B illustrate perspective views and bottom perspective views of alternate exemplary embodiments of the bracket 500. In FIG. 58A, the base 510 is rectangular in shape with generally flat sides 526. The flat sides 526 can be either perpendicular or can form obtuse angles with respect to the top surface 511 of the recess 505. It is understood by one of ordinary skill in the art that the shape of the base 510 is not limited to a rectangular shape and can be other desirable polygonal shapes such as the hexagonal shape 527 shown in FIG. 58B.

Figure 59:
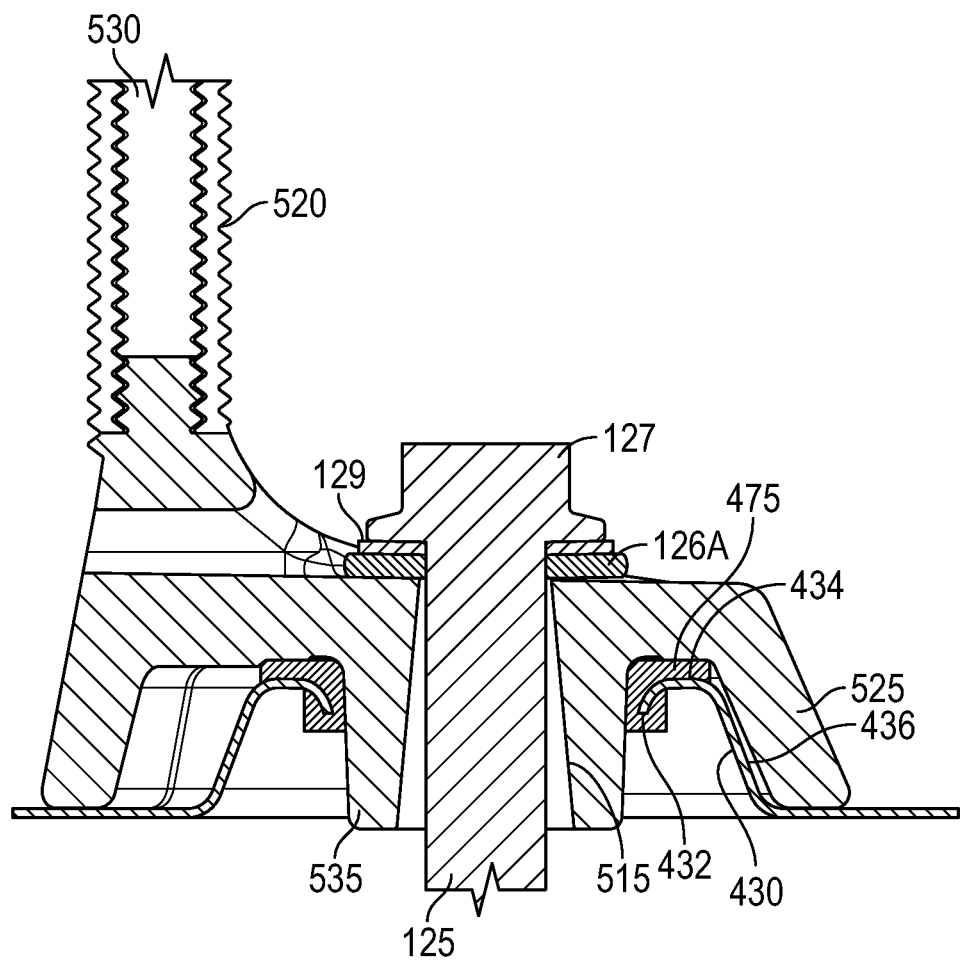
FIG. 59 illustrates a side cross-sectional view of an alternate exemplary embodiment of the flashing of FIG. 44 with the bracket of FIG. 45 that shows the cone embedded within the wraparound seal.

FIG. 59 illustrates a side cross-sectional view of a variation of the flashing 400 of FIG. 44 and the bracket 500 in FIG. 45. In FIG. 59, the bracket 500 is assembled on to the cone 430 with the wrapround seal 475. The wraparound seal 475 is a preformed deformable material that can be preinstalled on the cone 430. When the bracket 500 is secured to the flashing 400, the bracket 500 is placed over the cone 430 with the fastener 125 fully inserted through the opening 515 and tightened into the roof 600. As can be seen, the wraparound seal 475 covers the edge 432 and the rounded top edge 434 of the cone 430 and provides a water-resistant seal between the edge 432 and the inner shell 535 of the base 510. This embodiment also includes deformable washer 126A and the upper rigid portion 129 that also creates an additional water-resistant seal between the fastener 125 and the opening 515 of the base 510.

Figure 61:
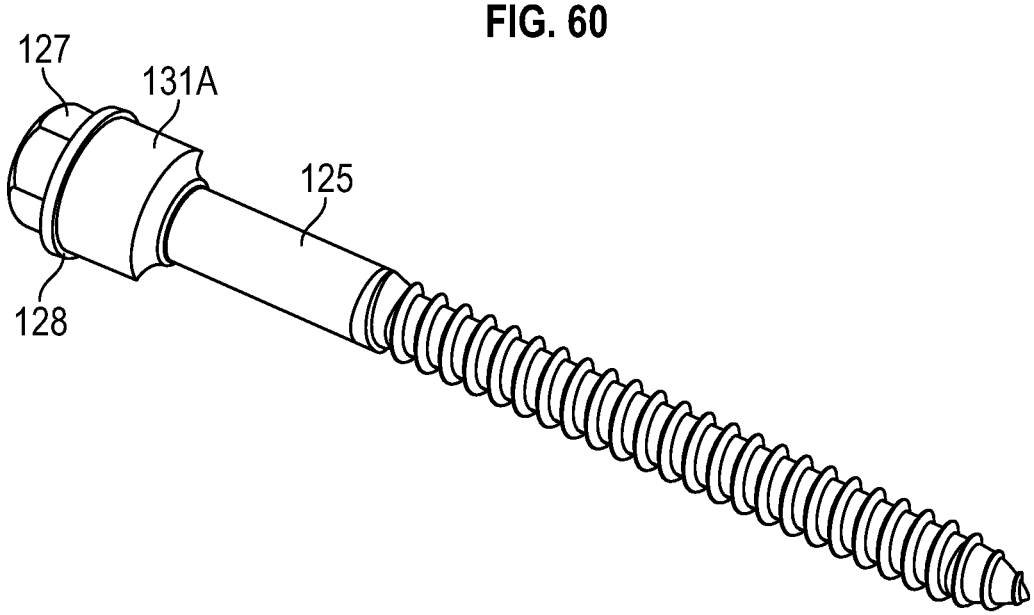
FIG. 61 illustrates a perspective view of an alternate exemplary embodiment of the collar seal used with the fastener.

FIG. 60 illustrates a side cross-sectional view of an alternate exemplary embodiment of the embodiment shown in FIG. 49. In this embodiment the collar seal 131A is a thicker version of the collar seal 131. This is shown in FIG. 61, which is a perspective view of the fastener 125 with the collar seal 131A. In FIG. 60, the opening 515 is cylindrical and the cone 430 is utilized. As can be seen, when the bracket 500 is assembled to the cone 430 and the fastener 125 is inserted into the opening 515 and tightened, the collar seal 131A is compressed against a rigid washer 129A, the top of the rounded edge 434 and the edge 432 of the cone 430, The inside surface of opening 515, and the outer surface of the fastener 125, thus providing a water-resistant seal and preventing water infiltration into the roof 600 through the hole 401. FIG. 61 shows the collar seal 131A preassembled on the fastener 125. The seal 131A can also be preinstalled in the bracket 500. The seal 131A can include a feature like a recess in the outer side face of the seal 131A that is configured to interact with the opening 515 that can include a feature like a protrusion that conforms to the recess feature of the seal 131A such that the interaction of the features retains the seal 131A in the hole 515.

Figure 62:
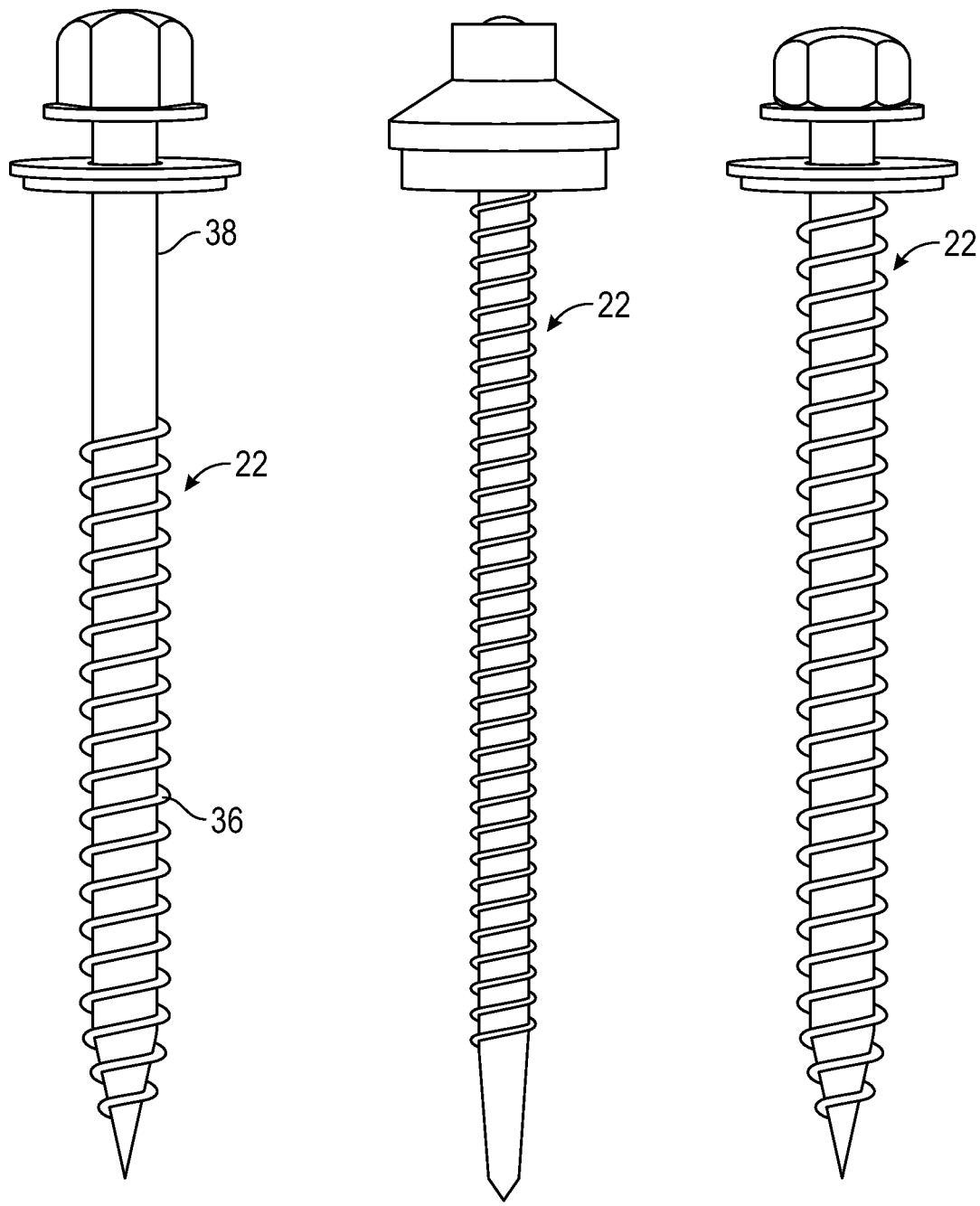
FIG. 62 illustrates side views of alternate exemplary embodiments of fastener assemblies.

FIG. 62 shows a number of examples of fasteners 125 that can be used with the embodiments herein. Throughout the figures there are only a few fasteners shown and it is understood that alternate fasteners can be used in any of the embodiments for particular purposes associated with roofing and structural materials, thread diameter, height, and pitch, shank diameter, desired drive and tools used for driving, head style 127, shoulders or varying elongated portions 38 diameters, conforming with seal profiles 128, threaded portions 22 and other demands or purposes.

A person with ordinary skill in the relevant art would know that any shape or size of the bracket elements or the flashing elements may be adopted as long as the assembly can be used to secure the bracket to the flashing and provide a water-resistant seal between the bracket and the roof. Any combinations of suitable number, shape, and size of the bracket and the flashing may be used. Also, any materials suitable to achieve the objects of the current invention may be chosen, such as stainless steel, aluminum or related metallic materials as well as plastics and polymers for the bracket and the flashing, and rubber or other deformable materials suitable for providing water-resistant barriers for the seals and gaskets.

What is claimed is:

1. An apparatus for installing a solar panel array to a roof comprising:
   a. a bracket comprising:
      i. a base comprising:
         1. An inner shell comprising an opening; and
         2. An outer shell extending from the inner shell forming a void within the base, wherein the outer shell further comprises a bottom surface;
   b. a flashing comprising:
      i. a cone extending upward from the flashing and tapering inward terminating at a lip, the lip forming a generally circular opening within the cone;
   c. wherein the inner shell of the base is coupled within the circular opening of the cone; and
   d. wherein the outer shell contacts the flashing.

2. The apparatus of claim 1, wherein the lip extends downward from the top of the cone toward the center of the circular opening within the cone.

3. The apparatus of claim 1, wherein the lip extends downward from the top of the cone toward the center of the circular opening within the cone and forms a top edge.

4. The apparatus of claim 3, wherein the top edge is curved.

5. The apparatus of claim 1, further comprising a seal positioned between the top edge and the bottom surface of the outer shell.

6. The apparatus of claim 1, further comprising a fastener inserted through the opening of the inner shell, the fastener further comprising a head and a threaded portion.

7. The apparatus of claim 6, wherein the fastener further comprises a seal positioned beneath the head of the fastener.

8. The apparatus of claim 7, wherein the fastener further comprises a rigid portion positioned between the head of the fastener and the seal.

9. The apparatus of claim 1, wherein the bracket further comprises a guide that extends upward from the base, wherein the guide comprises:
   a. a substantially U-shaped member that further comprises an aperture within the member.

10. The apparatus of claim 9, wherein the guide U-shaped member further comprises a recess along a portion of the member that forms the perimeter of the aperture, wherein the recess is configured to allow a bolt to move vertically along the recess.

11. The apparatus of claim 10, wherein the U-shaped member further comprises first and second ends further comprising a retaining lip such that the recess terminates at each retaining lip of the first and second ends; the retaining lips protruding inward toward each other and are configured to prevent the bolt from escaping from the aperture.

12. The apparatus of claim 10, wherein the recess further comprises a plurality of ridges.

13. The apparatus of claim 9, wherein the U-shaped member further comprises a plurality of ridges.

14. The apparatus of claim 1, wherein the outer shell contacts the flashing outside of the area of the cone.

15. The apparatus of claim 1, wherein the outer shell contacts the flashing inside of the area of the cone.

16. An apparatus for installing a solar panel array to a roof comprising:
   a. a bracket comprising:
      i. a base comprising:
         1. A top surface;
         2. An interior void; and
         3. An inner shell within the interior void, wherein the inner shell comprises a cylindrical opening extending through the base;
   b. a flashing comprising:
      i. a cone extending upward from the flashing and tapering inward terminating at a lip, the lip forming a generally circular opening within the cone; and
   c. a fastener comprising a head and an elongated portion such that the elonga ted portion extends through the cylindrical opening;
   d. wherein the inner shell extends through the generally circular opening of the cone; and
   e. wherein an outer shell contacts the flashing.

17. The apparatus of claim 16, wherein the fastener further comprises a washer slidably coupled to the elongated portion.

18. The apparatus of claim 17, wherein the washer comprises a deformable seal.

19. The apparatus of claim 18, wherein the deformable seal of the fastener is compressed between the head of the fastener and the top surface of the base.

\* \* \* \* \*

UNITED STATES PATENT AND TRADEMARK OFFICE
CERTIFICATE OF CORRECTION

| | | |
|---|---|---|
| PATENT NO. | : 12,209,607 B2 | Page 1 of 1 |
| APPLICATION NO. | : 17/777463 | |
| DATED | : January 28, 2025 | |
| INVENTOR(S) | : Anumeha Justice et al. | |

It is certified that error appears in the above-identified patent and that said Letters Patent is hereby corrected as shown below:

In the Claims

Column 19, Line 57, Claim 1, delete "An" and insert -- an --

Column 19, Line 58, Claim 1, delete "An" and insert -- an --

Column 20, Line 49, Claim 16, delete "An" and insert -- an --

Column 20, Line 50, Claim 16, delete "An" and insert -- an --

Column 20, Line 58, Claim 16, delete "elonga ted" and insert -- elongated --

Signed and Sealed this
First Day of April, 2025

Coke Morgan Stewart
*Acting Director of the United States Patent and Trademark Office*